(12) United States Patent
Sakakibara et al.

(10) Patent No.: US 7,710,620 B2
(45) Date of Patent: May 4, 2010

(54) IMAGE PROCESSING METHOD, RECORDED MATTER, STORAGE MEDIUM, IMAGE PROCESSING APPARATUS, IMAGE FORMING METHOD, IMAGE FORMING APPARATUS, IMAGE FORMING SYSTEM, AND INK

(75) Inventors: Shigetaka Sakakibara, Kanagawa (JP); Takashi Kimura, Kanagawa (JP); Naoya Morohoshi, Shizuoka (JP); Tomohiro Inoue, Kanagawa (JP); Masanori Hirano, Kanagawa (JP); Masakazu Yoshida, Kanagawa (JP); Michio Umezawa, Kanagawa (JP); Takashi Mori, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 607 days.

(21) Appl. No.: 11/592,386

(22) Filed: Nov. 2, 2006

(65) Prior Publication Data
US 2007/0106962 A1  May 10, 2007

(30) Foreign Application Priority Data

| Nov. 4, 2005 | (JP) | ............................. 2005-320712 |
| Feb. 23, 2006 | (JP) | ............................. 2006-046476 |
| Apr. 19, 2006 | (JP) | ............................. 2006-115323 |
| Oct. 19, 2006 | (JP) | ............................. 2006-285447 |

(51) Int. Cl.
*G03F 3/08* (2006.01)

(52) U.S. Cl. .................... 358/518; 347/105; 427/466

(58) Field of Classification Search .............. 347/105, 347/20; 427/466; 358/518
See application file for complete search history.

(56) References Cited

U.S. PATENT DOCUMENTS

| 4,795,284 A | 1/1989 | Yumoto et al. |
| 4,990,939 A | 2/1991 | Sekiya et al. |
| 5,162,860 A * | 11/1992 | Nami et al. ................. 358/501 |
| 5,166,810 A * | 11/1992 | Sorimachi et al. ........... 358/462 |

(Continued)

FOREIGN PATENT DOCUMENTS

CH        662358 A5    9/1987

(Continued)

OTHER PUBLICATIONS

Mar. 16, 2007 EPO Communication and European search report in connection European application No. EP 06 25 5664.

*Primary Examiner*—Benny Q Tieu
*Assistant Examiner*—Jeremiah A Bryar
(74) *Attorney, Agent, or Firm*—Cooper & Dunham LLP

(57) ABSTRACT

An image processing method of processing image data includes a color space conversion step of converting an input color signal of image data into an output color signal having cyan (C), magenta (M), and yellow (Y) values; a black generation/under color removal step of converting the CMY values into cyan (C), magenta (M), yellow (Y), and black (K) values by adding a black (K) value and decreasing the CMY values so that portions of cyan (C), magenta (M), and yellow (Y) recording liquids used to form the image data are replaced with a black (K) recording liquid; and a total amount control step of controlling amounts of cyan (C), magenta (M), yellow (Y), and black (K) recording liquids calculated from the CMYK values so that a total amount of the CMYK recording liquids per unit area on a recording medium does not exceed a predetermined total amount limit.

14 Claims, 25 Drawing Sheets

U.S. PATENT DOCUMENTS

| | | | |
|---|---|---|---|
| 5,172,139 A | 12/1992 | Sekiya et al. | |
| 5,293,182 A | 3/1994 | Sekiya et al. | |
| 5,389,962 A | 2/1995 | Sekiya et al. | |
| 5,400,065 A | 3/1995 | Tomono et al. | |
| 5,412,413 A | 5/1995 | Sekiya et al. | |
| 5,600,356 A | 2/1997 | Sekiya et al. | |
| 5,653,901 A * | 8/1997 | Yoshimura | 219/121.71 |
| 5,852,075 A | 12/1998 | Held | |
| 6,554,385 B2 * | 4/2003 | Kikuchi et al. | 347/15 |
| 6,821,329 B2 * | 11/2004 | Choy | 106/31.58 |
| 6,884,156 B2 * | 4/2005 | Prasad et al. | 451/533 |
| 6,923,520 B2 | 8/2005 | Oikawa et al. | |
| 7,050,196 B1 * | 5/2006 | Piatt et al. | 358/1.9 |
| 2004/0004644 A1 * | 1/2004 | Komatsu et al. | 347/15 |
| 2005/0046882 A1 * | 3/2005 | Kobayashi | 358/1.9 |

FOREIGN PATENT DOCUMENTS

| | | | |
|---|---|---|---|
| EP | 0882770 A1 | | 12/1998 |
| JP | 61-290060 | | 12/1986 |
| JP | 05-194896 | * | 3/1993 |
| JP | 2608262 | | 2/1997 |
| JP | 2004-9480 | | 1/2004 |

* cited by examiner

| INPUT VALUES | | | OUTPUT VALUES | | | |
|---|---|---|---|---|---|---|
| R | G | B | K | C | M | Y |
| 0 | 0 | 0 | 255 | 255 | 255 | 255 |
| 1 | 0 | 0 | 254 | 254 | 254 | 255 |
| ⋮ | ⋮ | ⋮ | ⋮ | ⋮ | ⋮ | ⋮ |
| 255 | 255 | 254 | 1 | 0 | 0 | 1 |
| 255 | 255 | 254 | 0 | 0 | 0 | 0 |

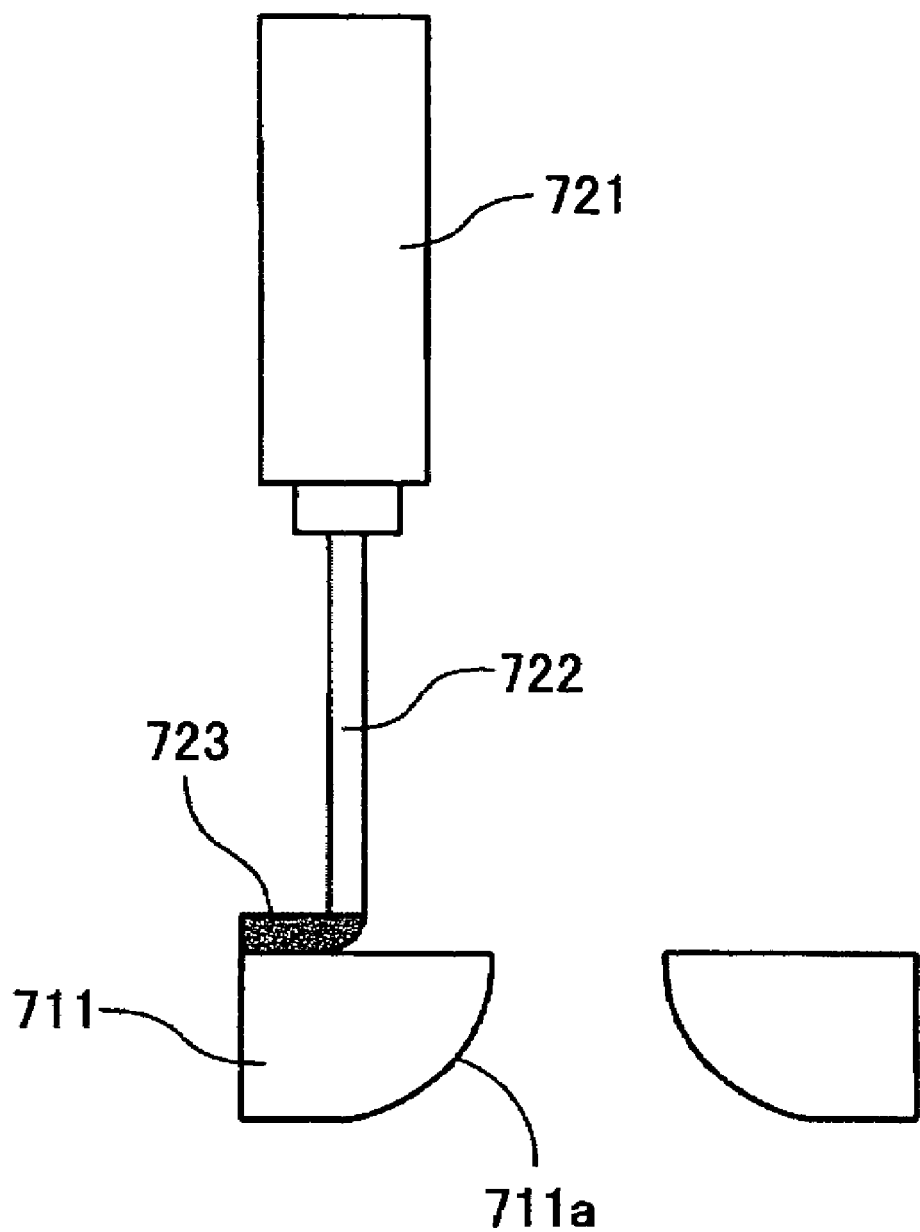

IMAGE PROCESSING METHOD, RECORDED MATTER, STORAGE MEDIUM, IMAGE PROCESSING APPARATUS, IMAGE FORMING METHOD, IMAGE FORMING APPARATUS, IMAGE FORMING SYSTEM, AND INK

CROSS REFERENCE TO RELATED APPLICATIONS

This application is based on priority Japanese Application No. 2005-320712 filed on Nov. 4, 2005, priority Japanese Application No. 2006-046476 filed on Feb. 23, 2006, priority Japanese Application No. 2006-115323 filed on Apr. 19, 2006, and priority Japanese Application No. 2006-285447 flied on Oct. 19, 2006, the entire contents of each of which are incorporated herein by reference.

BACKGROUND OF THE INVENTION

1. Technical Field

This disclosure generally relates to an image processing method, a recorded matter, a storage medium, an image processing apparatus, an image forming method, an image forming apparatus, an image forming system, and an ink.

2. Description of the Related Art

An ink jet recording apparatus is an image forming apparatus that uses one or more liquid drop spraying heads as recording heads. An ink jet recording apparatus is used, for example, as a printer, a facsimile, a copier, or a multifunction copier having functions of a printer, facsimile, and copier. An ink jet recording apparatus sprays drops of inks or recording liquids from its recording heads onto paper (not limited to a sheet of paper but also refers to any medium, such as an OHP sheet, on which an image can be formed using ink drops or liquid drops, and may also be called a recording medium, recording paper, recording sheet, recording material, medium, or the like), and thereby forms (records or prints) an image on the paper.

Since ink jet recording apparatuses as described above are available at low prices and produce high quality images when used with paper dedicated for ink jet recording apparatuses (ink jet paper), they have rapidly become widespread for personal use. Recently, however, ink jet recording apparatuses are also becoming popular as color recording apparatuses in offices where electrophotographic image forming apparatuses had been the mainstream.

In offices, plain paper is mainly used for printing with an ink jet recording apparatus. Although ink jet paper provides a very high image quality, it is not suitable for daily use because of its high cost.

For this reason, manufacturers are trying to improve fixation and drying characteristics of inks to improve the quality of images printed on plain paper.

Also, a technique called total amount control for limiting the maximum total amount of cyan (C), magenta (M), and yellow (Y) inks per unit area of paper has been devised to prevent overflow (beading) of ink on paper.

For example, patent document 1 discloses an image forming method including a step of controlling the total amount of ink caused to adhere onto paper. In the disclosed image forming method, a color is formed by causing drops of recording liquids of cyan (C), magenta (M), and yellow (Y) to adhere onto a recording medium at substantially the same position. When the total amount of multiple recording liquids for each pixel exceeds a predetermined limit, image data are processed so as to reduce the total amount of multiple recording liquids without changing the substantial proportion of C, M, and Y components in the image to be formed.

[Patent document 1] Japanese Patent Publication No. 2608262

Patent document 2 discloses an image processing apparatus including a total amount control unit for controlling the amounts of color materials. In the disclosed image processing apparatus, record control information for each color component is converted into the amount of color material used after halftone processing, the total amount of color materials for all color components is calculated based on the obtained amount of color material for each color component, and the amounts of color materials are controlled according to the calculated total amount of color materials.

[Patent document 2] Japanese Patent Application Publication No. 2004-009480

Meanwhile, although papers, such as photo paper, coated paper, and OHP sheets, dedicated for ink jet recording apparatuses are expensive, high-quality coated papers for commercial printing (commercial printing papers), such as gloss paper, are relatively inexpensive.

Using such high-quality commercial printing papers enables office users to print documents with an image quality as high as that provided by expensive ink jet papers. More specifically, using such high-quality commercial printing papers for printing with ink jet recording apparatuses makes it possible for office users to create presentation materials, promotional materials, and catalogs with an image quality higher than that provided by plain paper at low costs.

However, plain paper and a commercial printing paper, for example, gloss paper, have significantly different characteristics. On plain paper, liquid drops tend to spread and bleed. On the other hand, on gloss paper, liquid drops do not spread smoothly but clump together.

Therefore, when printing on a commercial printing paper with a conventional ink jet recording apparatus, because of fixation and drying characteristics of inks, ink drops may not adhere onto the paper properly and cause overflow of ink (beading). This problem is making it difficult to print on a commercial printing paper with an ink jet recording apparatus.

One way to solve the above problem is to use inks whose composition has been altered to improve the fixation and drying characteristics. However, using image data processed in the same manner as in the case of printing on plain paper may still cause problems such as overflow of ink (beading), banding, and tone reversal (especially in a part using a black ink) and thereby degrade the image quality.

Such problems may be solved to some extent by reducing the total amount of C, M, and Y inks per unit area when the total amount of C, M, and Y inks exceeds a predetermined limit, as disclosed in patent document 1.

However, when printing on a recording medium on which liquid drops do not spread smoothly but clump together, just controlling the total amount of ink per unit area may not be able to provide sufficient tone and color reproducibility in shaded areas of an image and therefore may not be able to provide a high image quality.

BRIEF SUMMARY

In an aspect of this disclosure, there are provided an image processing method that improves the quality of an image on a commercial printing paper on which liquid drops do not spread smoothly but clump together; a storage medium having a program stored therein for causing a computer to perform the above image processing method; an image processing apparatus for performing the above image processing method; an image forming apparatus for performing the above image processing method; an image forming system including the above image processing apparatus and the above image forming apparatus; an image forming method that improves the quality of an image on a commercial printing paper; a storage medium having a program stored therein for causing a computer to perform a step in the above image forming method; an image forming apparatus for performing the above image forming method; and an ink used by an image forming system and the above image forming apparatus.

In another aspect of this disclosure, there is provided an image processing method of processing image data of an image, which image is to be formed on a recording medium, to control amounts of recording liquids caused to adhere to the recording medium includes a color space conversion step of converting an input color signal of the image data into an output color signal having cyan (C), magenta (M), and yellow (Y) values; a black generation/under color removal step of converting the CMY values into cyan (C), magenta (M), yellow (Y), and black (K) values by adding a black (K) value and decreasing the CMY values so that a portion of cyan (C), magenta (M), and yellow (Y) recording liquids used to form the image is replaced with a black (K) recording liquid; and a total amount control step of controlling amounts of the CMYK recording liquids calculated from the CMYK values so that a total amount of the CMYK recording liquids per unit area on the recording medium does not exceed a predetermined total amount limit.

In another aspect of this disclosure, there is provided an image forming method of forming an image on a commercial printing paper with pigmented inks using an image forming apparatus, where an ink amount control process is performed on image data of the image before forming the image. The ink amount control process includes a total amount control step of setting a total amount limit used to control a total amount of the pigmented inks per unit area on the commercial printing paper, wherein the total amount limit is determined so that a full color gamut of the image forming apparatus can be reproduced; a color space conversion step of converting an input color signal of the image data into an output color signal having cyan (C), magenta (M), and yellow (Y) values, wherein the total amount of the pigmented inks per unit area on the commercial printing paper is controlled for each hue according to the total amount limit determined in the total amount control step and an ink overflow threshold and maximum saturation of each hue; and a black generation/under color removal step of converting the CMY values into cyan (C), magenta (M), yellow (Y), and black (K) values by adding a black (K) value and decreasing the CMY values so that a portion of cyan (C), magenta (M), and yellow (Y) pigmented inks used to form the image is replaced with a black (K) pigmented ink, wherein a maximum under color removal amount, which is a maximum amount of each of the CMY pigmented inks to be replaced with the K pigmented ink, is obtained by the following formulas:

(total amount limit)−(maximum amount of black generation)=(total amount of CMY pigmented inks usable)

(total amount of CMY pigmented inks usable)/3= (amount of each of CMY pigmented inks usable)

(amount limit for each color)−(amount of each of CMY pigmented inks usable)=maximum under color removal amount

BRIEF DESCRIPTION OF THE DRAWINGS

FIG. 20 is a drawing used to describe an exemplary method of producing the exemplary liquid drop spraying head;

DESCRIPTION OF THE PREFERRED EMBODIMENTS

Figure 1:
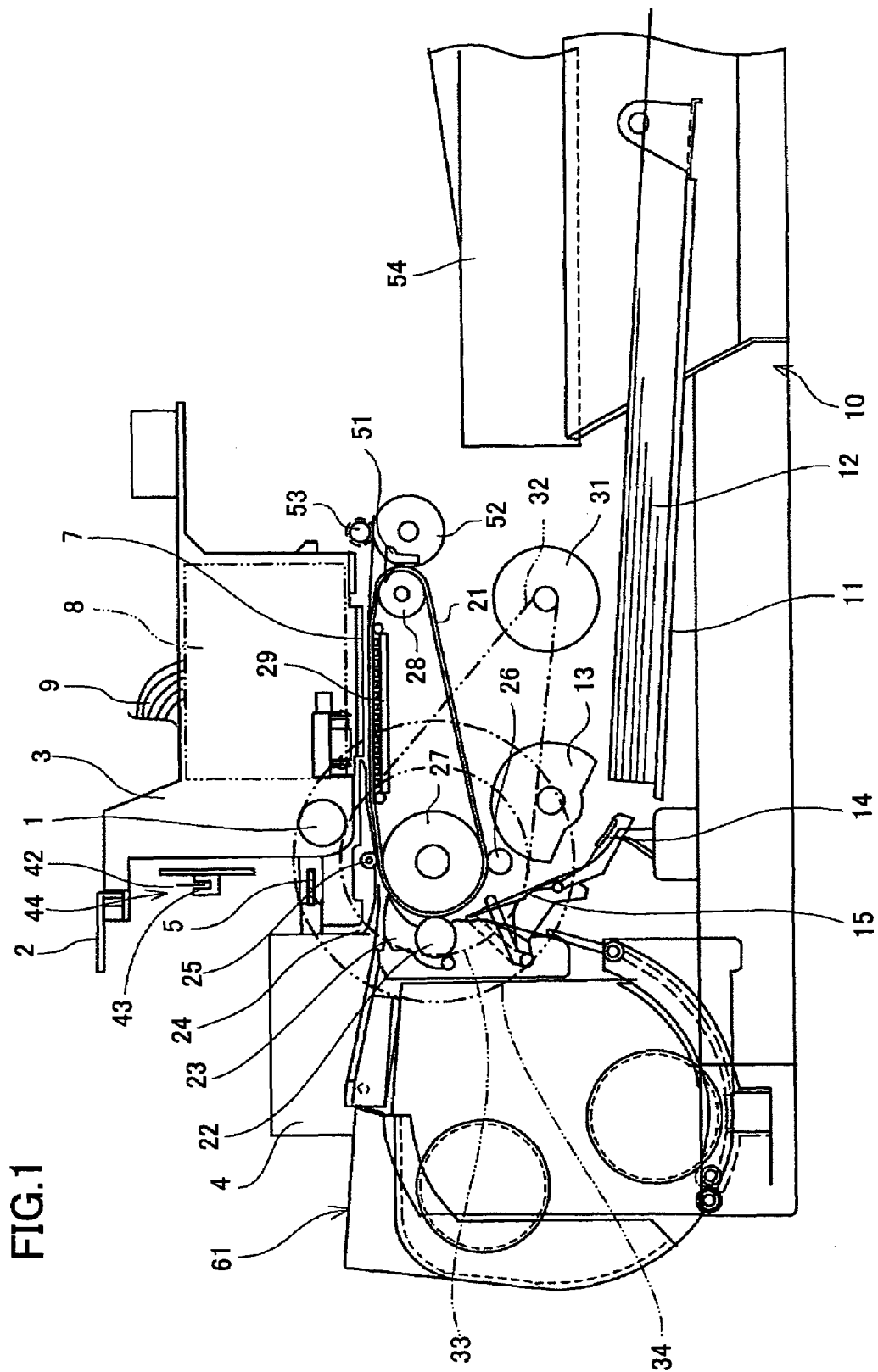
FIG. 1 is a side elevational view of mechanical parts of an exemplary image forming apparatus according to an embodiment of the present invention.
Figure 2:
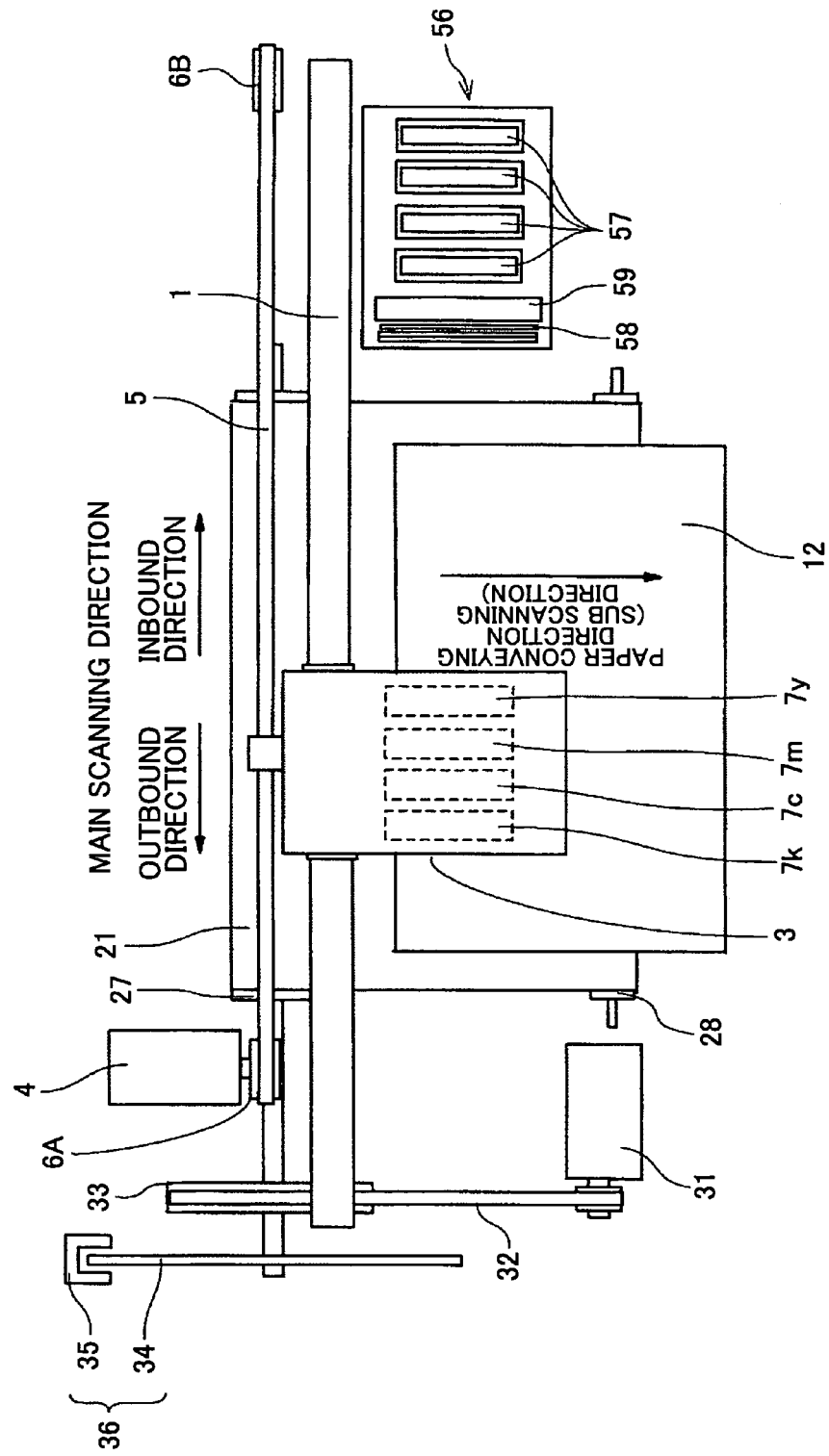
FIG. 2 is a plan view of the mechanical parts shown in FIG. 1.

Preferred embodiments of the present invention are described below with reference to the accompanying drawings. An exemplary image forming apparatus for outputting image data generated by using an exemplary image processing method according to an embodiment of the present invention is described below with reference to FIG. 1 and FIG. 2. FIG. 1 is a side elevational view of mechanical parts of an exemplary image forming apparatus according to an embodiment of the present invention. FIG. 2 is a plan view of the mechanical parts shown in FIG. 1.

In the exemplary image forming apparatus, a carriage 3 is supported by a guiding unit, which includes a guide rod 1 and a guide rail 2 laid between right and left sideboards (not shown), so as to be able to slide in the directions of the arrows (main-scanning directions) shown in FIG. 2. The carriage 3 is moved in the main-scanning directions by a main scanning motor 4 via a timing belt 5 stretched between a drive pulley 6A and a driven pulley 6B shown in FIG. 2.

On the carriage 3, for example, four recording heads $7y$, $7c$, $7m$, and $7k$ (collectively called recording heads 7 for brevity and/or when color distinction is not made) made up of liquid drop spraying heads for spraying ink drops of yellow (Y), cyan (C), magenta (M), and black (K) are mounted. The recording heads 7 are arranged so that an array of ink spray nozzles of the recording heads 7 forms a right angle with the main scanning directions, and ink drops are sprayed downward.

Each of the liquid drop spraying heads forming the recording heads 7 includes a pressure-generating unit for generating pressure to spray liquid drops. For such a pressure-generating unit, a piezoelectric actuator such as a piezoelectric element, a thermal actuator using liquid film boiling caused by an electrothermal converting element such as a heat element, a shape memory alloy actuator using metal phase changes caused by temperature changes, or an electrostatic actuator using static electricity may be used. Each liquid drop spraying head may not necessarily be dedicated to one color. The recording heads 7 may be composed of one or more liquid drop spraying heads each having arrays of nozzles for spraying different color inks.

The carriage 3 also includes sub-tanks 8 for supplying color inks to the recording heads 7. The sub-tanks 8 are supplied with color inks from main-tanks (ink cartridges) (not shown) through ink supply tubes 9.

The exemplary image forming apparatus also includes a paper feeding unit for feeding paper sheets 12 stacked on a paper stacking plate (pressing plate) 11 of a paper feed tray 10. The paper feeding unit includes a crescent roller (paper feed roller) 13 for separating the paper sheets 12 and feeding them one by one from the paper stacking plate 11, and a separating pad 14 facing the paper feed roller 13 and made of a material with a high friction coefficient. The separating pad 14 is biased toward the paper feed roller 13.

The exemplary image forming apparatus also includes a conveying unit for conveying the paper sheet 12 fed from the paper feeding unit to a position under the recording heads 7. The conveying unit includes a guide 15 that guides the paper sheet 12 fed from the paper feeding unit, a conveyor belt 21 that electrostatically attracts and thereby conveys the paper sheet 12, a counter roller 22 that presses the paper sheet 12 against the conveyor belt 21 and thereby conveys the paper sheet 12, a conveying guide 23 that changes approximately 90 degrees the direction of the paper sheet 12 being fed approximately vertically upward so that the paper sheet 12 is laid on the conveyor belt 21, a pressing part 24, and a pressing roller 25 biased by the pressing part 24 toward the conveyor belt 21. The exemplary image forming apparatus also includes a charging roller 26 for charging the surface of the conveyor belt 21.

The conveyor belt 21 is an endless belt and is stretched between a conveying roller 27 and a tension roller 28. The conveyor belt 21 is turned in the paper conveying direction (sub scanning direction) shown in FIG. 2 by the conveying roller 27 rotated by a sub scanning motor 31 via a timing belt 32 and a timing roller 33. A guide 29 is provided under the conveyor belt 21 in a position corresponding to the image forming area of the recording heads 7. The charging roller 26 is positioned so as to contact the surface of the conveyor belt 21 and to rotate according to the rotation of the conveyor belt 21.

As shown in FIG. 2, the exemplary image forming apparatus also includes a rotary encoder 36. The rotary encoder 36 includes a slit wheel 34 attached to the axis of the conveying roller 27 and an encoder sensor 35 for detecting the slit on the slit wheel 34.

The exemplary image forming apparatus further includes a paper ejecting unit for ejecting the paper sheet 12 on which an image has been recorded by the recording heads 7. The paper ejecting unit includes a sheet separating claw 51 for separating the paper sheet 12 from the conveyor belt 21, a paper ejecting roller 52, a paper ejecting roller 53, and a paper catch tray 54 for receiving the ejected paper sheet 12.

A duplex unit 61 is detachably attached to the back of the exemplary image forming apparatus. The duplex unit 61 takes in the paper sheet 12 that is conveyed backward by the conveyor belt 21 turning in the opposite direction, reverses the paper sheet 12, and feeds the paper sheet 12 again into the space between the counter roller 22 and the conveyor belt 21.

Also, as shown in FIG. 2, a recording head maintenance/cleaning mechanism 56 is provided in a non-image-forming area to the right of the carriage 33. The recording head maintenance/cleaning mechanism 56 maintains and cleans the nozzles of the recording heads 7.

The recording head maintenance/cleaning mechanism 56 includes caps 57 for covering the nozzle surfaces of the recording heads 7, a wiper blade 58 for wiping the nozzle surfaces, and a waste-ink receiver 59 for receiving ink drops used for purging dried ink from the nozzles.

In the exemplary image forming apparatus configured as described above, the paper sheets 12 are separated and fed one by one from the paper feed tray 10, the separated paper sheet 12 is fed approximately vertically upward and guided by the guide 15 into the space between the conveyor belt 21 and the counter roller 22 so as to be conveyed further, the leading edge of the paper sheet 12 is guided by the conveying guide 23 and pressed by the pressing roller 25 onto the conveyor belt 21, and then the direction of the paper sheet 12 is changed approximately 90 degrees.

At this stage, an AC bias applying unit of a control unit described later applies alternating voltages to the charging roller 26 by alternately outputting positive and negative voltages. As a result, positively and negatively charged strips with a constant width are formed alternately in the paper conveying direction (sub scanning direction) on the surface of the conveyor belt 21. When the paper sheet 12 is conveyed onto the charged conveyor belt 21, the paper sheet 12 is electrostatically attracted to the conveyor belt 21 and thereby conveyed in the sub scanning direction as the conveyor belt 21 turns.

The recording heads 7 are driven while moving the carriage 3 in the main scanning directions (outbound and inbound directions) according to an image signal to spray ink drops, and record a line of image on the paper sheet 12 that is paused at a position. Then, the paper sheet 12 is conveyed further a specified distance, and the next line is recorded. When a recording completion signal or a signal indicating that the bottom edge of the paper sheet 12 has reached the image forming area is received, the exemplary image forming apparatus terminates the image forming process and ejects the paper sheet 12 into the paper catch tray 54.

In duplex printing, after an image is formed on the upper side (a side of the paper sheet 12 on which an image is formed first) of the paper sheet 12, the paper sheet 12 is fed into the duplex unit 61 by turning the conveyor belt 21 in the reverse direction, the paper sheet 12 is reversed (so that the underside of the paper sheet 12 faces upward) and fed again into the space between the counter roller 22 and the conveyor belt 21, the paper sheet 12 is conveyed by the conveyor belt 21 at controlled timings as described earlier, an image is formed on the underside, and then the paper sheet 12 is ejected onto the paper catch tray 54.

When the exemplary image forming apparatus is idle, the carriage 3 is moved into a position above the recording head maintenance/cleaning mechanism 56. In the position, the nozzle surfaces of the recording heads 7 are covered by the caps 57 to retain moisture of the nozzles and thereby to prevent nozzle clogging caused by dried ink. With the recording heads 7 capped by the caps 57, the nozzles are suctioned to remove dried ink or air bubbles. The ink adhered to the nozzle surfaces of the recording heads 7 during this recording head maintenance is wiped off by the wiper blade 58. Also, before or during an image forming process, ink is sprayed in order to clean the nozzles. With the above measures, the spray performance of the recording heads 7 is maintained.

Figure 3:
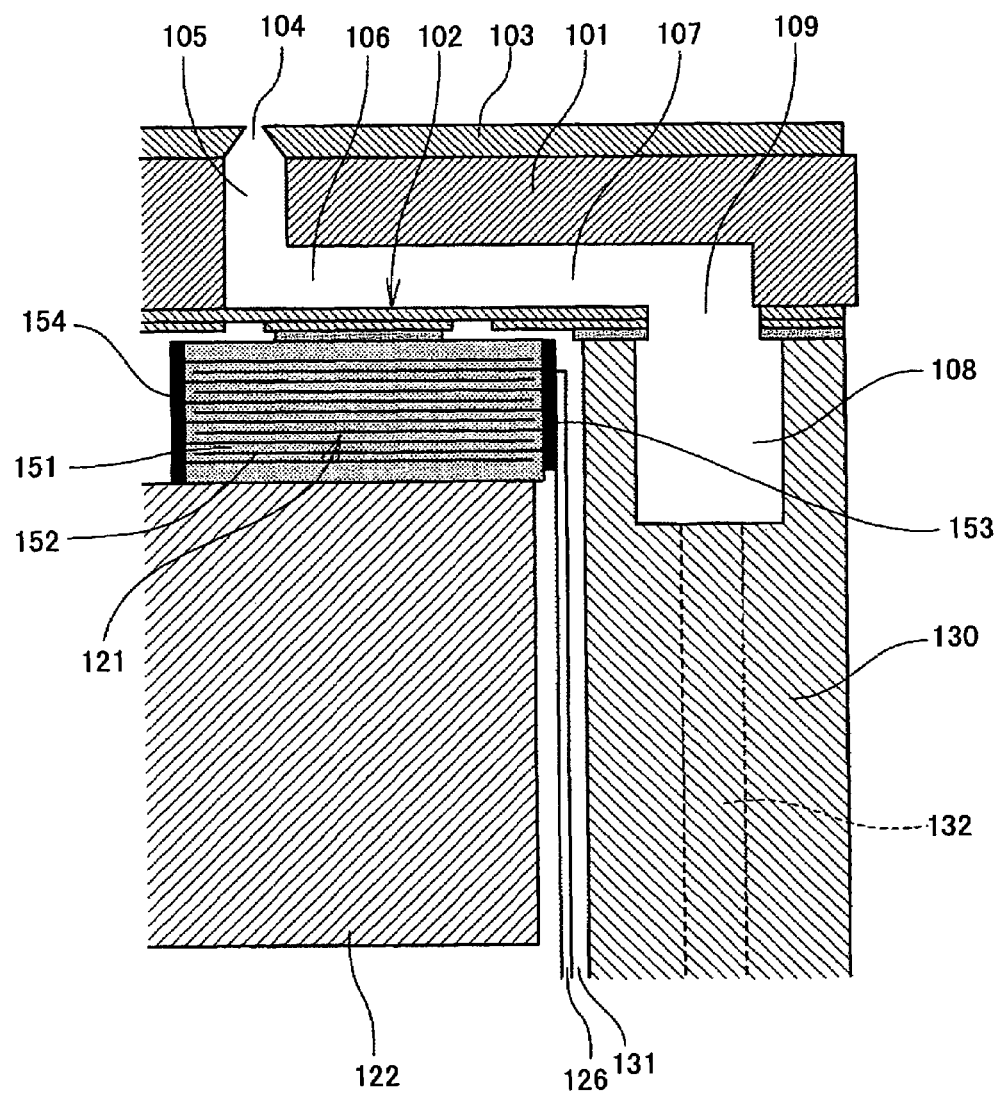
FIG. 3 is a cross-sectional view of an exemplary recording head of the exemplary image forming apparatus taken along the length of a liquid chamber.
Figure 4:
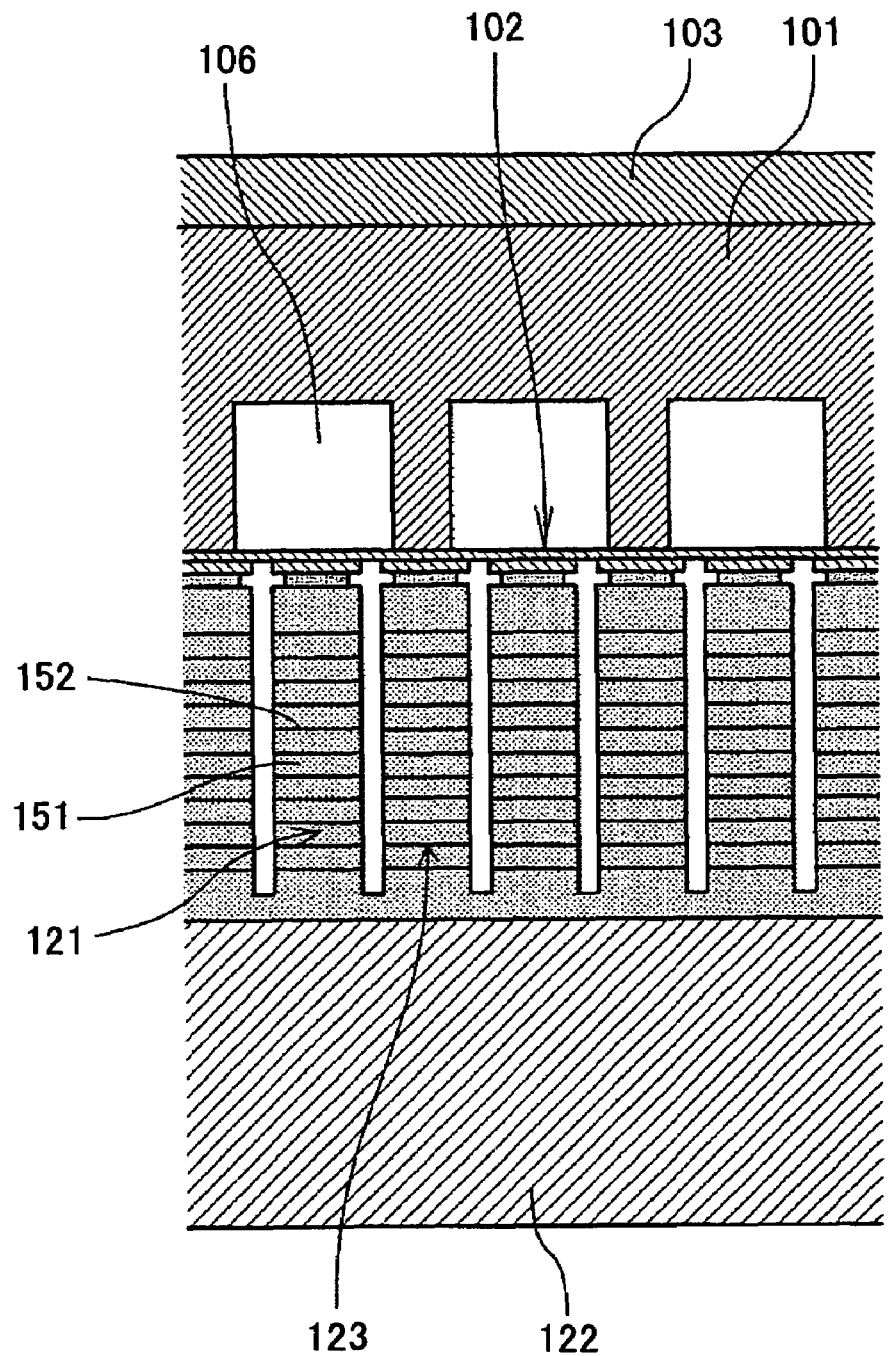
FIG. 4 is a cross-sectional view of the exemplary recording head taken along the width of the liquid chamber.

An exemplary liquid drop spraying head of the recording heads 7 is described below with reference to FIGS. 3 and 4. FIG. 3 is a cross-sectional view of the exemplary liquid drop spraying head taken along the length of its liquid chamber. FIG. 4 is a cross-sectional view of the exemplary recording head taken along the width of its liquid chamber (along the nozzle array).

The exemplary liquid drop spraying head includes a channel plate 101 formed, for example, by anisotropically etching a single-crystal silicon substrate; a vibrating plate 102 formed, for example, by electroforming nickel and bonded to the underside of the channel plate 101; and a nozzle plate 103 bonded to the upper side of the channel plate. The channel plate 101, the vibrating plate 102, and the nozzle plate 103 are arranged so as to form a nozzle 104 for spraying liquid drops (ink drops), a nozzle connecting channel 105 leading to the nozzle 104, a liquid chamber 106 used as a pressure-generating chamber, a fluid resistance part (supply channel) 107 for supplying ink to the liquid chamber 106, and an ink supply opening 109 leading to a common liquid chamber 108.

Figure 6:
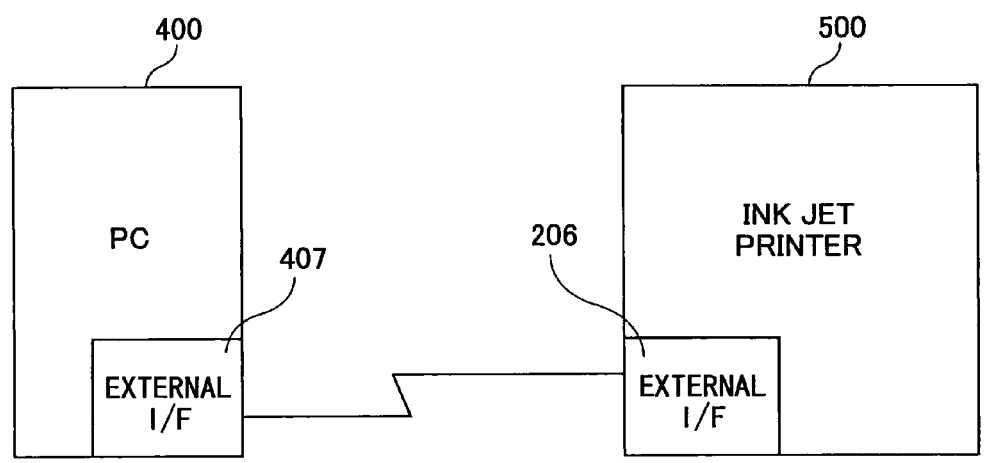
FIG. 6 is a block diagram illustrating an exemplary image forming system according to an embodiment of the present invention.

The exemplary liquid drop spraying head also includes two arrays of stacked piezoelectric elements 121 (only one array is shown in FIG. 6) that are electromechanical conversion elements and used as a pressure-generating unit (actuator unit) to pressurize ink in the liquid chamber 106 by deforming the vibrating plate 102; and a base plate 122 on which the piezoelectric elements 121 are fixed. Between the piezoelectric elements 121, supports 123 are provided. The supports 123 are formed at the same time when a piezoelectric material is processed to form the piezoelectric elements 121. Since no driving voltage is applied to the supports 123, they just function as supporting parts.

A FPC cable 126 having a driving circuit (driving IC) (not shown) is connected to the piezoelectric elements 121.

The peripheral part of the vibrating plate 102 is bonded to a frame part 130. The frame part 130 forms a through hole 131 for housing an actuator unit including the piezoelectric elements 121 and the base plates 122, a recess used as the common liquid chamber 108, and an ink supply hole 132 for supplying ink from the outside to the common liquid chamber 108. The frame part 130 is made of, for example, a thermosetting resin such as an epoxy resin or polyphenylene sulfide and formed by injection molding.

The recess and hole in the channel plate 101 used as the nozzle connecting channel 105 and the liquid chamber 106 are formed by anisotropically etching a single-crystal silicon substrate with a crystal orientation (110) using an alkaline etching liquid such as a potassium hydroxide solution (KOH). The material for the channel plate 101 is not limited to a single-crystal silicon substrate, but a stainless steel substrate, a photosensitive resin, or the like may also be used.

The vibrating plate 102 is formed, for example, by electroforming a nickel plate. The material for the vibrating plate 102 is not limited to a nickel plate, but other types of metal plates or a laminated plate made of a metal plate and a resin plate may also be used. The piezoelectric elements 121 and the supports 123 are bonded to the vibrating plate 102 with an adhesive, and the vibrating plate 102 is bonded to the frame part 130 with an adhesive.

The nozzle plate 103 forms the nozzle 104 with a diameter of 10-30 μm for each of the liquid chambers 106. The nozzle plate 103 is bonded to the channel plate 101 with an adhesive. The nozzle plate 103 is made by forming layers on the surface of a nozzle forming material made of a metal. The top-most layer of the nozzle plate 103 is made of a water repellent material.

The piezoelectric element 121 is a stacked piezoelectric element (PZT in this embodiment) formed by alternately stacking a piezoelectric material 151 and an internal electrode 152. The ends of the internal electrodes 121 are exposed alternately on one or the other side of the piezoelectric element 121 and are connected to an individual electrode 153 and a common electrode 154. In this embodiment, the ink in the liquid chamber 106 is pressurized by the displacement of the piezoelectric element 121 in the d33 direction. However, the exemplary liquid drop spraying head may be configured to pressurize the ink in the liquid chamber 106 by the displacement of the piezoelectric element 121 in the d31 direction. Also, the exemplary liquid drop spraying head may be configured so that one array of the piezoelectric elements 121 is provided on one base plate 122.

In the exemplary liquid drop spraying head configured as described above, when the voltage applied to the piezoelectric element 121 is decreased below a reference potential, the piezoelectric element 121 contracts and causes the vibrating plate 102 to move upward, the volume of the liquid chamber 106 increases, and, as a result, ink flows into the liquid chamber 106. When the voltage applied to the piezoelectric element 121 is increased, the piezoelectric element 121 expands in the direction in which the layers of the piezoelectric element 121 are stacked and causes the vibrating plate 102 to deform toward the nozzle 104, the volume of the liquid chamber 106 decreases, the ink in the liquid chamber 106 is pressurized, and, as a result, ink drops are sprayed from the nozzle 104.

When the voltage applied to the piezoelectric element 121 is returned to the reference potential, the vibrating plate returns to its initial position, the liquid chamber 106 expands and thereby generates a negative pressure, and, as a result, ink flows into the liquid chamber 106 from the common liquid chamber 108. After the vibration of the meniscus surface of the nozzle 104 decreases and the nozzle 104 stabilizes, the next liquid drop spraying process is started.

The method of driving the exemplary liquid drop spraying head is not limited to the method described above.

Figure 5:
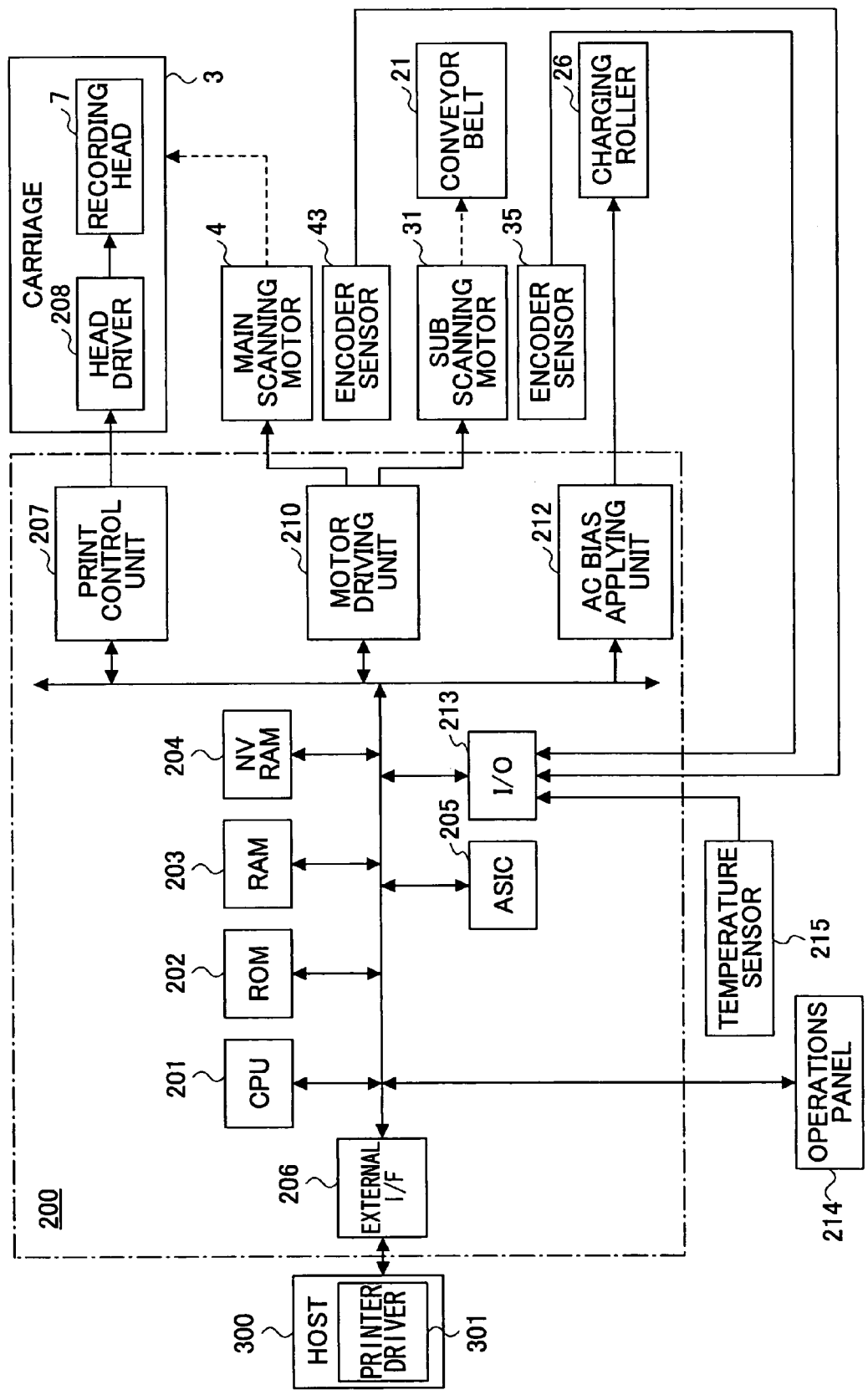
FIG. 5 is a block diagram illustrating an exemplary control unit of the exemplary image forming apparatus.

An exemplary control unit of the exemplary image forming apparatus is outlined below with reference to the block diagram shown in FIG. 5.

The control unit 200 includes a CPU 211 for controlling the entire operations of the exemplary image forming apparatus, a ROM 202 for storing programs to be executed by the CPU 211 and other fixed data, a RAM 203 for temporarily storing image data, a rewritable non-volatile memory 204 that retains data even when the power is off, and an ASIC 205 that performs, for example, signal processing and a sort operation on image data and handles input/output signals for controlling the exemplary image forming apparatus.

The control unit 200 also includes an external I/F 206 for sending/receiving data and signals to/from a host 300, a print control unit 207 including a data transfer unit for transferring data to control the recording heads 7 and a drive waveform generating unit for generating drive waveforms, a head driver (driver IC) 208 for driving the recording heads 7, a motor driving unit 210 for driving the main scanning motor 4 and the sub scanning motor 31, an AC bias applying unit 212 for applying an AC bias to the charging roller 26, and an I/O 213 for receiving detection signals from encoder sensors 35 and 43 and a temperature sensor 215. An operations panel 214 for inputting and displaying information is connected to the control unit 200.

The external I/F 206 of the control unit 200 receives print data via a cable or a network from the host 300. The host 300 may be an information processing apparatus such as a personal computer, an image reading apparatus such as an image scanner, an imaging apparatus such as a digital camera, or the like.

The CPU 201 of the control unit 200 reads out and analyzes the print data in a receive buffer of the external I/F 206, causes the ASIC 205 to perform image processing and a sort operation on the print data, and transfers image data in the print data via the print control unit 107 to the head driver 208. Dot pattern data for printing the image are generated by a printer driver 301 of the host 300 as described later.

The print control unit 207 transfers the image data as serial data to the head driver 208. The print control unit 207 outputs a transfer clock, according to which the image data is transferred, a latch signal, and an ink drop control signal (mask signal) to the head driver 208. Also, the print control unit 207 includes a D/A converter for converting drive signal pattern data stored in the ROM 202 from digital to analog, a drive waveform generating unit including a voltage amplifier and a current amplifier, and a drive waveform selecting unit for selecting a drive waveform to be supplied to the head driver 208. The print control unit 207 generates a drive waveform made up of one drive pulse (drive signal) or two or more drive pulses (drive signals), and outputs the drive waveform to the head driver 208.

The head driver 208 applies drive signals constituting the drive waveform supplied from the print control unit 207 selectively to the piezoelectric elements 121 according to one line (one scan by the recording heads 7) of the image data input as serial data, and thereby drives the recording heads 7. The recording heads 7 can form dots of different sizes, for example, a large-size dot, a medium-size dot, and a small-size dot, according to a drive pulse selected.

The CPU 201 calculates a drive output value (control value) for the main scanning motor 4 based on speed detection and position detection values obtained by sampling a detection pulse from the encoder sensor 43 of a linear encoder 44 and speed target and position target values obtained from a stored speed and position profile, and causes the motor driving unit 210 to drive the main scanning motor 4 using the calculated control value. Also, the CPU 201 calculates a drive output value (control value) for the sub scanning motor 31 based on speed detection and position detection values obtained by sampling a detection pulse from the encoder sensor 35 of the rotary encoder 36 and speed target and position target values obtained from a stored speed and position profile, and causes the motor driving unit 210 to drive the sub scanning motor 31 using the calculated control value.

An exemplary image forming system including an image processing apparatus according to an embodiment of the present invention and the above described exemplary image forming apparatus is described below with reference to FIG. 6. The exemplary image processing apparatus includes a program for causing a computer to perform an image forming method of an embodiment of the present invention (the program may also be used to cause a computer to perform a step of controlling the amounts of recording liquids according to an image forming method of an embodiment of the present invention).

In the descriptions below, an ink jet printer (ink jet recording apparatus) is used as the exemplary image forming apparatus. The exemplary image forming system performs an image forming method according to an embodiment of the present invention.

The exemplary image forming system includes one or more image processing apparatuses 400 such as personal computers (PC) and an ink jet printer 500 connected to the image processing apparatuses 400 via interfaces or a network.

Figure 7:
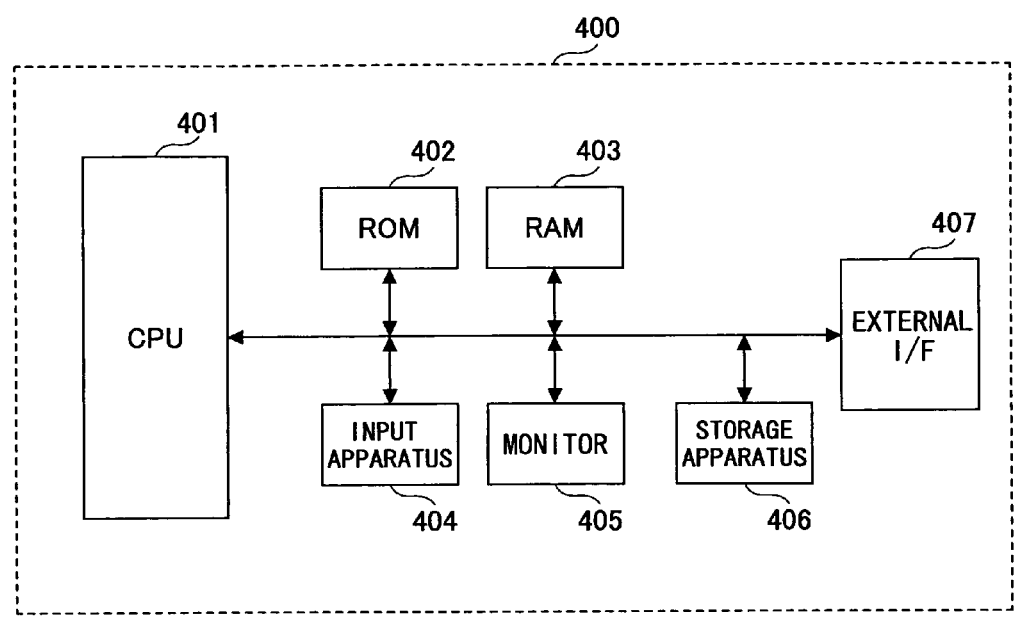
FIG. 7 is a block diagram illustrating an exemplary image processing apparatus of the exemplary image forming system.

In the image processing apparatus 400, as shown in FIG. 7, a CPU 401, and a ROM 402 and a RAM 403 used as memories are connected by a bus. Also, a storage apparatus 406 made of a magnetic storage device such as a hard disk, an input apparatus 404 including a mouse and a keyboard, a monitor 405 such as an LCD or a CRT, and a storage medium reading apparatus (not shown) for reading a storage medium such as an optical disk are connected via interfaces to the bus. Further, an external interface (I/F) 407 for communication with a network such as the Internet and an external apparatus such as an USB device is connected to the bus.

The storage apparatus 406 of the image processing apparatus 400 stores image processing programs including a program of an embodiment of the present invention. The image processing programs are read from a storage medium by the storage medium reading apparatus or downloaded from a network such as the Internet, and installed in the storage apparatus 406. The image processing programs enable the image processing apparatus 400 to perform image processing as described below. The image processing programs may be configured to run on an operating system. Also, the image processing programs may be a part of an application program.

Figure 8:
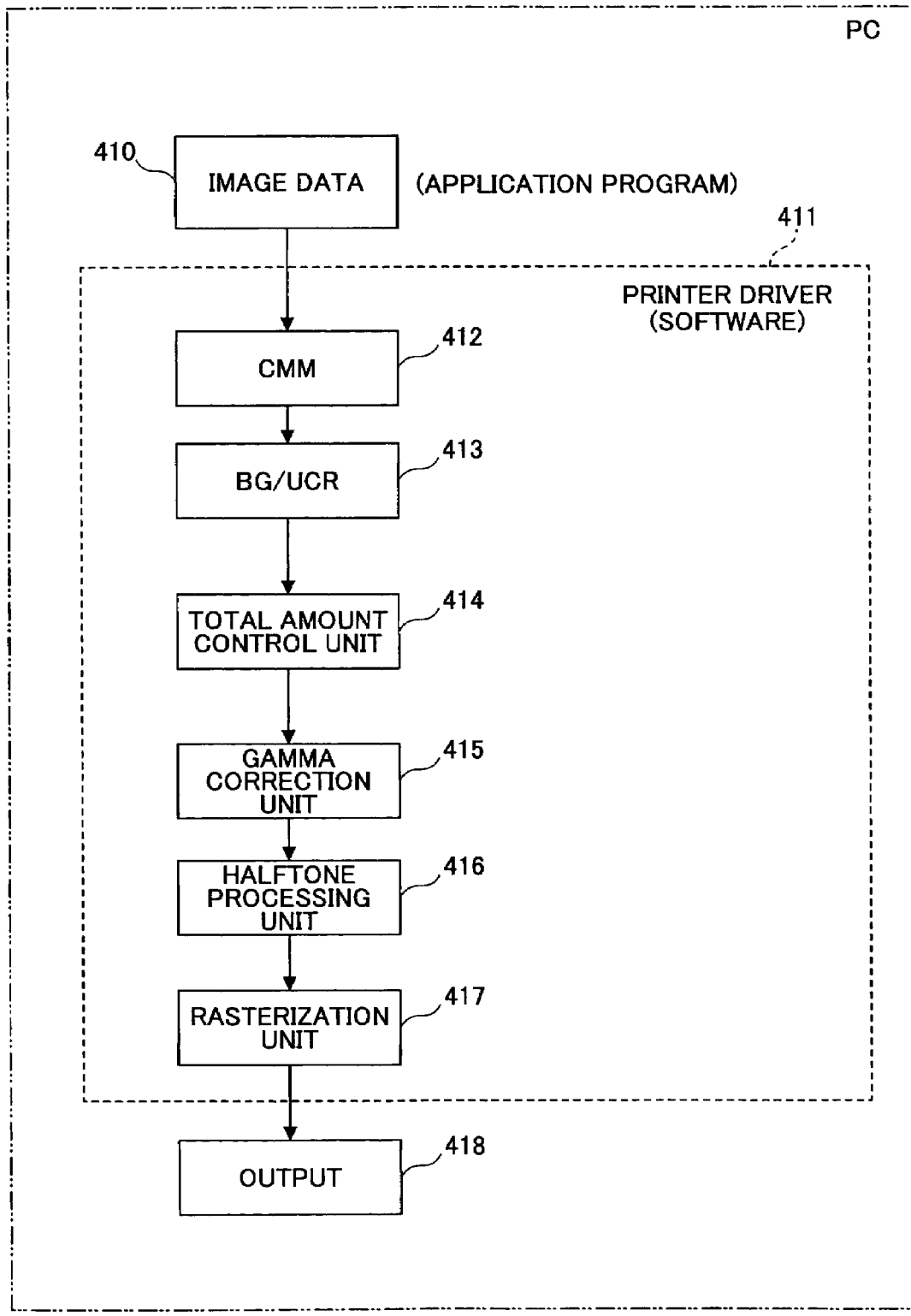
FIG. 8 is a block diagram illustrating the functional configuration of an exemplary printer driver according to an embodiment of the present invention.

FIG. 8 is a block diagram illustrating the functional configuration of an exemplary image processing program (printer driver), which runs on the image processing apparatus 400, according to an embodiment of the present invention.

A printer driver 411 of the image processing apparatus 400 includes a color management module (CMM) unit 412 that converts the color space of image data 410, which are provided, for example, from an application program, from the one for monitor display to the one for an image forming apparatus (from an RGB color system to a CMY color system); a black generation/under color removal (BG/UCR) unit 413 for black generation and under color removal; a total amount control unit 414 that corrects a CMYK signal, which is used as a record control signal, according to the maximum total amount of ink per unit area specified in an image forming apparatus; a gamma correction unit 415 that corrects input/output data to reflect the characteristics of an image forming apparatus or user preference; a zooming unit (not shown) that enlarges an image according to the resolution of an image forming apparatus; a halftone processing unit 416 including multi-valued and single-valued matrices for converting image data to dot pattern data to be formed by recording heads; and a rasterization unit 417 that divides the dot pattern data from the halftone processing unit 416 into portions each portion corresponding to one scan, and assigns dots in each portion of the dot pattern data to the nozzles of the recording heads. An output 418 from the rasterization unit 417 is sent to the ink jet printer 500.

Figure 9:
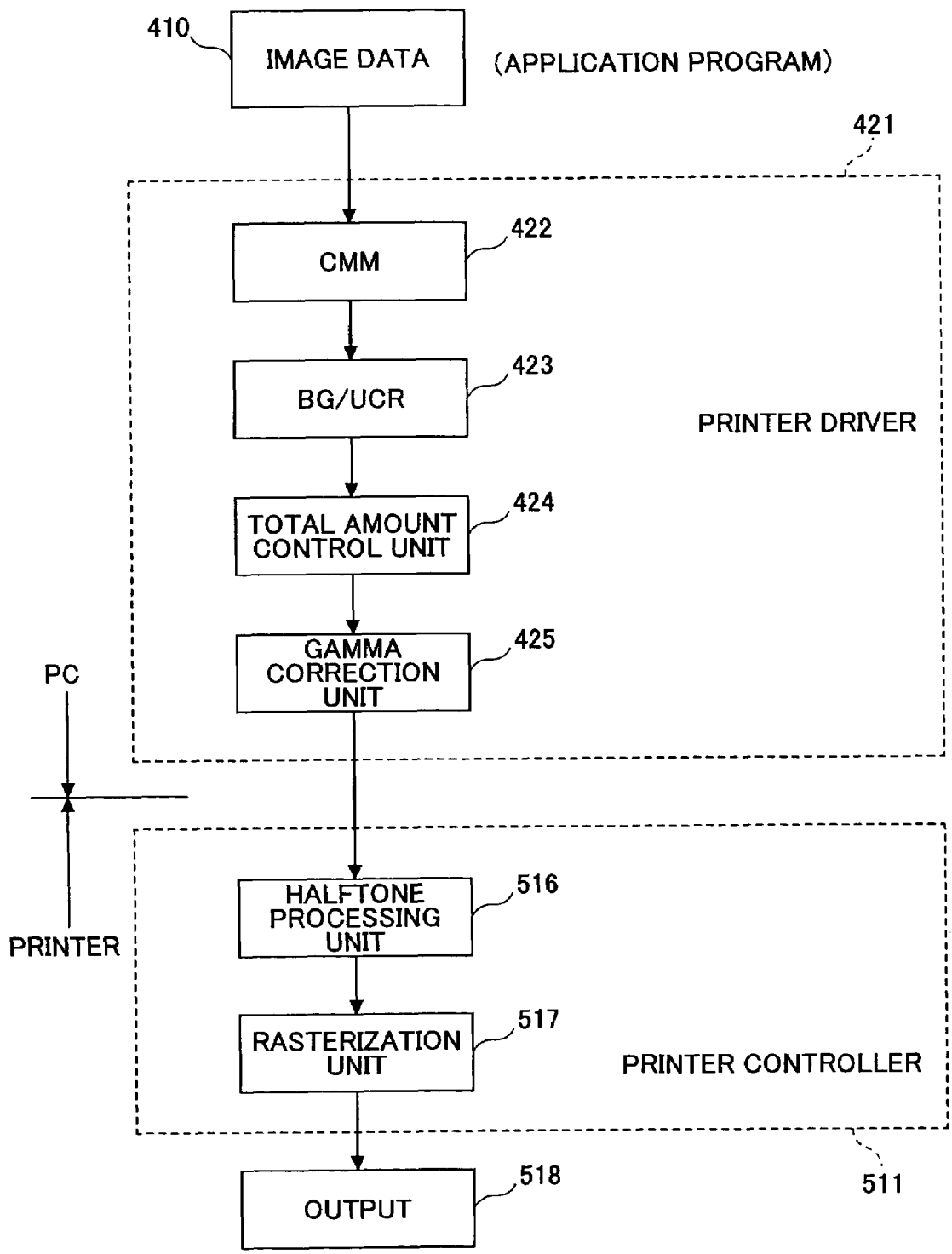
FIG. 9 is a block diagram illustrating the functional configuration of another exemplary printer driver according to an embodiment of the present invention.

A part of the above image processing may be performed on the ink jet printer 500. FIG. 9 is a block diagram illustrating the functional configuration of another exemplary printer driver according to an embodiment of the present invention.

In FIG. 9, a printer driver 421 of the image processing apparatus 400 includes a CMM unit 422, a BG/UCR unit 423, a total amount control unit 424, and a gamma correction unit 425 that have substantially the same functions as the units shown in FIG. 8. The printer driver 421 sends processed image data to the ink jet printer 500.

A printer controller 511 (control unit 200) of the ink jet printer 500 includes a zooming unit (not shown) that enlarges an image according to the resolution of an image forming apparatus; a halftone processing unit 516 including multi-valued and single-valued matrices for converting image data to dot pattern data to be formed by recording heads; and a rasterization unit 517 that divides the dot pattern data from the halftone processing unit 516 into portions each portion corresponding to one scan, and assigns dots in each portion of the dot pattern data to the nozzles of the recording heads. An output 518 from the rasterization unit 517 is sent to the print control unit 207.

In an image processing method according to an embodiment of the present invention, both the printer driver 411 shown in FIG. 8 and a combination of the printer driver 421 and the printer controller 511 shown in FIG. 9 may work well. In the descriptions below, it is assumed that the ink jet printer 500 does not include functions to generate dot pattern data from print data. In other words, print data from, for example, an application program being executed on the image processing apparatus 400 are converted into multi-valued dot pattern data (print image data) that can be printed on the ink jet printer 500 and rasterized by the printer driver 411 of the image processing apparatus 400. The rasterized dot pattern data are sent to the ink jet printer 500 and printed.

In the image processing apparatus 400, image or character print data (for example, data describing the positions, thicknesses, and shapes of lines to be recorded; or data describing fonts, sizes, and positions of characters to be recorded) from an application program or an operating system are temporarily stored in a drawing data memory. The print data are written in a page description language.

The print data stored in the drawing data memory is analyzed by a rasterizer. When the print data are to print lines, it is converted into dot pattern data according to the positions and thicknesses of lines specified in the print data. When the print data are to print characters, it is converted into dot pattern data according to the positions and thicknesses of characters specified in the print data by retrieving corresponding outline font data stored in the image processing apparatus 400. When the print data are to print an image, the image is directly converted into dot pattern data.

Image processing is performed on the dot pattern data (image data 410) and the processed dot pattern data are stored in a raster data memory. In this step, the image processing apparatus 400 rasterizes print data into dot pattern data using an orthogonal grid to determine the coordinates. As described above, image processing includes color management processing (by a CMM), gamma correction processing, halftone processing such as dithering and error diffusion, under color removal, and total amount control. The dot pattern data stored in the raster data memory are sent via an interface to the ink jet printer 500.

Figure 10:
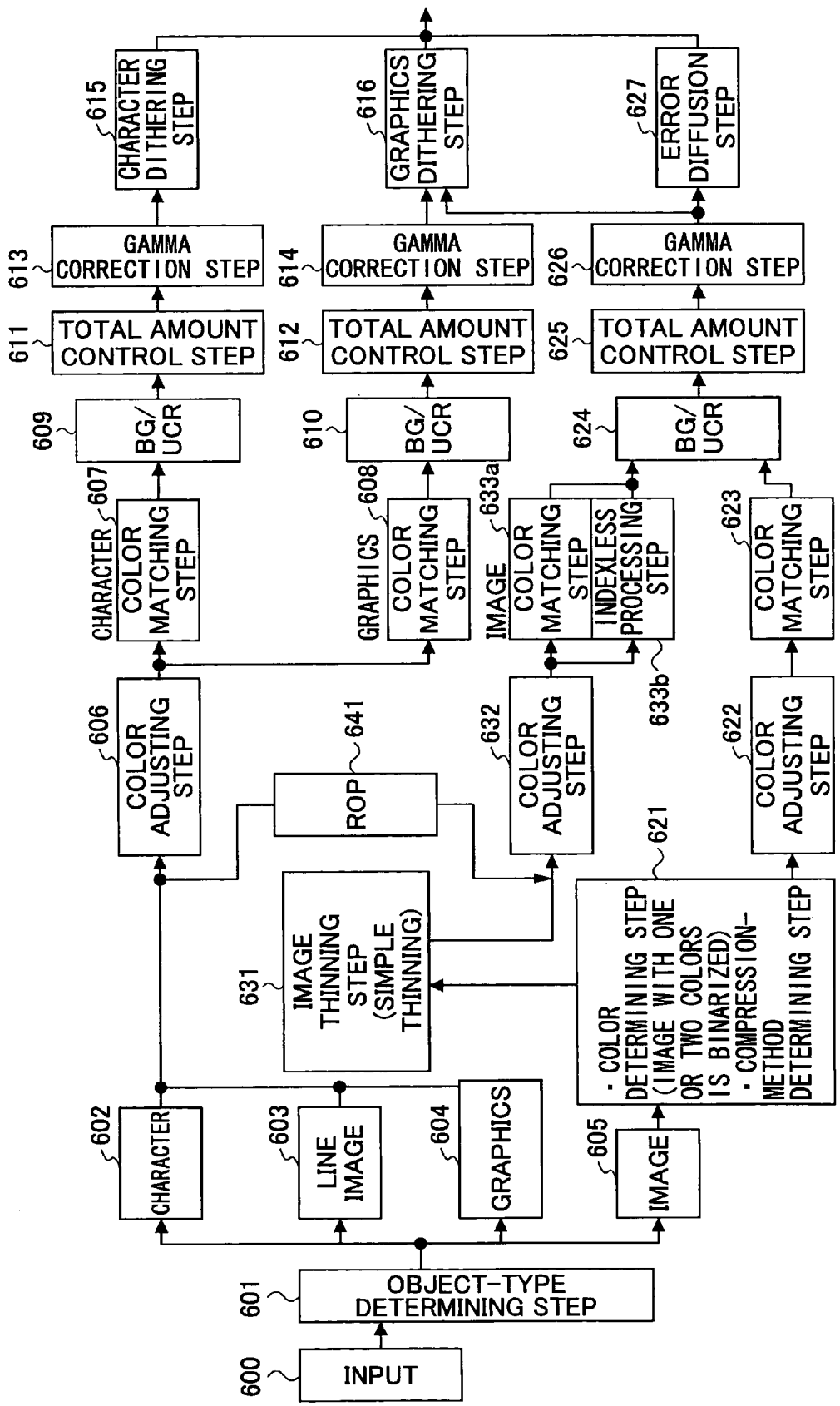
FIG. 10 is a block diagram illustrating exemplary image processing by the exemplary printer driver shown in FIG. 8.

Exemplary image processing performed by the printer driver 411 of the image processing apparatus 400 is described with reference to a block diagram shown in FIG. 10.

When a print instruction is output from an application program running on a data processing apparatus such as a personal computer, the printer driver 411 determines the types of objects in an input (image data) 600 of the print instruction in an object-type determining step 601. Each of the objects, character image data 602, line image data 603, graphics image data 604, and bitmap image data 605, is processed through a corresponding processing path.

On the character image data 602, the line image data 603, and the graphics image data 604, a color adjusting step 606 is first performed. On the character image data 602, a color matching step 607, a BG/UCR step 609, a total amount control step 611, a gamma correction step 613, and a character dithering (halftone processing) step 615 are further performed. On the line image data 603 and the graphics image data 604, a color matching step 608, a BG/UCR step 610, a total amount control step 612, a gamma correction step 614, and a graphics dithering (halftone processing) step 616 are further performed.

On the bitmap image data 605, a color and compression-method determining step 621 is first performed. When the bitmap image data 605 have more than two colors, a color adjusting step 622, a color matching step 623, a BG/UCR step 624, a total amount control step 625, a gamma correction step 626, and an error diffusion (halftone processing) step 627 are further performed. When the bitmap image data 605 have one or two colors, an image thinning step 631, a color adjusting step 632, a color matching step 633a or an indexless processing step 633b (processing where no color matching is performed), a BG/UCR step 624, a total amount control step 625, a gamma correction step 626, and an error diffusion (halftone processing) step 627 are further performed.

Also, the line image data 603 and the graphics image data 604 may be processed through a different processing path that branches to an ROP step 641. In this case, following the ROP step 641, the color adjusting step 632 and the subsequent steps are performed on the line image data 603 and the graphics image data 604.

After the above processing, all the objects are combined again into a single set of image data. A rasterizing step (not shown) is performed on the combined image data and the image data is sent to an image forming apparatus.

Commercial printing papers used as recording media in an image forming method, an image forming apparatus, and an image forming system according to embodiments of the present invention are described below.

Commercial printing papers include coated papers for offset printing, gravure printing, electrophotographic printing, and commercial ink jet printing.

An exemplary commercial printing paper as a recording medium is composed of a base material and at least one coating layer on a surface of the base material. Also, the exemplary commercial printing paper may have additional layers.

<Base Material>

Various materials may be used for the base material depending on the purpose of paper. For example, a sheet of paper mainly made of wood fibers and a nonwoven fabric mainly made of wood and synthetic fibers may be used.

A sheet of paper may be made of wood pulp or recycled pulp. Examples of wood pulp are leaf bleached kraft pulp (LBKP), needle bleached kraft pulp (NBKP), NBSP, LBSP, GP, and TMP.

As materials of recycled pulp, recycled papers in the list of standard qualities of recycled papers of the Paper Recycling Promotion Center may be used. For example, chemical pulp or high-yield pulp made of recycled papers may be used as the base material. Such recycled papers include printer papers such as non-coated computer paper, thermal paper, and pressure-sensitive paper; OA papers such as plain paper; coated papers such as art paper, ultra-lightweight coated paper, and matt paper; and non-coated papers such as bond paper, color bond paper, note paper, letter paper, warping paper, fancy paper, medium quality paper, newspaper, woody paper, supermarket flyers, simili paper, pure-white roll paper, and milk cartons. The above materials may be used individually or in combination.

Normally, recycled pulp is made by the following four steps:

(1) A defibrating step of breaking down used paper into fibers and separating ink from the fibers by using a mechanical force and a chemical in a pulper.

(2) A dust removing step of removing foreign substances (such as plastic) and dust in the used paper by using, for example, a screen and a cleaner.

(3) A deinking step of expelling the ink separated by a surfactant from the fibers by using a flotation method or a cleaning method.

(4) A bleaching-method of bleaching the fibers by oxidization or reduction.

When mixing recycled pulp with wood pulp, the percentage of recycled pulp is preferably 40% or lower so that produced paper does not curl after recording.

As an internal filler for the base material, a conventional white pigment may be used. For example, the following substances may be used as a white pigment: an inorganic pigment such as precipitated calcium carbonate, heavy calcium carbonate, kaolin, clay, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic silica, aluminum hydroxide, alumina, lithophone, zeolite, magnesium carbonate, or magnesium hydrate; and an organic pigment such as styrene plastic pigment, acrylic plastic pigment, polyethylene, microcapsule, urea resin, or melamine resin. The above substances may be used individually or in combination.

As an internal sizing agent used when producing the base material, a neutral rosin size used for neutral papermaking, alkenyl succinic anhydride (ASA), alkyl ketene dimer (AKD), or a petroleum resin size may be used. Especially, a neutral rosin size and alkenyl succinic anhydride are preferable. Alkyl ketene dimer has a high sizing effect and therefore provides an enough sizing effect with a small amount. However, since alkyl ketene dimer reduces the friction coefficient of the surface of recording paper (medium), recording paper made using alkyl ketene dimer may cause a slip when being conveyed in an ink jet recording apparatus.

<Coating Layer>

The coating layer contains a pigment and a binder, and may also contain a surfactant and other components.

As a pigment, an inorganic pigment or a mixture of an inorganic pigment and an organic pigment may be used.

For example, kaolin, talc, heavy calcium carbonate, precipitated calcium carbonate, calcium sulfite, amorphous silica, alumina, titanium white, magnesium carbonate, titanium dioxide, aluminum hydroxide, calcium hydrate, magnesium hydrate, zinc hydroxide, or chlorite may be used as an inorganic pigment. Especially, kaolin provides a high gloss surface similar to that of an offset paper and is therefore preferable. When a pigmented ink is used, since the colorant is dispersed in ink and stays on the surface of the coating layer, it is not necessary to mix a large amount of inorganic pigment having a low refractive index such as amorphous silica or alumina in the coating layer.

There are several types of kaolin, for example, delaminated kaolin, calcined kaolin, and engineered kaolin made by surface modification. To provide a high gloss surface, the mass percentage of a type of kaolin, in which 80 or more mass percent of particles have a diameter of 2 μm or smaller, in the total amount of kaolin is preferably 50 percent or more.

The mass ratio of the binder to kaolin in the coating layer is preferably 100:50. If the mass ratio of kaolin is lower than 50, sufficient glossiness may not be obtained. There is no specific limit to the amount of kaolin. However, when the fluidity and the thickening property of kaolin under a high shearing force are taken into account, the mass ratio of kaolin is preferably 90 or lower in terms of coatability.

As an organic pigment, a water-soluble dispersion of, for example, styrene-acrylic copolymer particles, styrene-butadiene copolymer particles, polystyrene particles, or polyethylene particles may be used. The above organic pigments may be used in combination.

The amount of an organic pigment in the total amount of pigment in the coating layer is preferably 2-20 mass percent. An organic pigment as described above has a specific gravity lower than that of an inorganic pigment and therefore provides a thick, high-gloss coating layer having a good coatability. If the mass percentage of an organic pigment is less than 2 percent, a desired effect is not obtained. If the mass percentage of an organic pigment is more than 20 percent, the fluidity of a coating liquid becomes too low and, as a result, the efficiency of a coating process decreases and the operational costs increase.

Organic pigments can be divided into several types according to their particle shapes: solid-shape, hollow-shape, and doughnut-shape. To achieve a good balance between the glossiness, coatability, and fluidity of a coating liquid, an organic pigment having hollow-shaped particles with a void percentage of 40 percent or higher and an average diameter of between 0.2 and 3.0 μm is preferable.

As a binder, a water-based resin is preferably used. As a water-based resin, a water-soluble resin or a water-dispersible resin may be used. Any type of water-based resin may be used depending on the purpose. For example, the following water-based resins may be used: polyvinyl alcohol; a modified polyvinyl alcohol such as anion-modified polyvinyl alcohol, cation-modified polyvinyl alcohol, or acetal-modified polyvinyl alcohol; polyurethane; polyvinyl pyrrolidone; a modified polyvinyl pyrrolidone such as polyvinyl pyrrolidone-vinyl acetate copolymer, vinyl pyrrolidone-dimethylaminoethyl methacrylate copolymer, quaternized vinyl pyrrolidone-dimethylaminoethyl methacrylate copolymer, or vinyl pyrrolidone-methacrylamide propyl trimethyl ammonium chloride copolymer; cellulose such as carboxymethyl cellulose, hydroxyethyl cellulose, or hydroxypropylcellulose; modified cellulose such as cationized hydroxyethyl cellulose; polyester, polyacrylic acid (ester), melamine resin, or modified versions of these substances; synthetic resin made of polyester-polyeurethane copolymer; and other substances such as poly(metha)acrylic acid, poly(metha)acrylamide, oxidized starch, phosphorylated starch, self-denatured starch, cationized starch, other modified starches, polyethylene oxide, polyacrylic acid soda, and alginic acid soda. The above substances may be used individually or in combination.

Among the above substances, polyvinyl alcohol, cation-modified polyvinyl alcohol, acetal-modified polyvinyl alcohol, polyester, polyurethane, and polyester-polyeurethane copolymer are especially preferable in terms of ink-absorption rate.

Any type of water-dispersible resin may be used depending on the purpose. For example, the following water-dispersible resins may be used: polyvinyl acetate, ethylene-polyvinyl acetate copolymer, polystyrene, styrene-(metha)acrylic ester copolymer, (metha)acrylic ester polymer, polyvinyl acetate-(metha)acrylic acid (ester) copolymer, styrene-butadiene copolymer, an ethylene-propylene copolymer, polyvinyl ether, and silicone-acrylic copolymer. A water-dispersible resin may contain a cross-linking agent such as methylol melamine, methylol hydroxypropylene urea, or isocyanate. Also, a self-crosslinking copolymer containing a unit of methylol acrylamide may be used as a water-dispersible resin. Two or more of the water-dispersible resins described above may be used at the same time.

The mass ratio of the water-based resin to the pigment in the coating layer is preferably 2:100 to 100:100, and more preferably 3:100 to 50:100. The amount of the water-based resin in the coating layer is determined so that the liquid-absorption rate of a recording medium falls within a specific range.

When a water-dispersible colorant is used, whether to mix a cationic organic compound in the binder is optional. For example, primary to tertiary amines that react with sulfonic groups, carboxyl groups, or amino groups of a direct dye or an acid dye in a water-soluble ink, and form insoluble salt; or a monomer, oligomer, or polymer of quarternary ammonium salt may be used. Among them, an oligomer and a polymer of quarternary ammonium salt are especially preferable.

As a cationic organic compound, the following substances may be used: dimethylamine-epichlorohydrin polycondensate, dimethylamine-ammonia-epichlorohydrin condensate, poly (trimethyl aminoethyl-methacrylate methylsulfate), diallylamine hydrochloride-acrylamide copolymer, poly (diallylamine hydrochloride-sulfur dioxide), polyallylamine hydrochloride, poly (allylamine hydrochlorid-diallylamine hydrochloride), acrylamide-diallylamine copolymer, polyvinylamine copolymer, dicyandiamide, dicyandiamide-ammonium chloride-urea-formaldehyde condensate, polyalkylene polyamine-dicyandiamide ammonium salt consensate, dimethyl diallyl ammonium chloride, poly diallyl methyl amine hydrochloride, poly (diallyl dimethyl ammonium chloride), poly (diallyl dimethyl ammonium chloride-sulfur dioxide), poly (diallyl dimethyl ammonium chloride-diallyl amine hydrochloride derivative), acrylamide-diallyl dimethyl ammonium chloride copolymer, acrylate-acrylamide-diallyl amine hydrochloride copolymer, polyethylenimine, ethylenimine derivative such as acrylamine polymer, and modified polyethylenimine alkylene oxide. The above substances may be used individually or in combination.

It is preferable to use a cationic organic compound with a low-molecular weight such as dimethylamine-epichlorohydrin polycondensate or polyallylamine hydrochloride and a cationic organic compound with a relatively-high molecular weight such as poly (diallyl dimethyl ammonium chloride) in combination. Compared with a case where only one cationic organic compound is used, using cationic organic compounds in combination improves image density and reduces feathering.

The equivalent weight of cation in a cationic organic compound obtained by the colloid titration method (performed using polyvinyl potassium sulfate and toluidine blue) is preferably between 3 and 8 meq/g. With an equivalent weight in the above range, the dry deposit mass of the cationic organic compound falls within a preferable range.

In the measurement of the equivalent weight of cation, the cationic organic compound is diluted with distilled water so that the solid content in the solution becomes 0.1 mass percent. No pH control is performed.

The dry deposit mass of the cationic organic compound is preferably between 0.3 and 2.0 $g/m^2$. If the dry deposit mass of the cationic organic compound is lower than 0.3 $g/m^2$, sufficient improvement in image density and sufficient reduction in feathering may not be achieved.

Any surfactant may be used depending on the purpose. For example, an anion surfactant, a cation surfactant, an amphoteric surfactant, or a nonionic surfactant may be used. Among the above surfactants, a nonionic surfactant is especially preferable. Adding a surfactant improves water resistance and density of an image, and thereby reduces bleeding.

For example, the following nonionic surfactants may be used: higher alcohol ethylene oxide adduct, alkylphenol ethylene oxide adduct, fatty acid ethylene oxide adduct, polyhydric alcohol fatty acid ester ethylene oxide adduct, higher aliphatic amine ethylene oxide adduct, fatty acid amide ethylene oxide adduct, fatty oil ethylene oxide adduct, ethylene oxide adduct of fat, polypropylene glycol ethylene oxide adduct, glycerol fatty acid ester, pentaerythritol fatty acid ester, sorbitol-sorbitan fatty acid ester, sucrose fatty acid ester, polyhydric alcohol alkyl ether, and alkanolamine fatty acid amide. The above substances may be used individually or in combination.

Polyhydric alcohol is not limited to a specific type and any type of polyhydric alcohol may be used depending on the purpose. For example, glycerol, trimethylolpropane, pentaerythrite, sorbitol, or sucrose may be used. Ethylene oxide adduct may be made by replacing a part of ethylene oxide with an alkylene oxide such as propylene oxide or butylene oxide to the extent that the water solubility is not affected. The percentage of the replaced part is preferably 50 percent or lower. The hydrophile-lipophile balance (HLB) of a nonionic surfactant is preferably between 4 and 15, and more preferably between 7 and 13.

The mass ratio of the surfactant to the cationic organic compound is preferably 0:100 to 10:100, and more preferably 0.1:100 to 1:100.

Other components may also be added to the coating layer to the extent that its advantageous effects are not undermined. Examples of other components include additives such as an alumina powder, a pH adjuster, an antiseptic agent, and an antioxidant.

The method of forming the coating layer is not limited to a specific method. For example, the coating layer may be formed by impregnating the base material with a coating liquid or by applying a coating liquid to the base material. For the impregnation or application of a coating liquid, a coater such as a conventional size press, a gate roll size press, a film transfer size press, a blade coater, a rod coater, an air knife coater, or a curtain coater may be used. Also, using a conventional size press, a gate roll size press, or a film transfer size press attached to a paper machine for the impregnation or application of a coating liquid may improve the efficiency of the process.

There is no specific limit to the amount of a coating liquid on the base material. However, the solid content of a coating liquid on the base material is preferably between 0.5 and 20 g/m$^2$, and more preferably between 1 and 15 g/m$^2$.

After the impregnation or application of a coating liquid, the coating liquid may be dried. The temperature for this drying process is preferably between 100 and 250° C., but is not limited to the specific range.

The exemplary commercial printing paper may also have a back layer on the back of the base material, and other layers between the base material and the coating layer or between the base material and the back layer. Also, a protective layer may be provided on the coating layer. Each of the layers may be composed of one layer or multiple layers.

In the embodiments of the present invention, a recording medium as described above is called a commercial printing paper.

Normally, solvent ink is used to print on a commercial printing paper. However, since solvent ink has high penetration capability, when used for a different type of paper, the ink may penetrate through the paper and appear on the back of the paper or may cause bleeding over time. Unlike in a commercial printing system, using solvent ink in an ink jet recording system for office and home users may cause the above problem.

The results of evaluating the characteristics of an exemplary commercial printing paper for water-based ink are described below. In the evaluation, pure water was used.

In an environmental condition of 23° C. and 50% RH, the exemplary commercial printing paper was brought into contact with pure water for 100 ms and the amount of the pure water transferred onto the exemplary commercial printing paper was measured by a dynamic scanning absorptometer. The amount of transferred pure water was between 2 and 35 ml/m$^2$. To obtain a practical print quality, the value is preferably between 4 and 26 ml/m$^2$.

When the amount of transferred pure water or ink at a contact time of 100 ms is smaller than the preferable range, beading may occur. When the amount is larger than the preferable range, the diameter of a recorded ink dot may become smaller than a preferable diameter.

When the exemplary commercial printing paper was brought into contact with pure water for 400 ms, the amount of transferred pure water measured by the dynamic scanning absorptometer was between 3 and 40 ml/m$^2$. To obtain a practical print quality, the value is preferably between 5 and 29 ml/m$^2$.

When the amount of transferred pure water or ink at a contact time of 400 ms is smaller than the preferable range, drying property becomes insufficient and spur marks may appear. When the amount is larger than the preferable range, the glossiness of an image after dried may become low.

The dynamic scanning absorptometer (DSA: JAPAN TAPPI JOURNAL, Volume 48, May 1994, pp. 88-92, Shigenori Kuga) is an apparatus that can accurately measure the amount of a liquid absorbed during a very short period of time. The dynamic scanning absorptometer directly reads the absorption speed of a liquid from the movement of a meniscus in a capillary and automatically measures the amount of the liquid absorbed. The test sample is shaped like a disc. The dynamic scanning absorptometer scans the test sample by moving an liquid-absorbing head spirally over the test sample and thereby measures the amount of the liquid absorbed at as many points as necessary. The scanning speed is automatically changed according to a predetermined pattern. A liquid supplying head that supplies liquid to the test sample is connected via a Teflon (registered trademark) tube to the capillary. Positions of the meniscus in the capillary are automatically detected by an optical sensor. In the above experiment, a dynamic scanning absorptometer (K350 series, type D, Kyowa Co., Ltd.) was used to measure the amount of transferred pure water or ink. The amount of transferred pure water or ink at a contact time of 100 ms or 400 ms is obtained by interpolation, using the transferred amounts measured at time points around each contact time. The results of the experiment are shown in table 1 below.

TABLE 1

| | Pure water | |
| --- | --- | --- |
| | Contact time: 100 ms | Contact time: 400 ms |
| Coated paper for offset printing (brand name: Aurora Coat, grammage = 104.7 g/m$^2$, Nippon Paper Industries Co., Ltd.) <Embodiment> | 2.8 | 3.4 |
| Coated paper for electrophotographic printing (brand name: POD Gloss Coat, grammage = 100 g/m$^2$, Oji paper Co., Ltd.) <Embodiment> | 3.1 | 3.5 |
| Matt coated paper for ink jet printing (brand name: Superfine, Seiko Epson Corporation) <Comparative example> | 41.0 | 44.8 |

High penetration pigmented inks (pigmented inks) used in an image forming method, an image forming apparatus, and an image forming system according to embodiments of the present invention are described below.

The following pigments are preferably used for pigmented inks. However, other pigments may also be used. The pigments may be used individually or in combination.

For example, the following organic pigments may be used: azo series, phthalocyanine series, anthraquinone series, quinacridone series, dioxazine series, indigo series, thioindigo series, perylene series, isoindolinon series, aniline black, azomethine series, rhodamine B lake pigment, and carbon black.

Also, the following inorganic pigments may be used: iron oxide, titanium oxide, calcium carbonate, barium sulfate, aluminum hydroxide, barium yellow, iron blue, cadmium red, chrome yellow, and metallic flake.

The diameter of pigment particles is preferably between 0.01 and 0.30 μm. When the diameter is smaller than 0.01 μm, the size of pigment particles is close to that of dye particles. Such a pigment provides low light resistance and causes feathering. When the diameter of pigment particles is larger than 0.30 μm, the pigment particles may clog ink jet nozzles or filters in a printer and reduces spray stability.

Preferably, a carbon black pigment for a black pigmented ink is made by a furnace method and a channel method, and has a primary diameter of 15-40 millimicron, a BET specific surface area of 50-300 $m^2/g$, a DBP oil absorption of 40-150 ml/100 g, a volatile matter content of 0.5-10%, and a pH value of 2-9. For example, the following carbon black pigments may be used: No. 2300, No. 900, MCF-88, No. 33, No. 40, No. 45, No. 52, MA7, MA8, MA100, No. 2200B (Mitsubishi Chemical Corporation); Raven 700, Raven 5750, Raven 5250, Raven 5000, Raven 3500, Raven 1255 (Columbian Chemicals Company); Regal 400R, Regal 330R, Regal 660R, MogulL, Monarch 700, Monarch 800, Monarch 880, Monarch 900, Monarch 1000, Monarch 1100, Monarch 1300, Monarch 1400 (Cabot Corporation); Color black FW1, Color black FW2, Color black FW2V, Color black FW18, Color black FW200, Color black S150, Color black S160, Color black S170, Printex 35, Printex U, Printex V, Printex 140U, Printex 140V, Special black 6, Special black 5, Special black 4A, and Special black 4 (Degussa).

Examples of color pigments are listed below.

The following organic pigments may be used: azo series, phthalocyanine series, anthraquinone series, quinacridone series, dioxazine series, indigo series, thioindigo series, perylene series, isoindolinon series, aniline black, azomethine series, rhodamine B lake pigment, and carbon black. Also, the following inorganic pigments may be used: iron oxide, titanium oxide, calcium carbonate, barium sulfate, aluminum hydroxide, barium yellow, iron blue, cadmium red, chrome yellow, and metallic flake.

Examples of pigments for each color are listed below.

The following pigments may be used for yellow ink: CI pigment yellow 1, 2, 3, 12, 13, 14, 16, 17, 73, 74, 75, 83, 93, 95, 97, 98, 114, 128, 129, 151, and 154.

The following pigments may be used for magenta ink: CI pigment red 5, 7, 12, 48 (Ca), 48 (Mn), 57 (Ca), 57:1, 112, 123, 168, 184, and 202.

The following pigments may be used for cyan ink: CI pigment blue 1, 2, 3, 15:3, 15:34, 16, and 22; and CI vat blue 4 and 60.

A pigment newly manufactured for the present invention may also be used for each color ink.

An ink jet recording liquid may be produced by dispersing one of the above pigments in an aqueous medium using a polymeric dispersing agent or a surfactant. As a dispersing agent for dispersing organic pigment powder, a water-soluble resin or a water-soluble surfactant may be used.

As a water-soluble resin, a block copolymer, a random copolymer, or salt made of two or more monomers selected from a group including styrene, styrene derivative, aliphatic alcohol ester of α, β-ethylene unsaturated carboxylic acid, acrylic acid, acrylic acid derivative, maleic acid, maleic acid derivative, itaconic acid, itaconic acid derivative, fumarate, and fumarate derivative may be used. The above water-soluble resins are alkali-soluble resins that are soluble in water solution of a base. A water-soluble resin with a weight-average molecular weight of 3000-20000 is easily dispersible, is able to provide a dispersion liquid with a low viscosity, and is therefore especially preferable for an ink jet recording liquid.

Also, a combination of a polymeric dispersing agent and a self-dispersing pigment is preferable to obtain an appropriate dot diameter. A possible reason why such a combination provides a preferable result is described below.

Mixing a polymeric dispersing agent in an ink suppresses the penetration capability of the ink. Also, mixing a polymeric dispersing agent prevents aggregation of a self-dispersing pigment and helps the self-dispersing pigment to spread smoothly in the horizontal direction. As a result, an ink dot spreads thin and wide. An ink with such characteristics makes it possible to form a desirable dot.

As a water-soluble surfactant, the following substances may be used: anionic surfactants such as higher fatty acid salt, alkyl sulfate, alkyl ether sulfate, alkyl ester sulfate, alkyl arylether sulfate, alkyl sulfonate, sulfosuccinate, alkyl allyl and alkyl naphthalene sulfonate, alkyl phosphate, polyoxyethylene alkyl ether phosphate ester salt, alkyl allyl ether phosphate; cationic surfactants such as alkyl amine salt, dialkyl amine salt, tetraalkyl ammonium salt, benzalkonium salt, alkyl pyridinium salt, imidazolinium salt; amphoteric surfactants such as dimethyl alkyl lauryl betaine, alkyl glycine, alkyldi (aminoethyl) glycine, imidazolinium betaine; and nonionic surfactants such as polyoxyethylene alkyl ether, polyoxyethylene alkyl allyl ether, polyoxyethylene polyoxypropylene glycol, glycerin ester, sorbitan ester, sucrose esters, polyoxyethylene ether of glycerin ester, polyoxyethylene ether of sorbitan ester, polyoxyethylene ether of sorbitol ester, fatty acid alkanolamide, polyoxyethylene fatty acid amide, amine oxide, and polyoxyethylene alkylamine.

A pigment may be microencapsulated by coating it with a resin having a hydrophilic radical. Microencapsulating gives the pigment dispersibility.

Any of conventional methods may be used to coat a water-insoluble pigment with an organic polymer and thereby to microencapsulate the water-insoluble pigment. Such conventional methods include chemical manufacturing methods, physical manufacturing methods, physicochemical manufacturing methods, and mechanical manufacturing methods. For example, the following methods may be used:

Interface polymerization method: two types of monomers or two types-of reactants are dissolved in a disperse phase and a continuous phase separately, and are caused to react with each other at the interface between the two phases and thereby to form wall membranes.

In-situ polymerization method: aqueous or gaseous monomers and catalysts or two types of reactive substances are supplied from either the continuous phase side or the nuclear particle side, and are caused to react with each other and thereby to form wall membranes.

In-liquid curing coating method: wall membranes are formed by insolubilizing drops of polymer solution containing core material particles in a liquid using a curing agent.

Coacervation (phase separation) method: wall membranes are formed by separating a polymer dispersed liquid, where core material particles are dispersed, into coacervate (dense phase) with a high polymer concentration and a dilute phase.

In-liquid drying method: a core material is dispersed in a solution of a wall membrane material, the core material dispersed liquid is put in another liquid, in which the continuous phases of the core material dispersed liquid do not blend, to form a multiple emulsion, then the medium in which the wall membrane material is dissolved is gradually removed to form wall membranes.

Melting-dispersion-cooling process: a wall membrane material that melts when heated and solidifies at normal temperature is liquefied by heating, core material particles are dispersed in the resulting liquid, and then the liquid is changed into fine particles and cooled to form wall membranes.

In-air suspension coating method: powder of core material particles are suspended in air using a fluid bed, and a coating liquid used as a wall membrane material is sprayed in the air to form wall membranes.

Spray drying method: an undiluted encapsulation liquid is sprayed and brought into contact with heated air to evaporate its volatile matter content and thereby to form wall membranes.

Acidification deposition method: an organic polymer, at least a part of the anionic groups of which is neutralized with a basic compound to give it water solubility, is kneaded together with a colorant in an aqueous medium, neutralized or acidified using an acidic compound so that the organic polymer is deposited and fixed to the colorant, and then neutralized again and dispersed.

Phase inversion emulsification: water is put in an organic solvent phase made of a mixture of a colorant and an anionic organic polymer having water dispersibility, or the organic solvent phase is put in water.

As a material for the wall membrane of a microcapsule, the following organic polymers (resins) may be used: polyamide, polyurethane, polyester, polyurea, epoxy resin, polycarbonate, urea resin, melamine resin, phenolic resin, polysaccharide, gelatin, acacia gum, dextran, casein, protein, natural rubber, carboxypolymethylene, polyvinyl alcohol, polyvinyl pyrrolidone, polyvinyl acetate, polyvinyl chloride, polyvinylidene chloride, cellulose, ethyl cellulose, methyl cellulose, cellulose nitrate, hydroxyethyl cellulose, cellulose acetate, polyethylene, polystyrene, polymer or copolymer of (metha)acrylic acid, polymer or copolymer of (metha)acrylic acid ester, (metha)acrylic acid-(metha)acrylic acid ester copolymer, styrene-(metha)acrylic acid copolymer, styrene-maleic acid copolymer, alginic acid soda, fatty acid, paraffin, bees wax, water wax, hardened tallow, carnauba wax, and albumin.

Among the above organic polymers, ones having an anionic group such as a carboxylic group or a sulfonic group may be used. Also, nonionic organic polymers such as polyvinyl alcohol, polyethylene glycol monomethacrylate, polypropylene glycol monomethacrylate, methoxypolyethylene glycol monomethacrylate, (co)polymers of the preceding substances, and cationic ring-opening polymer of 2-oxazoline may be used. Completely saponified polyvinyl alcohol has a low water solubility (it is easily soluble in hot water but not in cold water) and therefore is especially preferable.

The amount of an organic polymer in a wall membrane material for microencapsulation is preferably 1-20 mass percent of a water-insoluble colorant such as an organic pigment or carbon black. Keeping the amount of an organic polymer coating the surface of a pigment within the above range prevents the organic polymer from inhibiting the color development of the pigment. When the amount of an organic polymer is less than 1 mass percent, the effect of encapsulation becomes insufficient. When the amount of an organic polymer is more than 20 mass percent, the color development of a pigment is inhibited. If other factors are also taken into account, the amount of an organic polymer is more preferably 5-10 mass percent of a water-insoluble colorant.

With the amount of an organic polymer within the above range, a part of a colorant is virtually not coated or virtually exposed, and therefore the color development of the colorant is not inhibited. From a different point of view, a colorant is virtually coated or virtually not exposed, and therefore a sufficient encapsulation effect can be obtained. The number average molecular weight of an organic polymer is preferably 2000 or more to efficiently perform encapsulation.

Using a self-dispersing organic pigment or a self-dispersing carbon black as a colorant provides high dispersibility to a microencapsulated pigment even when the content of an organic polymer in a capsule is relatively low. Therefore, a self-dispersing organic pigment and a self-dispersing carbon black are preferable as colorants to provide sufficient preservation stability to an ink.

It is preferable to select an appropriate organic polymer depending on the method of microencapsulation. For the interface polymerization method, for example, polyester, polyamide, polyurethane, polyvinyl pyrrolidone, and epoxy resin are preferable. For the in-situ polymerization method, polymer or copolymer of (metha)acrylic acid ester, (metha)acrylic acid-(metha)acrylic acid ester copolymer, styrene-(metha)acrylic acid copolymer, polyvinyl chloride, polyvinylidene chloride, and polyamide are preferable. For the in-liquid curing coating method, alginic acid soda, polyvinyl alcohol, gelatin, albumin, and epoxy resin are preferable. For the coacervation method, gelatin, cellulose, and casein are preferable. Other microencapsulation methods may also be used to obtain a fine, and uniform microencapsulated pigment.

For the phase inversion emulsification method and the acidification deposition method, anionic organic polymers may be used. In the phase inversion emulsification method, a mixture of an anionic organic polymer having self-dispersibility or solubility in water and a colorant such as a self-dispersing organic pigment or a self-dispersing carbon black; or a mixture of a colorant such as a self-dispersing organic pigment or a self-dispersing carbon black, a curing agent, and an anionic organic polymer, is used as an organic solvent phase. Water is put in the organic solvent phase or the organic solvent phase is put in water. The organic solvent phase self-disperses (inversion emulsification) and the colorant is microencapsulated. In the phase inversion emulsification method, a recording liquid vehicle or additives may also be mixed in the organic solvent phase. To directly produce a dispersion liquid for a recording liquid, it is preferable to mix a recording liquid medium.

In the acidification deposition method, a part or all of the anionic group of an organic polymer is neutralized with a basic compound; the organic polymer is kneaded together with a colorant such as a self-dispersing organic pigment or a self-dispersing carbon black in an aqueous medium; and the pH of the organic polymer is neutralized or acidified using an acidic compound so that the organic polymer is deposited and fixed to the colorant. Then, a part or all of the anionic groups of the resulting hydrated cake is neutralized with a basic compound so that the colorant is microencapsulated. As a result, an aqueous dispersion liquid containing fine microencapsulated anionic pigment is produced.

As a solvent in the above described microencapsulation methods, the following substances may be used: an alkyl alcohol such as methanol, ethanol, propanol, or butanol; an aromatic hydrocarbon such as benzole, toluole, or xylole; an ester such as methyl acetate, ethyl acetate, or butyl acetate; a chlorinated hydrocarbon such as chloroform or ethylene dichloride; a ketone such as acetone or methyl isobutyl ketone; an ether such as tetrahydrofuran or dioxane; and a cellosolve such as methyl cellosolve or butyl cellosolve. Microcapsules prepared as described above are separated from the solvent by centrifugation or filtration. The separated microcapsules are stirred together with water and a solvent to form a recording liquid. The average particle diameter of a microencapsulated pigment prepared as described above is preferably between 50 and 180 nm.

Such a pigment coated with a resin as described above adheres firmly onto a recording medium and thereby improves abrasion resistance of a printed matter.

To obtain a recording liquid with a desirable property or to prevent clogging of recording head nozzles, it is preferable to mix a water-soluble organic solvent in addition to a colorant. As a water-soluble organic solvent, a humectant or a penetrant may be used. A humectant is used to prevent clogging of recording head nozzles caused by drying. As a humectant, the following substances may be used: a polyhydric alcohol such as ethylene glycol, diethylene glycol, triethylene glycol, tetraethylene glycol, polyethylene glycol, propylene glycol, 1,3-butanediol, 1,3-propanediol, 2-methyl-1,3-propanediol, 1,4-butanediol, 1,5-pentanediol, 1,6-hexanediol, glycerin, 1,2,6-hexanetriol, 2-ethyl-1,3-hexanediol, 1,2,4-butanetriol, 1,2,3-butanetriol, or petriol; a polyhydric alcohol alkyl ether such as ethylene glycol monoethyl ether, ethylene glycol monobutyl ether, diethylene glycol monomethyl ether, diethylene glycol monoethyl ether, diethylene glycol monobutyl ether, triethylene glycol monobutyl ether, tetraethylene glycol monomethyl ether, or propylene glycol monoethyl ether; a polyhydric alcohol aryl ether such as ethylene glycol monophenyl ether or ethylene glycol monobenzyl ether; a nitrogen containing heterocyclic compound such as N-methyl-2-pyrrolidone, N-hydroxyethyl-2-pyrrolidone, 2-pyrrolidone, 1,3-dimethyl imidazolidinone, or $\epsilon$-caprolactam; an amide such as formamide, N-methylformamide, or N,N-dimethylformamide; an amine such as monoethanolamine, diethanolamine, triethanolamine, monoethylamine, diethylamine, or triethylamine; a sulfur-containing compound such as dimethyl sulfoxide, sulfolane, or thiodiethanol; propylene carbonate; ethylene carbonate; and $\gamma$-butyrolactone. The above solvents are mixed with water and may be used individually or in combination.

A penetrant is used to improve the wettability between a recording liquid and a recording medium and to adjust the infiltration rate of a recording liquid. As penetrants, surfactants represented by chemical formulas (I) through (IV) and (A) are preferable. Surfactants such as a polyoxyethylene alkyl phenyl ether surfactant represented by chemical formula (I), a acetylene glycol surfactant represented by chemical formula (II), a polyoxyethylene alkyl ether surfactant represented by chemical formula (III), a polyoxyethylene polyoxypropylene alkyl ether surfactant represented by chemical formula (IV), and a fluorinated surfactant represented by chemical formula (A) reduce the surface tension of a recording liquid, thereby improving the wettability between the recording liquid and a recording medium and increasing the infiltration rate of the recording liquid.

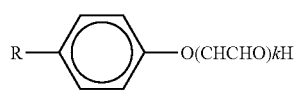
(I)

(R indicates a hydrocarbon chain with 6-14 carbon atoms. The hydrocarbon chain may be branched. k is between 5 and 20.)

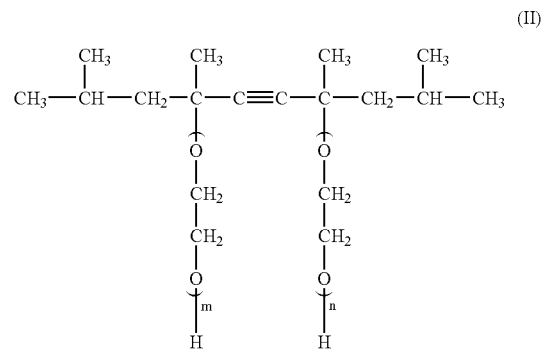
(II)

(m and n are between 0 and 40.)

$$R-(OCH_2CH_2)nH \quad (III)$$

(R indicates a hydrocarbon chain with 6-14 carbon atoms. The hydrocarbon chain may be branched. n is between 5 and 20.)

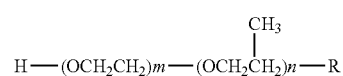
(IV)

(R indicates a hydrocarbon chain with 6-14 carbon atoms. m and n are 20 or smaller numbers.)

$$CF_3CF_2(CF_2CF_2)m\text{-}CH_2CH_2O(CH_2CH_2O)nH \quad (A)$$

(m is an integer between 0 and 10, and n is an integer between 1 and 40.)

In addition to the surfactants represented by chemical formulas (I) through (IV) and (A), the following substances may be used: a polyhydric alcohol alkyl ether or a polyhydric alcohol aryl ether such as ethylene glycol monophenyl ether, ethylene glycol monoallyl ether, diethylene glycol monophenyl ether, diethylene glycol monobutyl ether, propylene glycol monobutyl ether, or tetraethylene glycol chlorophenyl ether; a nonionic surfactant such as polyoxyethylene polyoxypropylene block copolymer; a fluorinated surfactant; and a lower alcohol such as ethanol or 2-propanol. Among them, a fluorinated surfactant is especially preferable.

As a fluorinated surfactant, perfluoroalkyl sulfonate, perfluoroalkyl carboxylate, perfluoroalkyl phosphate ester, perfluoroalkyl ethylene oxide adduct, perfluoroalkyl betaine, or perfluoroalkyl amine oxide compound may be used. Especially, the fluorinated surfactant represented by chemical formula (A) is preferable in terms of reliability. The following fluorine compounds are commercially available and may be used as fluorinated surfactants: Surflon S-111, S-112, S-113, S121, S131, S132, S-141, and S-145 (Asahi Glass Co., Ltd.); Fluorad FC-93, FC-95, FC-98, FC-129, FC-135, FC-170C, FC-430, FC-431, and FC-4430 (Sumitomo 3M Limited); Megafac F-470, F-1405, and F-474 (Dainippon Ink and Chemicals, Incorporated); Zonyl FS-300, FSN, FSN-100, and FSO (DuPont); and EFTOP EF-351, EF-352, EF-801, and EF802 (JEMCO Inc.). Among them, Zonyl FS-300, FSN, FSN-100, and FSO (DuPont) are especially preferable in terms of reliability and color development.

The surface tension of a recording liquid (ink) used in an image forming method according to an embodiment of the present invention is preferably 35 mN/m or lower.

The viscosity of a recording liquid (ink) used in an image forming method according to an embodiment of the present invention is preferably between 1.0 and 20.0 cP, and more preferably between 3.0 and 10.0 cP for stable spray performance.

The pH of a recording liquid (ink) used in an image forming method according to an embodiment of the present invention is preferably between 3 and 11, and more preferably between 6 and 10 to prevent corrosion of metallic parts that contact the recording liquid.

A recording liquid may also contain an antiseptic or a fungicide. Mixing an antiseptic or a fungicide prevents growth of bacteria, improves preservation stability, and thereby contributes to maintaining image quality. The following substances may be used as antiseptics or fungicides: benzotriazole, sodium dehydroacetate, sodium sorbate, 2-pyridinethiol-1-oxide sodium, isothiazolin compound, sodium benzoate, and pentachlorophenol sodium.

A recording liquid may also contain a rust inhibitor. A rust inhibitor coats the surfaces of metallic parts such as a recording head that contact a recording liquid and thereby prevents corrosion. The following substances may be used as rust inhibitors: acidic sulfite, sodium thiosulfate, ammonium thiodiglycolic acid, diisopropyl ammonium nitrite, pentaerythritol tetranitrate, and dicyclohexyl ammonium nitrite.

A recording liquid may also contain an antioxidant. An antioxidant prevents corrosion by eliminating radical species that cause corrosion.

As an antioxidant, phenolic compounds and amine compounds are mainly used. Phenolic compounds include compounds such as hydroquinone and gallate; and hindered phenolic compounds such as 2,6-di-tert-butyl-p-cresol, stearyl-β-(3,5-di-tert-butyl-4-hydroxyphenyl)propionate, 2,2'-methylenebis(4-methyl-6-tert-butylphenol), 2,2'-methylenebis(4-ethyl-6-tert-butylphenol), 4,4'-thiobis(3-methyl-6-tert-butylphenol), 1,1,3-tris(2-methyl-4-hydroxy-5-tert-butylphenyl)butane, 1,3,5-trimethyl-2,4,6-tris(3,5-di-tert-4-hydroxybenzyl)benzene, tris(3,5-dit-tert-butyl-4-hydroxybenzyl)isocyanurate, and tetrakis[methylene-3(3',5'-di-tert-butyl-4-hydroxyphenyl)propionate]methane. Amine compounds include N,N'-diphenyl-p-phenylenediamine, phenyl-β-naphthylamine, phenyl-α-naphthylamine, N,N'-β-naphthyl-p-phenylenediamine, N,N'-diphenylethylenediamine, phenothiazine, N,N'-di-sec-butyl-p-phenylenediamine, and 4,4'-tetramethyl-diaminodiphenylmethane.

For the latter one, sulfur compounds and phosphorus compounds are mainly used. Sulfur compounds include dilauryl thiodipropionate, distearyl thiodipropionate, lauryl stearyl thiodipropionate, dimyristyl thiodipropionate, distearylβ,β'-thiodibutyrate, 2-mercaptobenzoimidazole, and dilauryl sulfide. Phosphorus compounds include triphenyl phosphite, trioctadecyl phosphite, tridecyl phosphite, trilauryl trithiophosphite, diphenyl isodecyl phosphite, trinonyl phenyl phosphite, and distearyl pentaerythritol phosphite.

A recording liquid may also contain a pH adjuster. As pH adjusters, the following substances may be used: hydroxides of alkali metals such as lithium hydroxide, sodium hydroxide, and potassium hydroxide; carbonates of alkali metals such as ammonium hydroxide, quaternary ammonium hydroxide, quaternary phosphonium hydroxide, lithium carbonate, sodium carbonate, and potassium carbonate; amines such as diethanolamine and triethanolamine; boric acid; hydrochloric acid; nitric acid; sulfuric acid; and acetic acid.

Examples of inks are described below, but other types of inks may also be used.

<Black Ink>

Substances in the following formula were mixed and stirred, and then filtered with a 0.8 μm polypropylene filter to prepare a black ink. A carbon black dispersion (sulfone group attached, self-dispersion type) manufactured by Cabot Corporation was used for the exemplary black ink.

| | |
|---|---|
| Carbon black dispersion | 40 wt % |
| CAB-O-JET 200 (sulfone group attached, Cabot Corporation) | |
| Acrylic silicone resin emulsion | 8 wt % |
| Nanocryl SBCX-2821 (Toyo Ink Mfg. Co., Ltd.) | |
| 1,3-butanediol | 18 wt % |
| Glycerin | 9 wt % |
| 2-pyrrolidone | 2 wt % |
| Ethyl hexanediol | 2 wt % |
| Fluorinated surfactant FS-300 (Dupont) | 2 wt % |
| Chemical formula (A), m = 6-8, n = 26 or larger | |
| Proxel LV (Avecia KK) | 0.2 wt % |
| Ion-exchanged water | 20.8 wt % |

A polymer microparticle dispersion liquid containing copper phthalocyanine pigment was prepared by replicating the preparation example 3 disclosed in Japanese Patent Application Publication No. 2001-139849.

To prepare a polymer solution, the air in a 1 L flask with a mechanical stirrer, a thermometer, a nitrogen gas inlet tube, a reflux tube, and a dropping funnel was replaced sufficiently with nitrogen gas; the 1 L flask was charged with 11.2 g of styrene, 2.8 g of acrylic acid, 12.0 g of lauryl methacrylate, 4.0 g of polyethylene glycol methacrylate, 4.0 g of styrene macromer (Toagosei Co., Ltd., brand name: AS-6), and 0.4 g of mercaptoethanol; and the temperature was raised to 65° C. Then, a mixed solution of 100.8 g styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer (Toagosei Co., Ltd., brand name: AS-6), 3.6 g of mercaptoethanol, 2.4 g of azobisdimethylvaleronitrile, and 18.0 g of methyl ethyl ketone was dripped into the 1 L flask for 2.5 hours. After the dripping was completed, a mixed solution of 0.8 g of azobisdimethylvaleronitrile and 18.0 g of methyl ethyl ketone was dripped into the 1 L flask for 0.5 hours. The resulting solution was matured for 1 hour at the temperature of 65° C., 0.8 g of azobisdimethylvaleronitrile was added to the solution, and then the solution was matured further for 1 hour. After the reaction stopped, 364 g of methyl ethyl ketone was put into the 1 L flask. As a result, 800 g of polymer solution with a concentration of 50% was obtained.

Then, 28 g of the polymer solution, 26 g of copper phthalocyanine pigment, 13.6 g of 1 mol/L potassium hydroxide solution, 20 g of methyl ethyl ketone, and 30 g of ion-exchanged water were mixed and stirred sufficiently. The resulting substance was kneaded 20 times using the Tripole Roll Mill (Noritake Co., Limited, brand name: NR-84A). The obtained paste was put in 200 g of ion-exchanged water and stirred. Methyl ethyl ketone and water in the liquid was distilled away by using an evaporator. As a result, 160 g of polymer microparticle dispersion liquid with a cyan color was obtained. The solid content of the polymer microparticle dispersion liquid was 20.0 wt %.

Using the polymer microparticle dispersion liquid, a cyan ink was prepared. More specifically, substances in the following formula are mixed and stirred, and then filtered with a 0.8 μm polypropylene filter to prepare the exemplary cyan ink.

| | | |
|---|---|---|
| Cyan polymer microparticle dispersion | 45 | wt % |
| 1,3-butanediol | 21 | wt % |
| Glycerin | 8 | wt % |
| Ethyl hexanediol | 2 | wt % |
| Fluorinated surfactant FS-100 (Dupont) Chemical formula (A), m = 1-8, n = 0-25 | 1 | wt % |
| Proxel LV (Avecia KK) | 0.5 | wt % |
| Ion-exchanged water | 23.5 | mass % |

Adding a fluorinated surfactant in addition to water-soluble solvents (1,3-butanediol, ethyl hexanediol) provides practical penetration capability to an ink even on commercial printing papers that have lower permeability than ink jet papers or plain paper.

However, even a high penetration pigmented ink as described above may not be quickly fixed on a commercial printing paper having low permeability and beading may occur.

Figure 11:
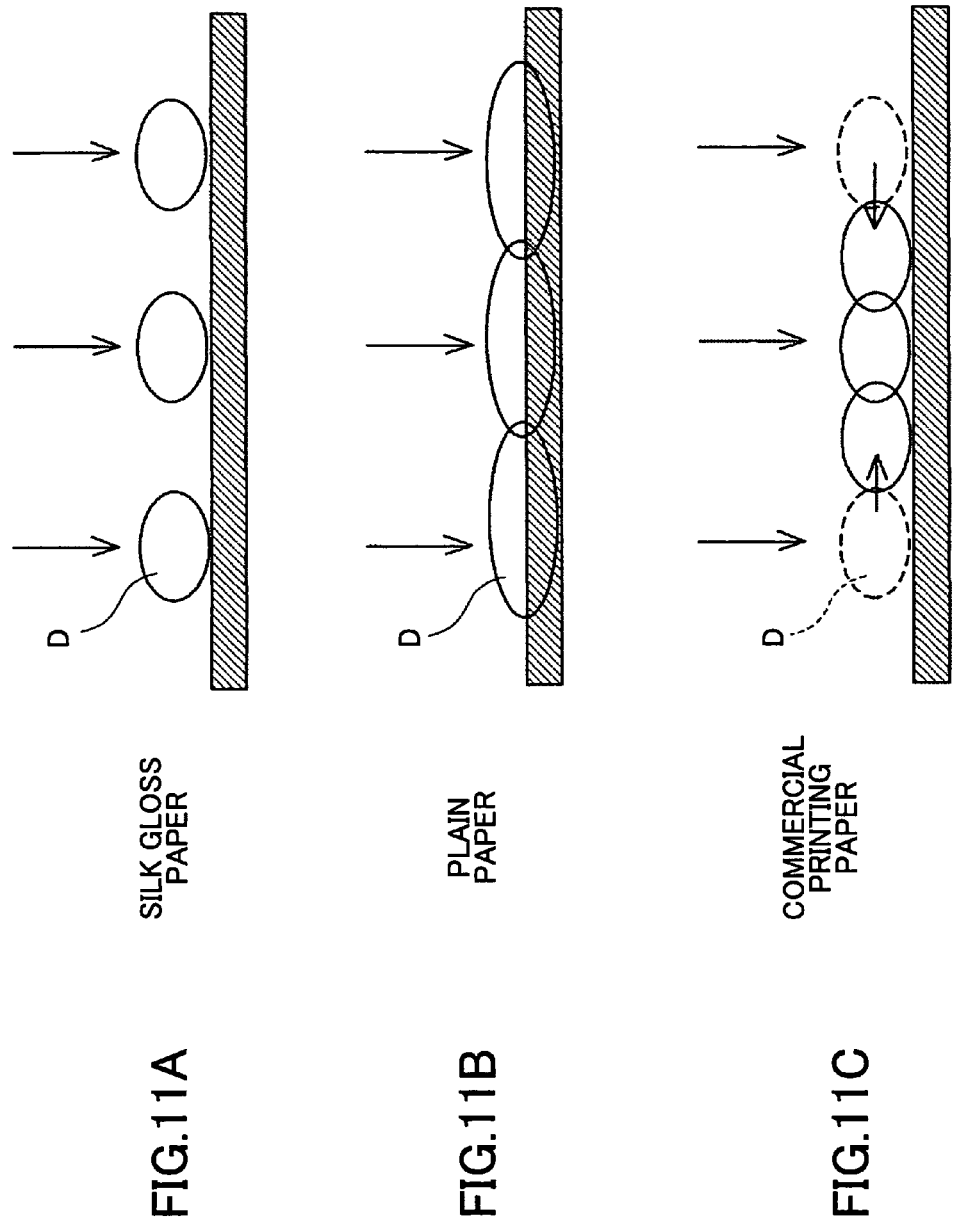
FIGS. 11A through 11C are drawings illustrating the behavior of ink drops on papers of different types.

FIGS. 11A through 11C are drawings illustrating the behavior of ink drops on a silk gloss paper, a plain paper, and a commercial printing paper.

FIG. 11A shows the behavior of ink drops on a silk gloss paper; 11B shows the behavior on a plain paper; and 11C shows the behavior on a commercial printing paper. When ink drops D are sprayed onto a silk gloss paper, the ink drops D do not spread and are isolated from each other. On a plain paper, the ink drops D spread and bleed. On a commercial printing paper, the ink drops D do not spread or bleed as in the case of a plain paper and are not isolated from each other as in the case of a silk gloss paper. Instead, adjoining ink drops D tend to clump together and may cause overflow of ink (beading).

An offset paper, which has a coating layer on its surface and is used, for example, for gravure printing of magazines, is an example of a commercial printing paper having the above characteristics. More specifically, POD Gloss Coat (Oji paper Co., Ltd.) is an example of a commercial printing paper. Also, Super MI dull and Space DX (Nippon Paper Industries Co., Ltd.) may be used as commercial printing papers. However, commercial printing papers that can be used for the present invention are not limited to the above mentioned papers.

To prevent beading on a commercial printing paper, embodiments of the present invention control the amounts of inks (recording liquids) caused to adhere to paper through three processes: a total amount control process of controlling the maximum total amount of ink per unit area, a BG/UCR process for black generation and under color removal, and a CMM process of converting the color space of image data. The above three processes are described below in detail.

Figure 12:
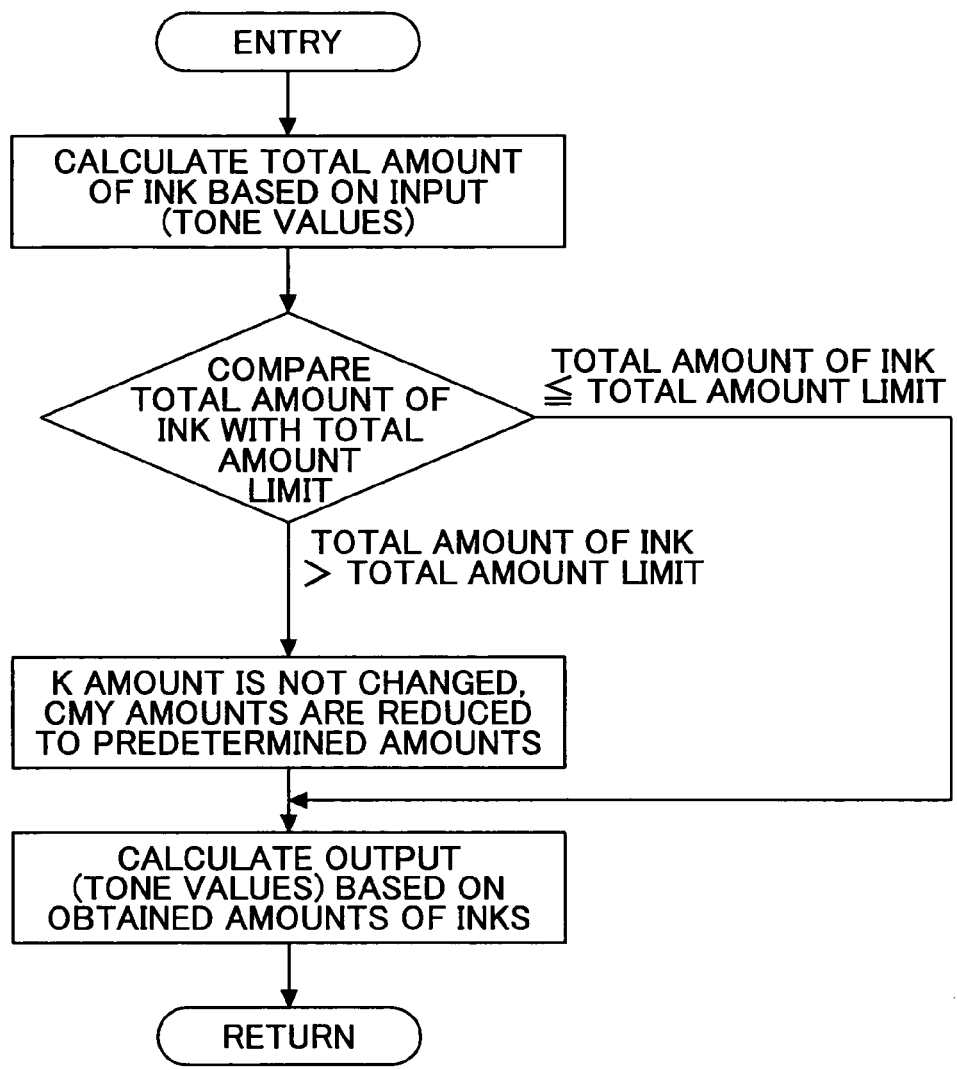
FIG. 12 is a flowchart showing an exemplary total amount control process according to an embodiment of the present invention.

FIG. 12 is a flowchart showing an exemplary total amount control process according to an embodiment of the present invention. In the exemplary total amount control process, the total amount of ink required is calculated based on an input (gradation value). The calculated total amount of ink is compared with a total amount limit. When the calculated total amount of ink is larger than the total amount limit, the amount of a black (K) ink is not changed, but the amounts of cyan (C), magenta (M), and yellow (Y) inks are reduced to predetermined amounts. When the calculated total amount of ink is equal to or smaller than the total amount limit, the amounts of inks are not changed. Then, an output (gradation value) is obtained based on the resulting amounts of inks.

The total amount limit is set to an amount of ink that is enough to describe the maximum color gamut of an image forming apparatus or an image forming system, but not so much as to cause paper cockling that leads to problems such as a smudge, a stain, and a paper jam.

The total amount limit can be expressed by the amount of ink (pl, picoliter) per unit area of 600×600 dpi, 100×100, on a recording medium, when each ink drop sprayed is 21 pl in amount and has a diameter of 34 μm. According to an experiment performed by the applicant, a preferable total amount limit for a commercial printing paper as described above is substantially the same as that for a plain paper and about 55% of the total amount limit for a silk gloss paper.

The exemplary total control process is performed when the total amount of ink calculated from an input is larger than a total amount limit, in which the amount of a black (K) ink is not changed, but the amounts of C, M, and Y inks are reduced so that the total amount of ink is kept equal to or smaller than the total amount limit.

Figure 13:
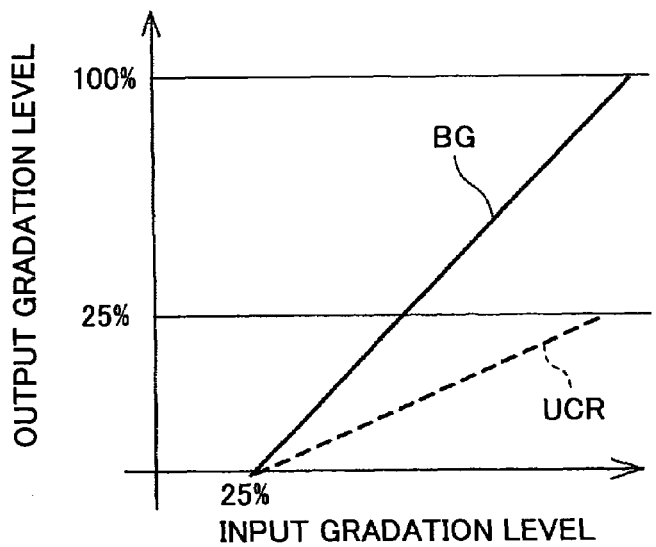
FIG. 13 is a graph used to describe a conventional BG/UCR process.
Figure 14:
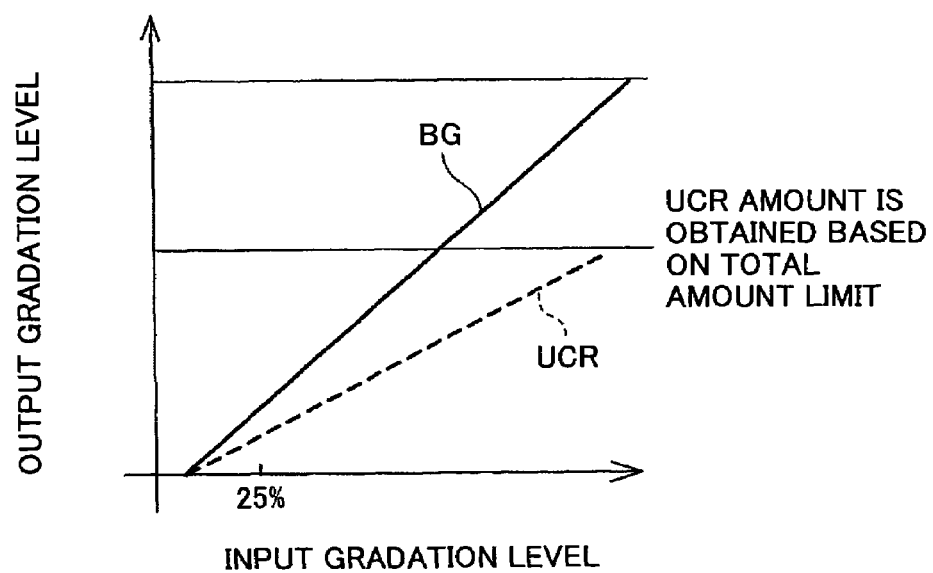
FIG. 14 is a graph used to describe an exemplary BG/UCR process according to an embodiment of the present invention.

An exemplary black generation/under color removal process is described below with reference to FIGS. 13 and 14.

Since dots of a K (black) ink has higher visibility than dots of C, M, Y inks, using a black ink in a low gradation level part makes that part look grainy. Therefore, normally, composite black composed of cyan, magenta, and yellow is used in low gradation level parts; and a black ink is used in higher gradation level parts. In a conventional black generation process, as shown in FIG. 13, a black ink is used in parts having gradation levels that are higher than the first 25% of the input gradation levels (a black generation starting gradation level is set to a gradation level that is higher than the first 25% of the input gradation levels). "Input gradation levels" in this case means gray resolution of an input signal from an image input apparatus such as a computer, a digital camera, and a scanner. For example, when an input signal has values of white=0 and black=255, 25% of the input gradation levels equals 64 gradation levels (255 gradation levels×25%=64 gradation levels).

The amount of ink used to form black color with composite black is three times greater than that used to form black color with a black ink. Since the preferable total amount limit for a commercial printing paper is smaller than other types of ink jet papers, using composite black on a commercial printing paper may cause beading.

According to an assessment by the applicant, when printing an image on a commercial printing paper, it is preferable to set the black generation starting gradation level to a gradation level that is within the first 25% of input gradation levels.

However, since lowering the black generation starting gradation level may make low gradation level parts look grainy, it is necessary to select an appropriate black generation starting gradation level from the range below 25%.

A normal under color removal (UCR) process performed in combination with a black generation process is expressed by formulas (2) shown below. In formulas (2), p indicates a UCR rate that takes a value in the range of $0 < p \leq 100$ (%).

$$K = p \cdot \min(Y, M, C)$$

$$Y' = Y - K$$

$$M' = M - K$$

$$C' = C - K \qquad (2)$$

As described above, when printing an image on a commercial printing paper, it is preferable to lower the maximum total amount of ink per unit area as far as possible. Therefore, the UCR rate is preferably determined taking into account the total amount limit and the maximum amount of black ink so that the maximum total amount of ink per unit area (the total amount of ink when black is used to a maximum extent) is kept equal to or smaller than the total amount limit.

For example, UCR amounts at gradation levels between the black generation starting gradation level and the highest gradation level can be expressed linearly using the maximum under color removal (UCR) amount obtained by formulas (1) shown below.

(total amount limit)−(maximum amount of black generation)=(total amount of CMY inks usable)

(total amount of CMY inks usable)/3=(amount of each of CMY inks usable)

(amount limit for each color)−(amount of each of CMY inks usable)=maximum UCR amount  (1)

In the above formulas, "maximum amount of black generation" means the maximum amount of black ink (recording liquid) used in the black generation/under color removal (BG/UCR) process.

As described above, according to an embodiment of the present invention, the total amount of ink per unit area on a commercial printing paper is controlled equal to or below a total amount limit by the total amount control process and the black generation/under color removal (BG/UCR) process. Such a method reduces occurrences of problems such as beading and tone jump, and thereby improves the quality of an image on a commercial printing paper.

Figures 15, 16:
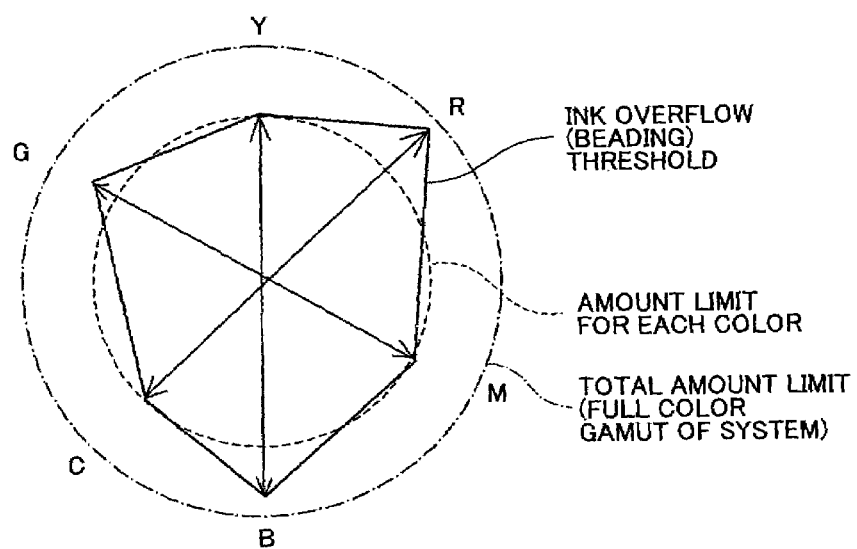
FIG. 15 is an exemplary lookup table used in an exemplary CMM process according to an embodiment of the present invention.
FIG. 16 is a radar chart used to describe another exemplary CMM process in which the total amount of recording liquids is controlled for each hue.

An exemplary CMM process that converts the color space of image data based on the results of the BG/UCR process is described below with reference to FIG. 15.

Normally, a color space conversion process converts the RGB color space for monitor display into the CMY color space for a recording apparatus. In other words, an input color signal having three color values is converted into an output color signal having the same number of color values.

In the exemplary CMM process, an input color signal having three or more color values is converted into an output color signal having four color values including a black value. More specifically, as shown in FIG. 15, a color space conversion table provided as a look up table (LUT) is used to convert the RGB color space into the CMYK color space of an image forming apparatus.

In this case, it is ideal to provide combinations of K, C, Y, and M output values for all combinations of R, G, and B input values in the color space conversion table (LUT). However, in practice, to reduce the amount of data and thereby to increase the processing speed, it is preferable to select interpolation points (about 17 points within the range of 0-255) and obtain the output values by using an interpolation method such as linear interpolation, tetrahedron interpolation, or hexahedron interpolation.

In an embodiment of the present invention, the BG/UCR process is practically performed in a color space conversion process, where an input color signal having three or more color values is converted into an output color signal having four color values including a black value. This method makes it possible to increase the processing speed.

Also, it is preferable to design a color space conversion table based on the parameters in the total amount control process and the BG/UCR process so that the color space conversion table conforms to the maximum total amount of ink per unit area.

The exemplary total amount control process described above makes it possible to uniformly control the amounts of color inks for all hues. However, with the exemplary total amount control process, it is not possible to control the amounts of color inks for each hue.

In another embodiment of the present invention, the total amount limit is set to the total amount of color inks used to reproduce a hue that consumes color inks most so that the full color gamut of a system can be reproduced. In this case, a color space conversion table is designed for each hue by taking into account the ink overflow (beading) threshold and the maximum saturation of each hue, and the amounts of color inks for each hue are controlled by the CMM process.

Also, since different commercial printing papers have different characteristics, the image quality may be further improved by changing the total amount control process, the BG/UCR process, and the color space conversion process according to the type of a commercial printing paper.

In an embodiment described above, an image processing apparatus includes a printer driver that is a program for causing a computer to perform an image processing method according to an embodiment of the present invention. However, it is possible to include a unit for performing the image processing method in an image forming apparatus. Also, it is possible to include an application specific integrated circuit (ASIC) for performing an image processing method according to an embodiment of the present invention in an image forming apparatus. In an embodiment described above, an image forming system is configured so that a printer driver causes a computer to perform a recording liquid amount control process of an image forming method according to an embodiment of the present invention. However, it is possible to include a unit for performing the image forming method in an image forming apparatus. Also, it is possible to include an application specific integrated circuit (ASIC) for performing an image forming method according to an embodiment of the present invention in an image forming apparatus.

To form a high quality image on a commercial printing paper, it is preferable to appropriately finish the nozzle surface of a liquid drop spraying head in addition to performing image processing of an image forming method according to an embodiment of the present invention.

The relationship between an ink (recording liquid), a recording medium, and the finishing of the nozzle surface of a liquid drop spraying head is described below.

When an ink with a relatively low surface tension as described above is used, the surface of the nozzle forming material of a liquid drop spraying head is preferably highly water repellent (ink repellent). A highly water repellent (ink repellent) nozzle forming material makes it possible for an ink with a low surface tension to normally form a meniscus and thereby makes it possible to normally form an ink drop. A normally formed meniscus of ink prevents the ink from being drawn to one side, prevents bending of ink stream, and thereby makes it possible to accurately form a dot.

When an image is formed on a recording medium with a low ink-absorption rate as described above, the positional accuracy of dots greatly affects the quality of the image. On a recording medium with a low ink-absorption rate, ink drops do not spread. Therefore, if the positional accuracy of dots is low, some parts in an image forming area on the recording medium may not be filled by the ink drops and, as a result, may be left blank. The parts left blank cause irregularity or decrease of the image density, and thereby degrade the image quality.

To avoid the above problems, it is preferable to form a water-repellent layer (that may also be called a water-repellent film, ink-repellent layer, or ink-repellent film) on the surface of the nozzle forming material of a liquid drop spraying head. Such a liquid drop spraying head makes it possible to form dots with high positional accuracy even with an ink having a low surface tension; prevents irregularity or decrease of image density; and thereby makes it possible to form a high-quality image even on a recording medium with a low ink-absorption rate.

Figure 17:
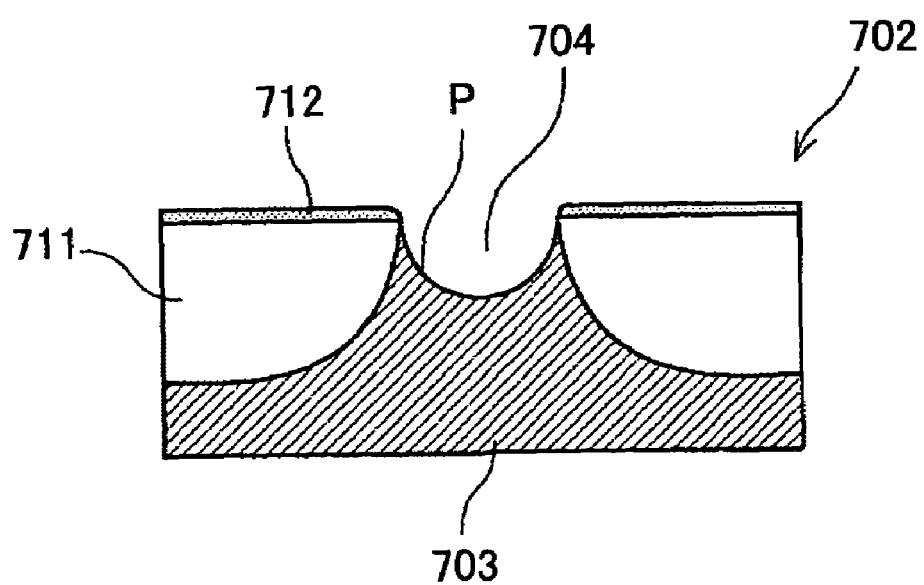
FIG. 17 is a schematic diagram of an exemplary nozzle plate of an exemplary liquid drop spraying head.
Figure 18A:
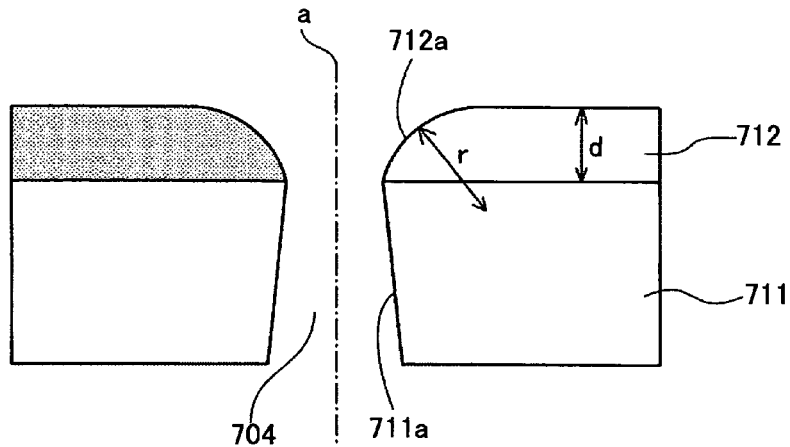
FIGS. 18A through 18C are enlarged schematic diagrams of a part of the exemplary nozzle plate.
Figure 18B:
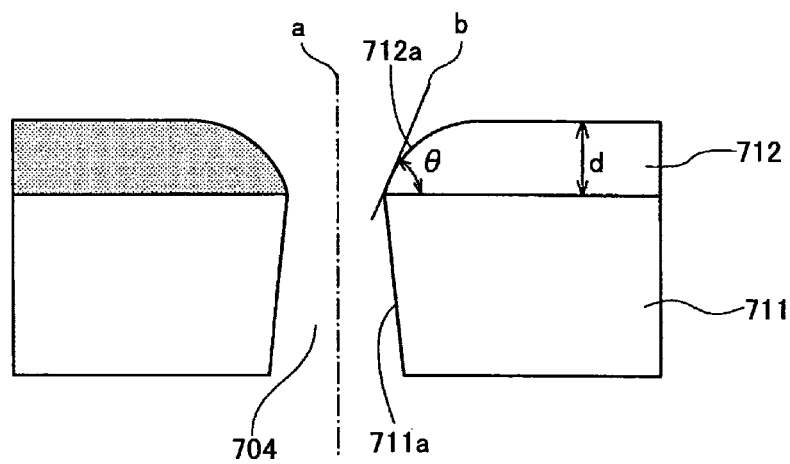
Figure 18C:
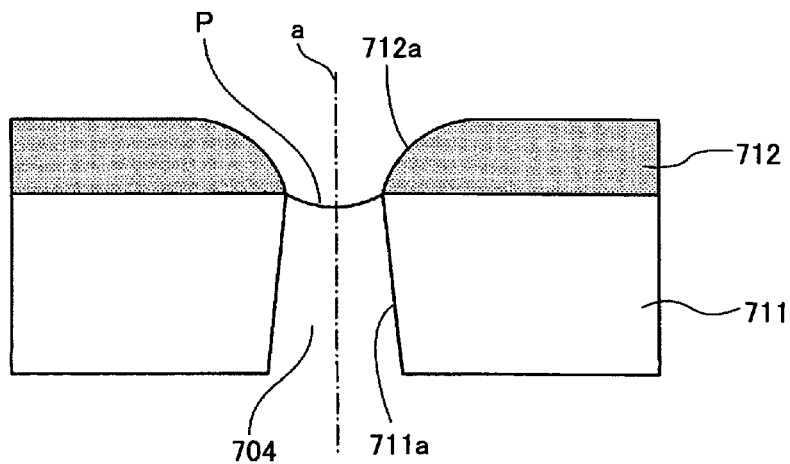

An exemplary nozzle plate of an exemplary liquid drop spraying head for forming an image on a commercial printing paper using a high penetration pigmented ink (recording liquid) is described below with reference to FIG. 17 and FIGS. 18A through 18C. FIG. 17 is a schematic diagram of an exemplary nozzle plate of an exemplary liquid drop spraying head. FIGS. 18A through 18C are enlarged schematic diagrams of a part of the exemplary nozzle plate.

A nozzle plate 702 of the exemplary liquid drop spraying head includes a nozzle base material 711 that forms a nozzle 704 and a water-repellent layer 712 formed on the surface of the nozzle base material 711.

For example, the nozzle base material 711 is a nickel film formed by electroforming nickel and the water-repellent layer 712 is a silicone resin film.

The surface roughness Ra of the water-repellent layer 712 is preferably 0.2 µm or lower. Keeping the surface roughness Ra equal to or lower than 0.2 µm reduces the amount of ink that remains on the nozzle surface after wiping. The thickness of the water-repellent layer 712 may be 0.1 µm or larger, but preferably 0.05 µm or larger.

When a liquid chamber (not shown) is filled with ink 703, a meniscus (liquid surface) P is formed at the boundary of the nozzle base material 711 and the water-repellent layer 712 as shown in FIG. 18C.

When a water-repellent layer is formed on a surface of a nozzle base material, a liquid drop spraying opening of the water-repellent layer is preferably shaped so that the area of a cross section of the liquid drop spraying opening taken along a plane that is orthogonal to a center line of the liquid drop spraying opening increases gradually as the distance between the cross section and the surface of the nozzle base material increases.

In this case, the part of the water-repellent layer surrounding the liquid drop spraying opening is preferably a curved surface. Also, the curvature radius of the curved line of the curved surface on a cross section of the water-repellent layer taken along a plane including the center line of the liquid drop spraying opening is preferably longer than the thickness of the water-repellent layer. In other words, the curved line of the curved surface on a cross section of the water-repellent layer taken along a plane including the center line of the liquid drop spraying opening is preferably shaped like a circular arc and its curvature radius is preferably longer than the thickness of the water-repellent layer.

Also, the angle formed between the surface of the nozzle base material and a tangential line touching the edge of the curved surface on a cross section of the water-repellent layer taken along a plane including the center line of the liquid drop spraying opening is preferably less than 90 degrees.

The above mentioned shapes of a nozzle base material and a water-repellent layer are described below in detail with reference to FIG. 18.

An opening 711a of the nozzle base material 711 which opening 711a forms the nozzle 704 is shaped so that the shape of a cross section of the opening 711a taken along a plane that is orthogonal to a center line a shown by a dashed-dotted line becomes approximately circular. An opening 712a of the water-repellent layer 712 formed on the liquid drop spraying surface of the nozzle base material 711 is shaped so that the area of a cross section of the opening 712a taken along a plane that is orthogonal to the center line a increases as the distance between the cross section and the surface of the nozzle base material 711 increases. In other words, the opening 712a of the water-repellent layer 712 is shaped so that its cross section area increases in the liquid drop spraying direction.

More specifically, as shown in FIG. 18A, the part of the water-repellent layer 712 which part surrounds the opening 712a has a curved shape, and the curved line of the curved shape between the edge of the opening 711a of the nozzle base material 711 and the surface of the water-repellent layer 712 has a curvature radius r. The curvature radius r is preferably longer than a thickness d of the water-repellent layer 712 in parts other than the part surrounding the opening 712a. The thickness d is preferably the maximum thickness of the water-repellent layer 712.

As described above, the opening 712a of the water-repellent layer 712 forms a continuous opening with the opening 711a of the nozzle base material 711, and the part surrounding the opening 712a has a curved shape with no angular edges. Shaping the water-repellent layer 712 as described above prevents a wiper blade (for example, the wiper blade 58 shown in FIG. 2) made of, for example, rubber from getting stuck with the water-repellent layer 712, and thereby prevents peeling of the water-repellent layer 712 off the nozzle base material 711.

Also, as shown in FIG. 18B, an angle θ formed between the surface of the nozzle base material 711 and a tangential line b touching the edge of the curved shape surrounding the opening 712a of the water-repellent layer 712 on a cross section taken along a plane including the center line a is preferably less than 90 degrees.

As shown in FIG. 18C, when the angle θ between the surface of the nozzle base material 711 and the tangential line b is less than 90 degrees, the meniscus (liquid surface) P is constantly formed at the boundary of the nozzle base material 711 and the water-repellent layer 712, and the possibility of the formation of the meniscus P in other positions is greatly reduced.

The nozzle plate 702 as described above improves the spray stability of a liquid drop spraying head.

Next, a silicone resin used as a material of the water-repellent layer 712 is described. As a silicone resin for the water-repellent layer 712, a liquid silicone resin that cures at room temperature is preferable. Especially, a liquid silicone resin that cures at room temperature and has hydrolytic reactivity is preferable. In the example below, SR2411 manufactured by Dow Corning Toray Co. Ltd. is used.

Table 2 shows the results of an experiment on the relationship of the angle θ between the surface of the nozzle base material 711 and the tangential line b and the curvature radius r of the curved shape surrounding the opening 712a of the water-repellent layer 712, with build-up of ink around a nozzle, peeling of an edge of the water-repellent layer 712, and spray stability.

TABLE 2

| Edge shape | | Build-up of ink | Peeling of edge | Spray stability |
|---|---|---|---|---|
| Angular | | Partly occurred | Occurred | Good |
| Not angular (curved shape) | θ ≦ 90° | Not occurred | Not occurred | Good |
| | θ > 90° | Not occurred | Not occurred | Not good |
| | r ≧ d | Not occurred | Not occurred | Good |
| | r < d | Not occurred | Partly occurred | Not good |

Figure 19A:
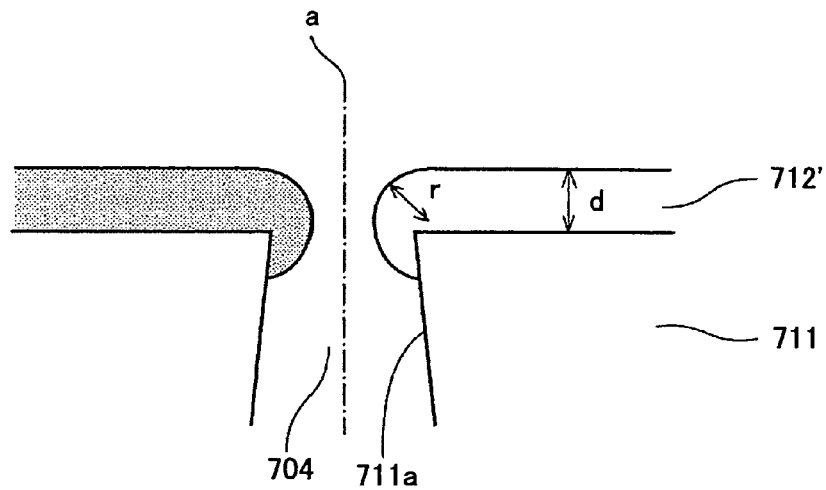
FIGS. 19A through 19C are enlarged schematic diagrams of parts of nozzle plates provided as comparative examples.
Figure 19B:
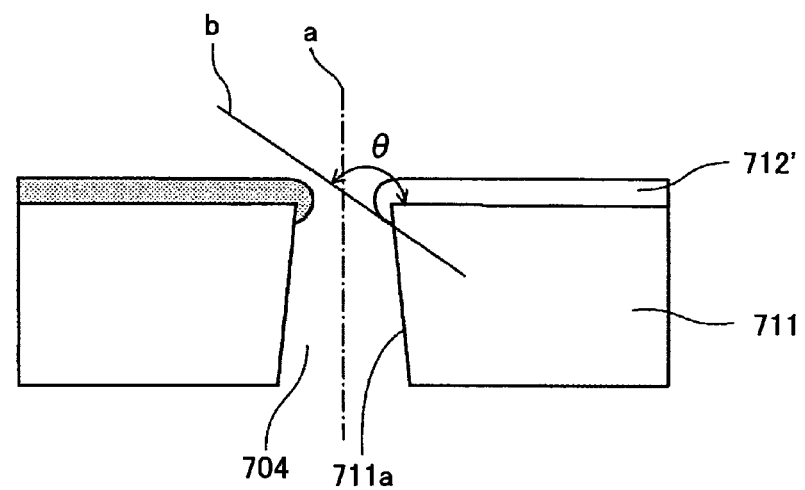

As shown in table 2, when the edge (the part surrounding the opening 712a) of the water-repellent layer 712 is angular, there was a build-up of ink around the nozzle and peeling of the edge occurred. When the edge has a curved shape, there was no build-up of ink. However, when the edge is shaped as shown in FIG. 19A (r<d, comparative example), a part of the edge was peeled; and when the edge is shaped as shown in FIG. 19B (θ>90°, comparative example), the spray stability was not good.

Figure 19C:
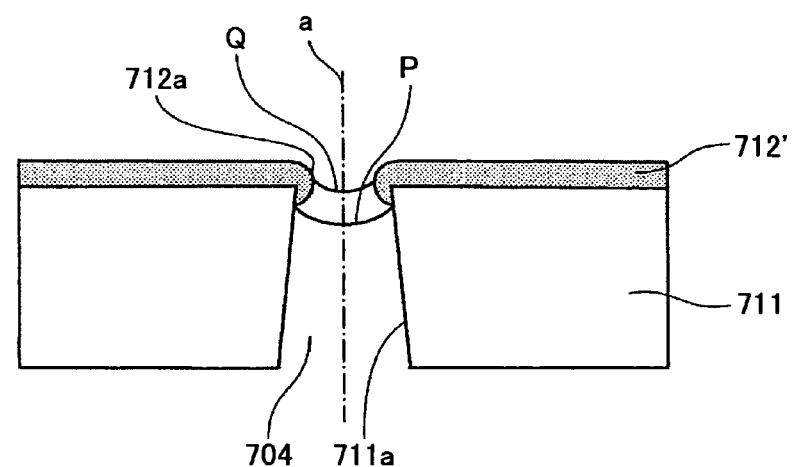

As shown in FIG. 19C, when r<d or θ>90° is true, the meniscus (liquid surface) may be formed either at the boundary of the nozzle base material 711 and the water-repellent layer 712' (meniscus P) or at the projecting point (where the cross section area of the opening 704 becomes smallest) of the water-repellent layer 712' (meniscus Q). As indicated by the above results, a nozzle plate as shown in FIG. 19C reduces the spray stability of a liquid drop spraying head.

An exemplary production method of a nozzle plate of a liquid drop spraying head as described above is described below with reference to FIG. 20. In the exemplary production method shown in FIG. 20, a water-repellent layer is formed by applying a silicone resin on the surface of a nozzle base material using a dispenser.

A dispenser 721 for applying a silicone solution is positioned above the liquid drop spraying surface of the nozzle base material 711 formed by electroforming nickel. The dispenser 721 is scanned over the nozzle base material 711 while maintaining a specific distance between the nozzle base material and a needle 72. The needle 72 dispenses a silicone resin 723 and thereby selectively forms a silicone resin coating on the liquid drop spraying surface of the nozzle base material 711.

In a test production, SR2411 (Dow Corning Toray Co. Ltd.), a silicone resin that cures at room temperature and has a viscosity of 10 mPa·s, was used. In the test production, a small portion of the silicon resin overflowed into the opening 711a and the back of the nozzle base material 711. The silicone resin coating (water-repellent layer 712) formed as described above had a thickness of 1.2 μm and a surface roughness Ra of 0.18 μm.

Figure 21:
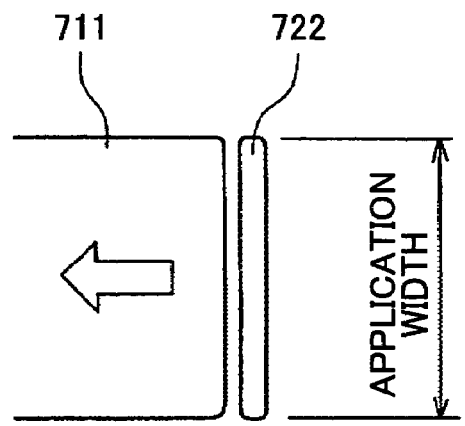
FIG. 21 is a drawing used to describe the width of silicone resin dispensed from an exemplary dispensing needle and a method of applying silicone resin.

As shown in FIG. 21, a dispensing opening at the end of the needle 722 of the dispenser 721 has substantially the same width as that of the nozzle base material 711. The dispenser 721 as described above makes it possible to complete the application of silicone resin on the entire surface of the nozzle base material 711 by scanning the dispenser 721 only once in the application direction (the direction of the arrow shown in FIG. 21). In other words, the dispenser 721 is scanned only in one direction.

Figure 22:
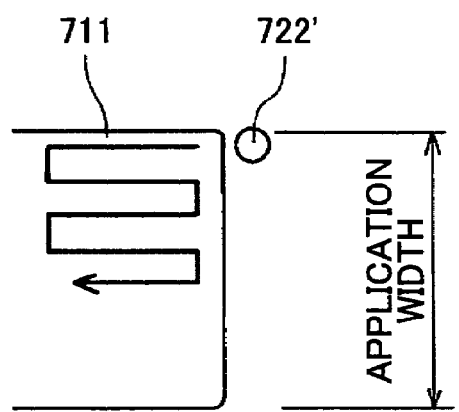
FIG. 22 is a drawing used to describe the width of silicone resin dispensed from a dispensing needle of a comparative example and a method of applying silicone resin.

On the other hand, the width of a dispensing opening at the end of a conventional needle 722' of the dispenser 721 shown in FIG. 22 is shorter than that of the nozzle base material 711. In this case, the dispenser 721 must be scanned back and forth in different directions.

In other words, since the width of the needle 722' is far shorter than that of the nozzle base material 711, the needle 722' must be moved many times in different directions to complete the application of silicone resin. Therefore, with the conventional needle 722', it is difficult to apply silicon resin on an object with a uniform thickness.

As described above, the needle 722 having a dispensing opening with substantially the same width as that of the nozzle base material 711 makes it possible to apply silicone resin on the nozzle base material 711 with a uniform thickness and thereby makes it possible to accurately form the water-repellent layer 712.

Figure 23:
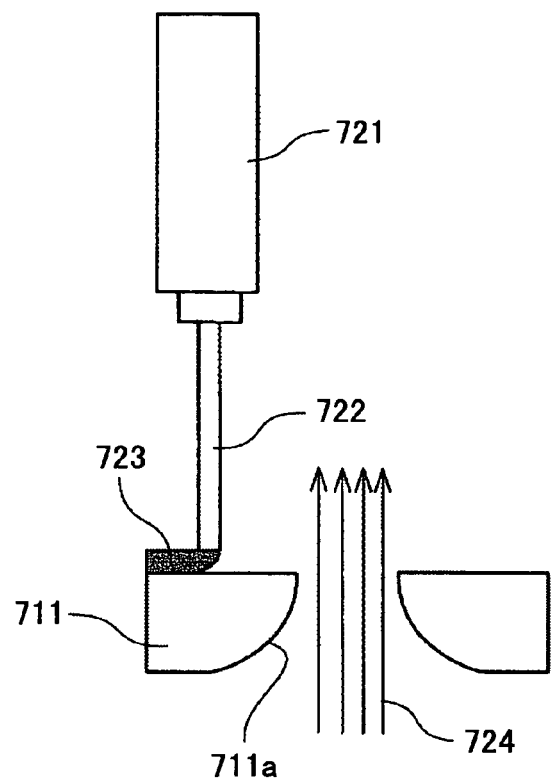
FIG. 23 is a drawing used to describe another exemplary method of producing the exemplary liquid drop spraying head.

Another exemplary production method of a nozzle plate of a liquid spraying head as described above is described below with reference to FIG. 23. In the exemplary production method shown in FIG. 23, a water-repellent layer is formed by applying silicone resin on the surface of a nozzle base material using a dispenser.

In this example, while the silicone resin 723 is applied, a gas 724 is sent through the opening 711a of the nozzle base material 711 from the side opposite to the surface on which the water-repellent layer 712 is formed. As the gas 724, any type of gas, such as air, that does not easily react chemically with the silicone resin 723 may be used.

Sending the gas 724 through the opening 711a while applying the silicone resin 723 makes it possible to form the silicone resin coating (water-repellent layer) 712 only on the surface of the nozzle base material 711 excluding the opening 711a.

Figure 24:
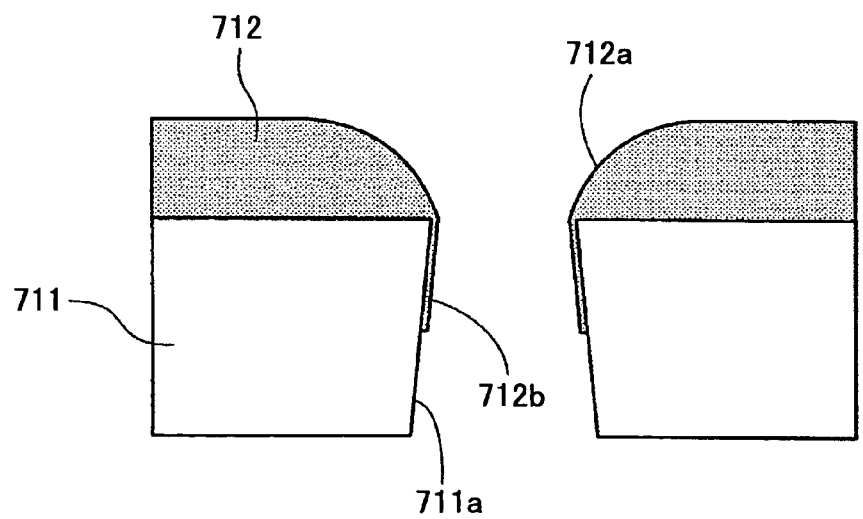
FIG. 24 is an enlarged schematic diagram of a part of another exemplary nozzle plate of the exemplary liquid drop spraying head.

Also, as shown in FIG. 24, it is possible to form a silicone resin coating 712b on the wall of the opening 711a (wall of the nozzle 704) to a specified depth (for example, several μm). In this case, the silicone resin 723 is applied without sending the gas 724, and when the silicone resin 723 reaches a specified depth, the gas 724 is started to be sent through the opening 711a.

In other words, this method makes it possible to form a very thin water-repellent coating 712b (on the wall of the opening 711a of the nozzle base material 711) from the edge of the opening 711a to a specified depth, in addition to the water-repellent layer 712 on the liquid drop spraying surface of the nozzle base material 711.

A wiping test was performed using EPDM rubber (rubber hardness: 50 degrees) on the water-repellent layer 712 of the nozzle plate 702 produced as described above. After 1,000 times of wiping, the water-repellent layer 712 of the nozzle plate 702 still retained good water repellency. In another test, the nozzle plate 702 with the water-repellent layer 712 was immersed in ink with a temperature of 70° C. for 14 days. After the test, the water-repellent layer 712 still retained substantially the same water repellency as that before the test.

Figure 25:
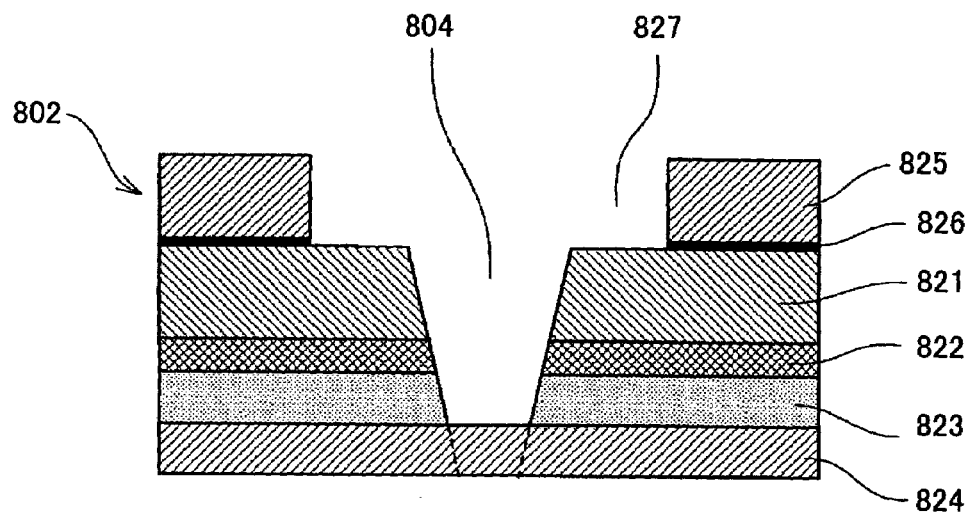
FIG. 25 is a schematic diagram of an exemplary nozzle plate of another exemplary liquid drop spraying head.

Another exemplary liquid drop spraying head according to an embodiment of the present invention is described below with reference to FIG. 25. FIG. 25 is a schematic diagram of an exemplary nozzle plate of another exemplary liquid drop spraying head.

A nozzle plate 802 of the exemplary liquid drop spraying head includes a resin material 821 used as a nozzle base material, a high rigidity material 825 bonded onto the resin material 821 with a thermoplastic cement 826, an $SiO_2$ thin-film layer 822 formed on the resin material 821, and a water-repellent layer 823 formed on the $SiO_2$ thin-film layer 822. A nozzle hole (opening) 804 with a certain diameter is formed through the resin material 821 and a connecting nozzle hole 827 that connects with the nozzle hole 804 is formed through the high rigidity material 825.

To form the $SiO_2$ thin-film layer 822, a film forming method that can form a film with a temperature that does not affect the resin material 821 is used. For example, a sputtering method, an ion beam deposition method, an ion plating method, a chemical vapor deposition (CVD) method, and a plasma CVD (P-CVD) method may be used.

In terms of process time and material costs, the thickness of the $SiO_2$ thin-film layer 822 is preferably made as thin as possible to the extent that its adherency can be maintained. If the $SiO_2$ thin-film layer 822 is too thick, it may cause a problem in etching a nozzle hole with an excimer laser. More specifically, even when a nozzle hole was formed through the resin material 821 without any problem, a part of the SiO$_2$ thin-film layer 822 may not be etched and remain unprocessed.

The thickness of the SiO$_2$ thin-film layer 822 is preferably between 1 and 300 Å, and more preferably between 10 and 100 Å so that adherency is maintained and no part of the SiO$_2$ thin-film layer 822 remains unprocessed. In an experiment, when the thickness of the SiO$_2$ thin-film layer 822 was 30 Å, sufficient adherency was obtained and there was no problem in the etching process by an excimer laser. When the thickness was 300 Å, only a very small part of the SiO$_2$ thin-film layer 822 remained unprocessed to an extent that does not cause any practical problem. When the thickness was more than 300 Å, a substantial part of the SiO$_2$ thin-film layer 822 remained unprocessed to an extent that makes the nozzle unusable.

For the water-repellent layer 823, any material that repels ink may be used. For example, a fluorine water-repellent material or a silicone water-repellent material may be used.

There are many types of fluorine water-repellent materials. In an experiment, a mixture of perfluoropolyoxetane and modified perfluoropolyoxetane (Daikin Industries, Ltd., brand name: OPTOOL DSX) was deposited with a thickness of 1-30 Å as the water-repellent layer 823. In this experiment, the water-repellent layers made of OPTOOL DSX with thicknesses of 10, 20, and 30 Å showed substantially the same water repellency and wiping durability. When the cost is taken into account, the thickness is preferably between 1 and 20 Å. An adhesive tape 824 made of a resin film and an adhesive applied on the resin film is applied on the surface of the fluorine water-repellent layer 823. The adhesive tape 824 functions as a support during the etching process by an excimer laser.

As a silicone water-repellent material, a liquid silicone resin or an elastomer that cures at room temperature is preferably used. A silicone water-repellent material applied on the SiO$_2$ thin-film layer 822 is left in the atmosphere so that it cures and forms an ink-repellent coating.

Also, a liquid silicone resin or an elastomer that cures when heated may be used as a silicone water-repellent material. In this case, a silicone water-repellent material applied on the SiO$_2$ thin-film layer 822 is heated so that it cures and forms an ink-repellent coating.

Also, a liquid silicone resin or an elastomer that cures when irradiated with an ultraviolet ray may be used as a silicone water-repellent material. In this case, a silicone water-repellent material applied on the SiO$_2$ thin-film layer 822 is irradiated with an ultraviolet ray so that it cures and forms an ink-repellent coating.

The viscosity of a silicone water-repellent material is preferably 1,000 cP or lower.

Figure 26:
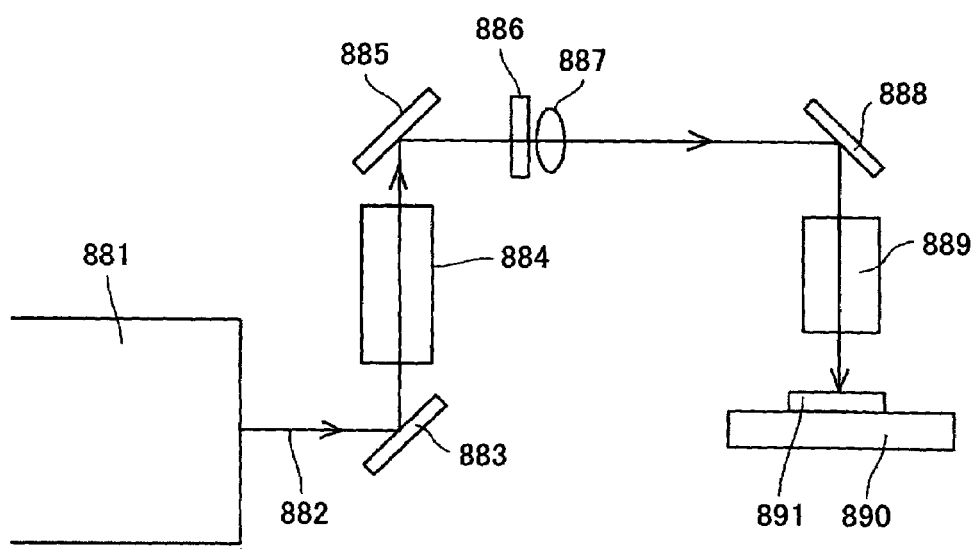
FIG. 26 is a drawing illustrating an excimer laser device.

An exemplary excimer laser device for etching a nozzle hole is described below with reference to FIG. 26.

An excimer laser beam 882 emit from a laser oscillator 881 is reflected by mirrors 883, 885, and 888 and thereby guided to a processing table 890. Along the light path of the laser beam 882 from the laser oscillator 881 to the processing table 890, a beam expander 884, a mask 886, a field lens 887, and an imaging optical system 889 are provided at their respective positions so that an optimum laser beam is delivered to an object (work) 891. The object 891 is placed on the processing table 890 and processed there by the laser beam 882. For the processing table 890, a conventional XYZ table may be used. The processing table 890 is able to change the positions of the object 891 so that any point on the object 891 can be irradiated with the laser beam 882. Although an excimer laser is used in the example described above, any short-wavelength ultraviolet laser that is capable of an ablation process may also be used.

An exemplary production process of the nozzle plate 802 is described below with reference to FIGS. 27A through 27F.

Figure 27A:
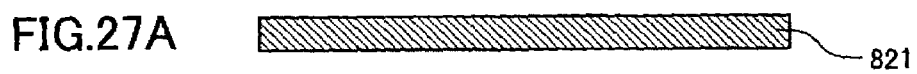
FIGS. 27A through 27F are drawings used to describe an exemplary process of producing a nozzle plate of the another exemplary liquid drop spraying head.

As shown in FIG. 27A, the resin material 821 used as a nozzle base material is prepared. For example, a polyimide film such as Kapton (brand name of DuPont) that contains no particle may be used. A normal polyimide film contains particles of, for example, SiO$_2$ (silica) to make it easier for a roll film handling device to handle the polyimide film (to improve the slipperiness of the polyimide film). However, SiO$_2$ (silica) particles obstruct the etching process by an excimer laser and thereby make the shape of a nozzle irregular. Therefore, a polyimide film that does not contain SiO$_2$ (silica) particles is preferable.

Figure 27B:
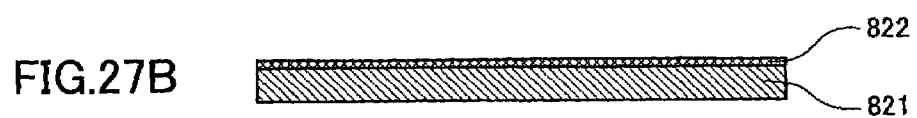

Next, as shown in FIG. 27B, the SiO$_2$ thin-film layer 822 is formed on the resin material 821. The SiO$_2$ thin-film layer 822 is formed preferably by a sputtering method performed in a vacuum chamber. The thickness of the SiO$_2$ thin-film layer 822 is preferably between several Å and 200 Å. In this example, the thickness of the SiO$_2$ thin-film layer 822 is between 10 and 50 Å.

The SiO$_2$ thin-film layer 822 is preferably formed by sputtering Si and then subjecting the Si surface to O$_2$ ions. Such a film forming method improves the adherency of the SiO$_2$ thin-film layer 822 to the resin material 821, makes it possible to form a uniform and dense film, and thereby improves the wiping durability of the water-repellent layer 823.

Figure 27C:
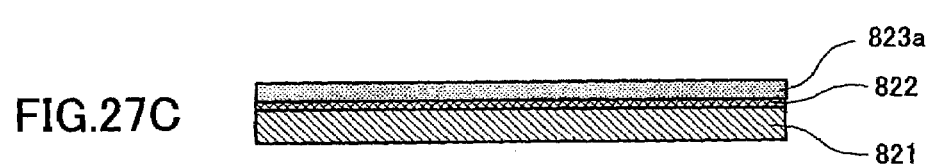

Next, as shown in FIG. 27C, a fluorine water-repellent 823a is applied on the SiO$_2$ thin-film layer 822. Although application methods such as spin coating, roll coating, screen printing, and spray coating may be used, a vacuum deposition method is preferable to improve the adherency of the water-repellent layer 823.

Also, the vacuum deposition is preferably performed just after the formation of the SiO$_2$ thin-film layer 822 in the same vacuum chamber. If the plate (work) is taken out of the vacuum chamber after the formation of the SiO$_2$ thin-film layer 822, impurities may adhere onto the surface of the SiO$_2$ thin-film layer 822 and reduce its adherency.

As a fluorine water-repellent material, an amorphous compound such as perfluoropolyoxetane, modified perfluoropolyoxetane, or a mixture of them is preferably used to obtain sufficient ink repellency. For example, OPTOOL DSX (Daikin Industries, Ltd.) mentioned above may be used. OPTOOL DSX is sometimes called alkoxysilane terminus modified perfluoropolyether.

Figure 27D:
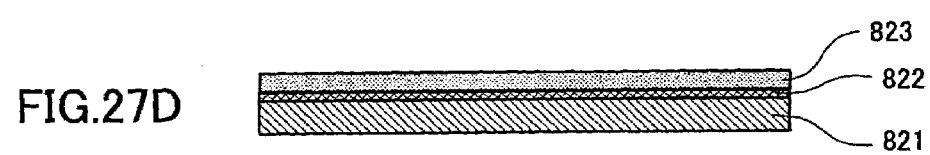

After the application of the fluorine water-repellent 823a, the plate is left in the atmosphere. As shown in FIG. 27D, the fluorine water-repellent 823a binds chemically to the SiO$_2$ thin-film layer 822 using the moisture in the atmosphere as a medium, and thereby forms the fluorine water-repellent layer 823.

Figure 27E:
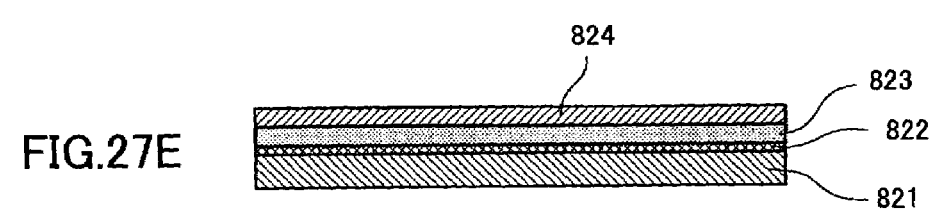

Next, as shown in FIG. 27E, the adhesive tape 824 is applied on the fluorine water-repellent layer 823. The adhesive tape 824 is preferably applied so as not to leave air bubbles between the adhesive tape 824 and the fluorine water-repellent layer 823. If a nozzle hole is formed in a position where air bubbles are left, the quality of the nozzle hole may be degraded.

Figure 27F:
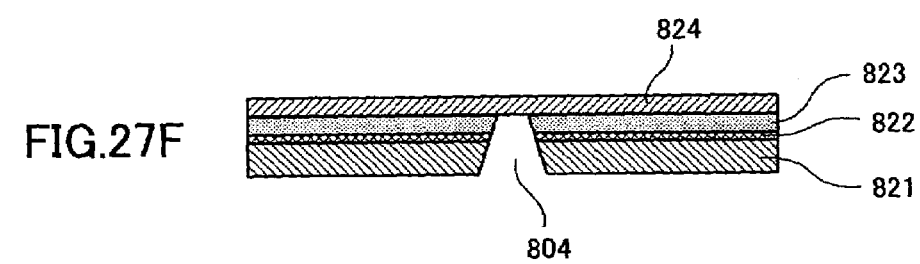

Then, as shown in FIG. 27F, the nozzle hole 804 is formed from the side where the resin material 821 is formed. After the nozzle hole 804 is formed, the adhesive tape 824 is removed. In the exemplary production process described above, the description of the step of forming the high rigidity material 825 shown in FIG. 25 for increasing the rigidity of the nozzle plate 802 was omitted. The step of forming the high rigidity material 825 may be inserted between the steps shown in FIGS. 27D and 27E.

Figure 28:
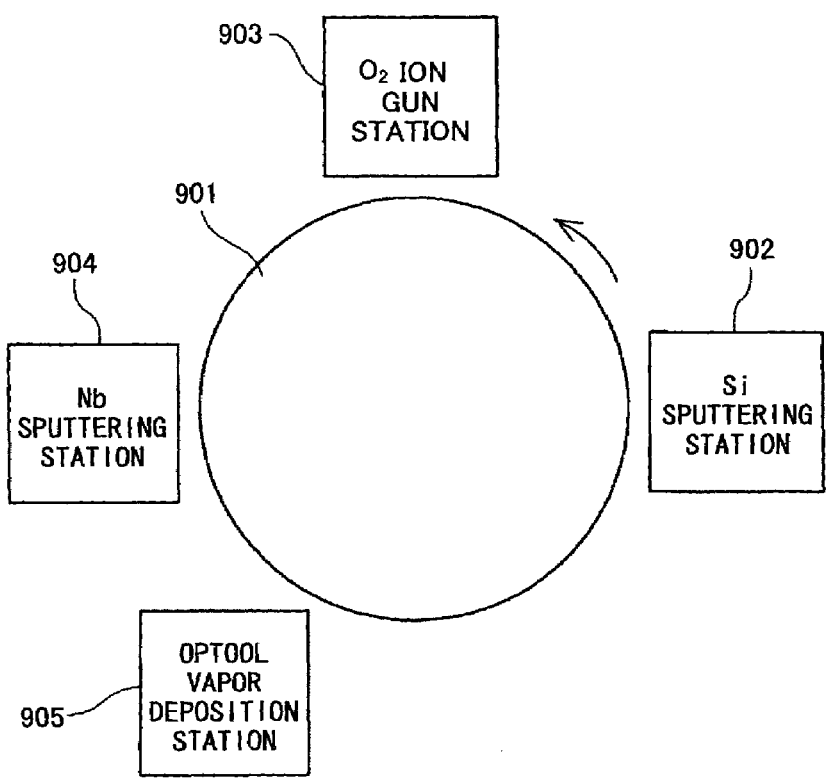
FIG. 28 is a drawing illustrating an exemplary thin film deposition apparatus used to produce a nozzle plate of the another exemplary liquid drop spraying head.

An exemplary thin film forming apparatus used to produce a nozzle plate of a liquid drop spraying head is described below with reference to FIG. 28.

The exemplary thin film deposition apparatus employs MetaMode® Thin Film Deposition Process developed by Optical Coating Laboratory, Inc. (OCLI) of the USA. Meta-Mode® Thin Film Deposition Process is mainly used to form antireflection/antifouling films of, for example, displays.

In the exemplary thin film deposition apparatus, an Si sputtering station 902, an $O_2$ ion gun station 903, an Nb sputtering station 904, and an OPTOOL vapor deposition station 905 are placed in four positions around a drum 901 that rotates in the direction of the arrow. All the components are in a chamber that can be vacuumized.

The Si sputtering station 902 sputters Si onto the surface of a plate. The $O_2$ ion gun station 903 bombards the Si sputtered surface with 02 ions to form an $SiO_2$ film. Then, the OPTOOL vapor deposition station 905 deposits OPTOOL DSX on the $SiO_2$ film. Since no antireflection film is necessary for a nozzle plate, the Nb sputtering station 904 is not used. The exemplary thin film forming apparatus described above makes it possible to deposit OPTOOL DSX just after the formation of the $SiO_2$ thin-film layer 822 in the same vacuum chamber.

The preferable critical surface tension of a water-repellent layer of a nozzle plate is described below.

The critical surface tension of a water-repellent layer is preferably between 5 and 40 mN/m, and more preferably between 5 and 30 mN/m. When the critical surface tension is larger than 30 mN/m, the wettability of the nozzle plate to ink becomes high after long-term use and problems such as bending of ink stream and abnormal ink drop formation may occur. When the critical surface tension is larger than 40 mN/m, the wettability of the nozzle plate to ink becomes high even before use and problems such as bending of ink stream and abnormal ink drop formation may occur.

In an experiment, three types of nozzle plates with different types of water-repellent layers made of water-repellent materials shown in table 3 below were prepared and the critical surface tensions of the water-repellent layers were measured. To form the water repellent layers, the water-repellent materials were applied on aluminum plates and then dried by heating.

TABLE 3

| Maker | Product name | Critical surface tension (mN/m) | Spray stability |
|---|---|---|---|
| Dow Corning Toray Co. Ltd. | SR2411 | 21.6 | Good |
| Shin-Etsu Chemical Co., Ltd. | KBM7803 | 16.9 | Good |
| Shin-Etsu Chemical Co., Ltd. | KP801M | 6.6 | Good |

A critical surface tension can be obtained by the Zisman method. In the Zisman method, drops of liquids with known surface tensions are placed on a water-repellent layer and the angles of contact of the liquid drops are measured. The surface tensions of the liquids are plotted on the x axis and the cosines of the contact angles (cos θ) are plotted on the y axis. As a result, a downward sloping line (Zisman Plot) is obtained. The critical surface tension of the water-repellent layer equals the surface tension at which the cos θ is 1.0. Also, a critical surface tension can be obtained by using other methods such as the Fowkes method, the Owens and Wendt method, and the Van Oss method.

In another experiment, a cyan ink prepared according to an embodiment described above was sprayed from liquid drop spraying heads having the above mentioned nozzle plates and the behavior of liquid drops were observed by video. In all cases, ink drops were normally formed and the spray stability was good.

Additional examples of inks (recording liquids), recording media, and nozzle plates according to embodiments of the present invention are described below.

A nozzle plate according to an embodiment of the present invention has excellent water repellency (or ink repellency) and therefore can form ink drops normally even when an ink with a low surface tension is used. More specifically, a nozzle plate according to an embodiment of the present invention has low wettability and therefore a meniscus of an ink is formed normally. A normally formed meniscus prevents the ink from being drawn to one side, prevents bending of an ink stream, and thereby makes it possible to accurately form a dot.

When an image is formed on a recording medium with a low ink-absorption rate, the positional accuracy of dots greatly affects the quality of the image. On a recording medium with a low ink-absorption rate, ink drops do not spread smoothly. Therefore, if the positional accuracy of dots is low, some parts in an image forming area on the recording medium may not be filled by the ink drops and, as a result, may be left blank. The parts left blank cause irregularity or decrease of the image density, and thereby degrade the image quality.

A nozzle plate as described above makes it possible to form dots with high positional accuracy even with an ink having a low surface tension; prevents irregularity or decrease of image density; and thereby makes it possible to form a high-quality image even on a recording medium with a low ink-absorption rate.

An exemplary recording medium according to an embodiment of the present invention is composed of a base material and at least one coating layer on a surface of the base material. Also, the exemplary recording medium may have additional layers.

When the exemplary recording medium was brought into contact with an ink of this embodiment for 100 ms, the amount of the ink transferred onto the exemplary recording medium measured by a dynamic scanning absorptometer was between 2 and 40 ml/m². This value is preferably between 3 and 30 ml/m². The amount of pure water transferred onto the exemplary recording medium at a contact time of 100 ms is preferably between 2 and 45 ml/m², and more preferably between 3 and 30 ml/m².

When the amount of transferred pure water or ink at a contact time of 100 ms is smaller than the preferable range, beading may occur. When the amount is larger than the preferable range, the diameter of a recorded ink dot may become smaller than a preferable diameter.

When the exemplary recording medium was brought into contact with an ink of this embodiment for 400 ms, the amount of the ink transferred onto the exemplary recording medium measured by a dynamic scanning absorptometer was between 3 and 50 ml/m². This value is preferably between 4 and 40 ml/m². The amount of pure water transferred onto the exemplary recording medium at a contact time of 400 ms is preferably between 3 and 50 ml/m$^2$, and more preferably between 4 and 40 ml/m$^2$.

When the amount of transferred pure water or ink at a contact time of 400 ms is smaller than the preferable range, drying property becomes insufficient and spur marks may appear. When the amount is larger than the preferable range, bleeding may occur and the glossiness of an image after dried may become low.

Dynamic scanning absorptometer (DSA: JAPAN TAPPI JOURNAL, Volume 48, May 1994, pp. 88-92, Shigenori Kuga) is an apparatus that can accurately measure the amount of a liquid absorbed during a very short period of time. The dynamic scanning absorptometer directly reads the absorption speed of a liquid from the movement of a meniscus in a capillary and automatically measures the amount of the liquid absorbed. The test sample is shaped like a disc. The dynamic scanning absorptometer scans the test sample by moving an liquid-absorbing head spirally over the test sample and thereby measures the amount of the liquid absorbed at as many points as necessary. The scanning speed is automatically changed according to a predetermined pattern. A liquid supplying head that supplies liquid to the test sample is connected via a Teflon (registered trademark) tube to the capillary. Positions of the meniscus in the capillary are automatically detected by an optical sensor. In the above experiment, a dynamic scanning absorptometer (K350 series, type D, Kyowa Co., Ltd.) was used to measure the amount of transferred pure water or ink. The amount of transferred pure water or ink at a contact time of 100 ms or 400 ms is obtained by interpolation, using the transferred amounts measured at time points around each contact time. The measurement was performed in an environmental condition of 23° C. and 50% RH.

Various materials may be used for the base material depending on the purpose of paper. For example, a sheet of paper mainly made of wood fibers and a nonwoven fabric mainly made of wood and synthetic fibers may be used.

A sheet of paper may be made of wood pulp or recycled pulp. Examples of wood pulp are leaf bleached kraft pulp (LBKP), needle bleached kraft pulp (NBKP), NBSP, LBSP, GP, and TMP.

As materials of recycled pulp, recycled papers in the list of standard qualities of recycled papers of the Paper Recycling Promotion Center may be used. For example, chemical pulp or high-yield pulp made of recycled papers may be used as the base material. Such recycled papers include printer papers such as non-coated computer paper, thermal paper, and pressure-sensitive paper; OA papers such as plain paper; coated papers such as art paper, ultra-lightweight coated paper, and matt paper; and non-coated papers such as bond paper, color bond paper, note paper, letter paper, warpping paper, fancy paper, medium quality paper, newspaper, woody paper, supermarket flyers, simili paper, pure-white roll paper, and milk cartons. The above substances may be used individually or in combination.

Normally, recycled pulp is made by the following four steps:

(1) A defibrating step of breaking down used paper into fibers and separating ink from the fibers by using a mechanical force and a chemical in a pulper.

(2) A dust removing step of removing foreign substances (such as plastic) and dust in the used paper by using, for example, a screen and a cleaner.

(3) A deinking step of expelling the ink separated by a surfactant from the fibers by using a flotation method or a cleaning method.

(4) A bleaching method of bleaching the fibers by oxidization or reduction.

When mixing recycled pulp with wood pulp, the percentage of recycled pulp is preferably 40% or lower so that produced paper does not curl after recording.

As an internal filler for the base material, a conventional white pigment may be used. For example, the following substances may be used as a white pigment: an inorganic pigment such as precipitated calcium carbonate, heavy calcium carbonate, kaolin, clay, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic silica, aluminum hydroxide, alumina, lithophone, zeolite, magnesium carbonate, or magnesium hydrate; and an organic pigment such as styrene plastic pigment, acrylic plastic pigment, polyethylene, microcapsule, urea resin, or melamine resin. The above substances may be used individually or in combination.

As an internal sizing agent used when producing the base material, a neutral rosin size used for neutral papermaking, alkenyl succinic anhydride (ASA), alkyl ketene dimer (AKD), or a petroleum resin size may be used. Especially, a neutral rosin size and alkenyl succinic anhydride are preferable. Alkyl ketene dimer has a high sizing effect and therefore provides an enough sizing effect with a small amount. However, since alkyl ketene dimer reduces the friction coefficient of the surface of recording paper (medium), recording paper made using alkyl ketene dimer may cause a slip when being conveyed in an ink jet recording apparatus.

The coating layer contains a pigment and a binder, and may also contain a surfactant and other components.

As a pigment, an inorganic pigment or a mixture of an inorganic pigment and an organic pigment may be used.

For example, kaolin, talc, heavy calcium carbonate, precipitated calcium carbonate, calcium sulfite, amorphous silica, alumina, titanium white, magnesium carbonate, titanium dioxide, aluminum hydroxide, calcium hydrate, magnesium hydrate, zinc hydroxide, or chlorite may be used as an inorganic pigment. Especially, kaolin provides a high gloss surface similar to that of an offset paper and is therefore preferable.

There are several types of kaolin, for example, delaminated kaolin, calcined kaolin, and engineered kaolin made by surface modification. To provide a high gloss surface, the mass percentage of a type of kaolin, in which 80 or more mass percent of particles have a diameter of 2 μm or smaller, in the total amount of kaolin is preferably 50 percent or more.

The amount of kaolin in the total amount of pigment in the coating layer is preferably 50 mass percent or more. If the mass ratio of kaolin is lower than 50, sufficient glossiness may not be obtained. There is no specific limit to the amount of kaolin. However, when the fluidity and the thickening property of kaolin under a high shearing force are taken into account, the mass ratio of kaolin is preferably 90 or lower in terms of coatability.

As an organic pigment, a water-soluble dispersion of, for example, styrene-acrylic copolymer particles, styrene-butadiene copolymer particles, polystyrene particles, or polyethylene particles may be used. The above organic pigments may be used in combination.

The amount of an organic pigment in the total amount of pigment in the coating layer is preferably 2-20 mass percent. An organic pigment as described above has a specific gravity lower than that of an inorganic pigment and therefore provides a thick, high-gloss coating layer having a good coatability. If the mass percentage of an organic pigment is less than 2 percent, a desired effect is not obtained. If the mass percentage of an organic pigment is more than 20 percent, the fluidity of a coating liquid becomes too low and, as a result, the efficiency of a coating process decreases and the operational costs increase.

Organic pigments can be divided into several types according to their particle shapes: solid-shape, hollow-shape, and doughnut-shape. To achieve a good balance between the glossiness, coatability, and fluidity of a coating liquid, an organic pigment having hollow-shaped particles with a void percentage of 40 percent or higher and an average diameter of between 0.2 and 3.0 μm is preferable.

As a binder, a water-based resin is preferably used. As a water-based resin, a water-soluble resin or a water-dispersible resin may be used. Any type of water-based resin may be used depending on the purpose. For example, the following water-based resins may be used: polyvinyl alcohol; a modified polyvinyl alcohol such as anion-modified polyvinyl alcohol, cation-modified polyvinyl alcohol, or acetal-modified polyvinyl alcohol; polyurethane; polyvinyl pyrrolidone; a modified polyvinyl pyrrolidone such as polyvinyl pyrrolidone-vinyl acetate copolymer, vinyl pyrrolidone-dimethylaminoethyl methacrylate copolymer, quaternized vinyl pyrrolidone-dimethylaminoethyl methacrylate copolymer, or vinyl pyrrolidone-methacrylamide propyl trimethyl ammonium chloride copolymer; cellulose such as carboxymethyl cellulose, hydroxyethyl cellulose, or hydroxypropylcellulose; modified cellulose such as cationized hydroxyethyl cellulose; polyester, polyacrylic acid (ester), melamine resin, or modified versions of these substances; synthetic resin made of polyester-polyeurethane copolymer; and other substances such as poly(metha)acrylic acid, poly(metha)acrylamide, oxidized starch, phosphorylated starch, self-denatured starch, cationized starch, other modified starches, polyethylene oxide, polyacrylic acid soda, and alginic acid soda. The above substances may be used individually or in combination.

Among the above substances, polyvinyl alcohol, cation-modified polyvinyl alcohol, acetal-modified polyvinyl alcohol, polyester, polyurethane, and polyester-polyeurethane copolymer are especially preferable in terms of ink-absorption rate.

Any type of water-dispersible resin may be used depending on the purpose. For example, the following water-dispersible resins may be used: polyvinyl acetate, ethylene-polyvinyl acetate copolymer, polystyrene, styrene-(metha)acrylic ester copolymer, (metha)acrylic ester polymer, polyvinyl acetate-(metha)acrylic acid (ester) copolymer, styrene-butadiene copolymer, an ethylene-propylene copolymer, polyvinyl ether, and silicone-acrylic copolymer. A water-dispersible resin may contain a cross-linking agent such as methylol melamine, methylol hydroxypropylene urea, or isocyanate. Also, a self-crosslinking copolymer containing a unit of methylol acrylamide may be used as a water-dispersible resin. Two or more of the water-dispersible resins described above may be used at the same time.

The mass ratio of the water-based resin to the pigment in the coating layer is preferably 2:100 to 100:100, and more preferably 3:100 to 50:100. The amount of the water-based resin in the coating layer is determined so that the liquid-absorption rate of a recording medium falls within a specific range.

When a water-dispersible colorant is used, whether to mix a cationic organic compound in the binder is optional. For example, primary to tertiary amines that react with sulfonic groups, carboxyl groups, or amino groups of a direct dye or an acid dye in a water-soluble ink, and form insoluble salt; or a monomer, oligomer, or polymer of quarternary ammonium salt may be used. Among them, an oligomer and a polymer of quarternary ammonium salt are especially preferable.

As a cationic organic compound, the following substances may be used: dimethylamine-epichlorohydrin polycondensate, dimethylamine-ammonia-epichlorohydrin condensate, poly (trimethyl aminoethyl-methacrylate methylsulfate), diallylamine hydrochloride-acrylamide copolymer, poly (diallylamine hydrochloride-sulfur dioxide), polyallylamine hydrochlorid, poly (allylamine hydrochlorid-diallylamine hydrochloride), acrylamide-diallylamine copolymer, polyvinylamine copolymer, dicyandiamide, dicyandiamide-ammonium chloride-urea-formaldehyde condensate, polyalkylene polyamine-dicyandiamide ammonium salt consensate, dimethyl diallyl ammonium chloride, poly diallyl methyl amine hydrochloride, poly (diallyl dimethyl ammonium chloride), poly (diallyl dimethyl ammonium chloride-sulfur dioxide), poly (diallyl dimethyl ammonium chloride-diallyl amine hydrochloride derivative), acrylamide-diallyl dimethyl ammonium chloride copolymer, acrylate-acrylamide-diallyl amine hydrochloride copolymer, polyethylenimine, ethylenimine derivative such as acrylamide polymer, and modified polyethylenimine alkylene oxide. The above substances may be used individually or in combination.

It is preferable to use a cationic organic compound with a low-molecular weight such as dimethylamine-epichlorohydrin polycondensate or polyallylamine hydrochlorid and a cationic organic compound with a relatively-high molecular weight such as poly (diallyl dimethyl ammonium chloride) in combination. Compared with a case where only one cationic organic compound is used, using cationic organic compounds in combination improves image density and reduces feathering.

The equivalent weight of cation in a cationic organic compound obtained by the colloid titration method (performed using polyvinyl potassium sulfate and toluidine blue) is preferably between 3 and 8 meq/g. With an equivalent weight in the above range, the dry deposit mass of the cationic organic compound falls within a preferable range.

In the measurement of the equivalent weight of cation, the cationic organic compound is diluted with distilled water so that the solid content in the solution becomes 0.1 mass percent. No pH control is performed.

The dry deposit mass of the cationic organic compound is preferably between 0.3 and 2.0 $g/m^2$. If the dry deposit mass of the cationic organic compound is lower than 0.3 $g/m^2$, sufficient improvement in image density and sufficient reduction in feathering may not be achieved.

Any type of surfactant may be used depending on the purpose. For example, an anion surfactant, a cation surfactant, an amphoteric surfactant, or a nonionic surfactant may be used. Among the above surfactants, a nonionic surfactant is especially preferable. Adding a surfactant improves water resistance and density of an image, and thereby reduces bleeding.

For example, the following nonionic surfactants may be used: higher alcohol ethylene oxide adduct, alkylphenol ethylene oxide adduct, fatty acid ethylene oxide adduct, polyhydric alcohol fatty acid ester ethylene oxide adduct, higher aliphatic amine ethylene oxide adduct, fatty acid amide ethylene oxide adduct, fatty oil ethylene oxide adduct, ethylene oxide adduct of fat, polypropylene glycol ethylene oxide adduct, glycerol fatty acid ester, pentaerythritol fatty acid ester, sorbitol-sorbitan fatty acid ester, sucrose fatty acid ester, polyhydric alcohol alkyl ether, and alkanolamine fatty acid amide. The above substances may be used individually or in combination.

Polyhydric alcohol is not limited to a specific type and any type of polyhydric alcohol may be used depending on the purpose. For example, glycerol, trimethylolpropane, pentaerythrite, sorbitol, or surcose may be used. Ethylene oxide adduct may be made by replacing a part of ethylene oxide with an alkylene oxide such as propylene oxide or butylene oxide to the extent that the water solubility is not affected. The percentage of the replaced part is preferably 50 percent or lower. The hydrophile-lipophile balance (HLB) of a nonionic surfactant is preferably between 4 and 15, and more preferably between 7 and 13.

The mass ratio of the surfactant to the cationic organic compound is preferably 0:100 to 10:100, and more preferably 0.1:100 to 1:100.

Other components may also be added to the coating layer to the extent that its advantageous effects are not undermined. Examples of other components include additives such as an alumina powder, a pH adjuster, an antiseptic agent, and an antioxidant.

The method of forming the coating layer is not limited to a specific method. For example, the coating layer may be formed by impregnating the base material with a coating liquid or by applying a coating liquid to the base material. For the impregnation or application of a coating liquid, a coater such as a conventional size press, a gate roll size press, a film transfer size press, a blade coater, a rod coater, an air knife coater, or a curtain coater may be used. Using a conventional size press, a gate roll size press, or a film transfer size press attached to a paper machine for the impregnation or application of a coating liquid may improve the efficiency of the process and is therefore preferable.

There is no specific limit to the amount of a coating liquid on the base material. However, the solid content of a coating liquid on the base material is preferably between 0.5 and 20 $g/m^2$, and more preferably between 1 and 15 $g/m^2$. When the solid content of a coating liquid on the base material is less than 0.5 $g/m^2$, the ink-absorption rate of the paper is reduced and, as a result, ink overflow and bleeding may occur. When the solid content of a coating liquid on the base material is more than 20 $g/m^2$, the paper is not easily folded or becomes unsuitable for handwriting.

After the impregnation or application of a coating liquid, the coating liquid may be dried. The temperature for this drying process is preferably between 100 and 250° C., but is not limited to the specific range.

The exemplary commercial printing paper may also have a back layer on the back of the base material, and other layers between the base material and the coating layer or between the base material and the back layer. Also, a protective layer may be provided on the coating layer. Each of the layers may be composed of one layer or multiple layers.

In addition to an ink jet recording medium, any recording medium, for example, coated papers for offset printing or gravure printing, having a preferable liquid-absorption rate as described above may be used.

The grammage of an recording medium according to an embodiment of the present invention is preferably between 50 and 250 $g/m^2$. When the grammage is less than 50 g $m^2$, the strength of the paper becomes low and the paper may be jammed in an image forming apparatus. When the grammage is more than 250 g $m^2$, the strength of the paper becomes too high to be able to bend along the paper conveying path of an image forming apparatus and may be jammed.

An ink according to an embodiment of the present invention contains at least water, a colorant, and a humectant, and may also include a penetrant, a surfactant, and other components.

The surface tension of an ink according to an embodiment of the present invention at 25° C. is preferably between 15 and 40 mN/m, and more preferably between 20 and 35 mN/m. When the surface tension of an ink is less than 15 mN/m, the wettability of the nozzle plate to the ink becomes too high. As a result, ink drops may not be formed normally, bleeding may occur on a recording medium of this embodiment, and ink spray stability may be reduced. When the surface tension of an ink is more than 40 mN/m, the penetration capability of the ink is reduced, beading may occur, and the drying time may become longer.

The surface tension of an ink is measured, for example, by a surface tensiometer (for example, CBVP-Z of Kyowa Interface Science Co., Ltd.) with a platinum plate at a temperature of 25° C.

As a colorant, a pigment, a dye, and colored particles may be used individually or in combination.

As colored particles, an aqueous dispersion liquid of polymer microparticles containing at least a pigment or a dye as a colorant is preferably used.

"Containing" in this case means that a colorant is encapsulated in the polymer microparticles, a colorant is absorbed by the polymer microparticles, or both. However, a colorant may not be necessarily encapsulated in or absorbed by polymer microparticles, but may be dispersed in an emulsion as long as the resulting ink has characteristics suitable for the present invention. Any water-insoluble or poorly water-soluble colorant that can be absorbed by polymer microparticles may be used depending on the purpose.

"Water-insoluble" or "poorly water-soluble" in this case indicates that the maximum amount of a colorant that can dissolve in water at a temperature of 20° C. is less than a mass ratio of 10:100 (colorant:water). Also, "dissolve" means that no separation or sediment of a colorant is identified on the surface or bottom of the solution by eye observation.

The volume average particle diameter of a polymer microparticle (colored particle) containing a colorant is preferably between 0.01 and 0.16 μm in an ink. When the volume average particle diameter is less than 0.01 μm, the fluidity of polymer microparticles becomes very high and, as a result, bleeding may occur or the light resistance of the ink may become low. When the volume average particle diameter is more than 0.16 μm, nozzles may be clogged or color development of the ink may be inhibited.

As a colorant, for example, a water-soluble dye, an oil-soluble dye, a disperse dye, or a pigment may be used. An oil-soluble dye and a disperse dye is preferable in terms of absorbability and encapsulation. A pigment is preferable in terms of the light resistance of an image formed.

To be efficiently absorbed by polymer microparticles, the amount of a dye soluble in an organic solvent, such as a ketone solvent, is preferably 2 g/l or more, and more preferably between 20 and 600 g/l.

As a water-soluble dye, a dye categorized as an acid dye, a direct dye, a basic dye, a reactive dye, or a food dye in the Color Index may be used. Especially, a dye with high water-resistance and high light resistance is preferable.

For example, the following acid dyes and food dyes may be used: C. I. Acid Yellow 17, 23, 42, 44, 79, 142; C. I. Acid Red 1, 8, 13, 14, 18, 26, 27, 35, 37, 42, 52, 82, 87, 89, 92, 97, 106, 111, 114, 115, 134, 186, 249, 254, 289; C. I. Acid Blue 9, 29, 45, 92, 249; C. I. Acid Black 1, 2, 7, 24, 26, 94; C. I. Food Yellow 3, 4; C. I. Food Red 7, 9, 14; and C. I. Food Black 1, 2.

For example, the following direct dyes may be used: C. I. Direct Yellow 1, 12, 24, 26, 33, 44, 50, 86, 120, 132, 142, 144; C. I. Direct Red 1, 4, 9, 13, 17, 20, 28, 31, 39, 80, 81, 83, 89, 225, 227; C. I. Direct Orange 26, 29, 62, 102; C. I. Direct Blue 1, 2, 6, 15, 22, 25, 71, 76, 79, 86, 87, 90, 98, 163, 165, 199, 202; and C. I. Direct Black 19, 22, 32, 38, 51, 56, 71, 74, 75, 77, 154, 168, 171.

For example, the following basic dyes may be used: C. I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87, 91; C. I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, 112; C. I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, 155; and C. I. Basic Black 2, 8.

For example, the following reactive dyes may be used: C. I. Reactive Black 3, 4, 7, 11, 12, 17; C. I. Reactive Yellow 1, 5, 11, 13, 14, 20, 21, 22, 25, 40, 47, 51, 55, 65, 67; C. I. Reactive Red 1, 14, 17, 25, 26, 32, 37, 44, 46, 55, 60, 66, 74, 79, 96, 97; and C. I. Reactive Blue 1, 2, 7, 14, 15, 23, 32, 35, 38, 41, 63, 80, 95.

Any pigment, either an inorganic pigment or an organic pigment, may be used depending on the purpose.

For example, the following inorganic pigments may be used: titanium oxide, iron oxide, calcium carbonate, barium sulfate, aluminum hydroxide, barium yellow, cadmium red, chrome yellow, and carbon black. Among them, carbon black is especially preferable. Carbon blacks produced by a contact method, a furnace method, or a thermal method may be used.

The following organic pigments, for example, may be used: azo pigment, polycyclic pigment, dye chelate, nitro pigment, nitroso pigment, and aniline black. Especially, azo pigment and polycyclic pigment are preferable. As an azo pigment, for example, azo lake pigment, insoluble azo pigment, condensed azo pigment, or chelate azo pigment may be used. As a polycyclic pigment, for example, phthalocyanine pigment, perylene pigment, perynone pigment, anthraquinone pigment, quinacridone pigment, dioxazine pigment, indigo pigment, thioindigo pigment, isoindolinon pigment, or quinofraron pigment may be used. As a dye chelate, for example, basic dye chelate or acid dye chelate may be used.

A pigment of any color, for example, a black pigment or a color pigment, may be used depending on the purpose. The above substances may be used individually or in combination.

For a black ink, for example, the following pigments may be used: a carbon black (C. I. Pigment Black 11) such as furnace black, lamp black, acetylene black, or channel black; a metallic pigment such as copper, iron (C. I. Pigment Black 11), or titanium oxide pigment; and an organic pigment such as aniline black.

For a yellow ink, for example, the following pigments may be used: C. I. Pigment Yellow 1 (Fast Yellow G), 3, 12 (Disazo Yellow AAA), 13, 14, 17, 23, 24, 34, 35, 37, 42 (yellow iron oxide), 53, 55, 74, 81, 83 (Disazo Yellow HR), 95, 97, 98, 100, 101, 104, 108, 109, 110, 117, 120, 128, 138, 150, 153.

For a magenta ink, for example, the following pigments may be used: C. I. Pigment Red 1, 2, 3, 5, 17, 22 (Brilliant Fast Scarlet), 23, 31, 38, 48:2 (Permanent Red 2B (Ba)), 48:2 (Permanent Red 2B (Ca)), 48:3 (Permanent Red 2B (Sr)), 48:4 (Permanent Red 2B(Mn)), 49:1, 52:2, 53:1, 57:1 (Brilliant Carmine 6B), 60:1, 63:1, 63:2, 64:1, 81 (Rhodamine 6G lake), 83, 88, 92, 101 (colcothar), 104, 105, 106, 108 (cadmium red), 112, 114, 122 (dimethyl quinacridone), 123, 146, 149, 166, 168, 170, 172, 177, 178, 179, 185, 190, 193, 209, 219.

For a cyan ink, for example, the following pigments may be used: C. I. Pigment Blue 1, 2, 15 (Copper Phthalocyanine Blue R), 15:1, 15:2, 15:3 (Phthalocyanine Blue G), 15:4, 15:6 (Phthalocyanine Blue E), 16, 17:1, 56, 60, 63.

For neutral colors such as red, green, and blue, for example, the following pigments may be used: C. I. Pigment Red 177, 194, 224; C.I. Pigment Orange 43; C. I. Pigment Violet 3, 19, 23, 37; and C. I. Pigment Green 7, 36.

As a pigment, a self-dispersing pigment is preferable. A self-dispersing pigment has at least one type of hydrophilic group attached directly or via another atomic group to its surface, and is therefore stably dispersible without using a dispersing agent. Especially, an ionic self-dispersing pigment such as an anionic self-dispersing pigment or a cationic self-dispersing pigment is preferable.

The volume average particle diameter of a self-dispersing pigment is preferably between 0.01 and 0.16 μm in an ink.

Examples of anionic hydrophilic groups include —COOM, —SO3M, —PO3HM, —PO3M2, —SO2NH2, and —SO2NHCOR (in the formulas, M indicates a hydrogen atom, alkali metal, ammonium, or organic ammonium; and R indicates an alkyl group with 1-12 carbon atoms, a phenyl group with or without a substituent group, or a naphthyl group with or without a substituent group). A color pigment with —COOM or —SO3M attached to its surface is especially preferable.

Examples of alkali metals indicated by M in the hydrophilic groups include lithium, sodium, and potassium. Examples of organic ammoniums include monomethyl or trimethyl ammonium, monoethyl or triethyl ammonium, and monomethanol or trimethanol ammonium. To attach —COONa to the surface of a color pigment and thereby to obtain an anionic color pigment, the color pigment is, for example, oxidized with sodium hypochlorite, sulfonated, or reacted with diazonium salt.

As a cationic hydrophilic group, a quaternary ammonium group is preferable. Especially, quaternary ammonium groups represented by the formulas shown below are preferable. A colorant containing a pigment with any one of the quaternary ammonium groups attached to its surface is preferably used.

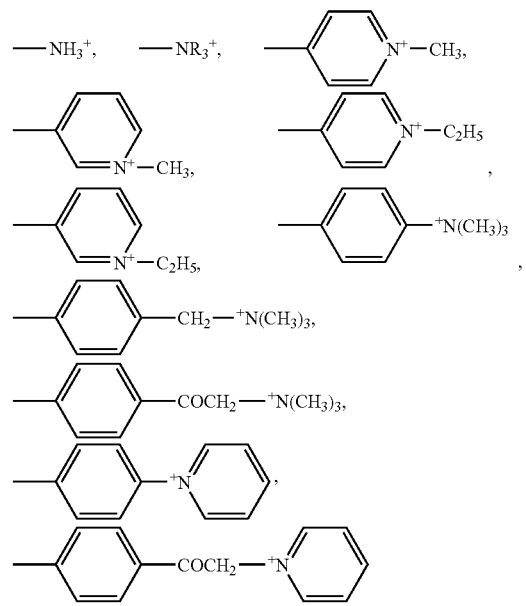

Any method may be used to produce a cationic self-dispersing carbon black having a hydrophilic group depending on the purpose. For example, to attach an N-ethyl-pyridyl group represented by the formula shown below, a carbon black is processed with 3-amino-N-ethylpyridium bromide.

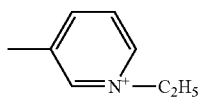

A hydrophilic group may be attached to the surface of a carbon black via another atomic group. As such an atomic group, for example, an alkyl group with 1-12 carbon atoms, a phenyl group with or without a substituent group, or a naphthyl group with or without a substituent group may be used. Exemplary combinations of a hydrophilic group and an atomic group to be attached to the surface of a carbon black include —C2H4COOM (M indicates alkali metal or quaternary ammonium), -PhSO3M (Ph indicates a phenyl group and M indicates alkali metal or quaternary ammonium), and —C5H10NH3+.

Also, a pigment dispersion liquid with a pigment dispersing agent may be used.

Natural hydrophilic polymers usable as pigment dispersing agents include vegetable polymers such as acacia gum, tragacanth gum, goor gum, karaya gum, locust bean gum, arabinogalactan, pectin, and quince seed starch; seaweed polymers such as alginic acid, carrageenan, and agar; animal polymers such as gelatin, casein, albumin, and collagen; and microbial polymers such as xanthene gum and dextran. Semisynthetic polymers usable as pigment dispersing agents include cellulose polymers such as methyl cellulose, ethyl cellulose, hydroxyethyl cellulose, hydroxypropyl cellulose, and carboxymethyl cellulose; starch polymers such as sodium carboxymethyl starch and starch glycolic acid sodium; and seaweed polymers such as sodium alginate and propylene glycol esters alginate. Synthetic polymers usable as pigment dispersing agents include vinyl polymers such as polyvinyl alcohol, polyvinylpyrrolidone, and polyvinyl methyl ether; acrylic resins such as non-crosslinked polyacrylamide, polyacrylic acid, alkali metal salt of polyacrylic acid, and water-soluble styrene acrylic resin; water-soluble styrene-maleic acid resin; water-soluble vinylnaphthalene acrylic resin; water soluble vinylnaphthalene-maleic acid resin, polyvinylpyrrolidone; alkali metal salt of β-naphthalenesulfonic acid formalin condensate; polymers having a salt of a cationic functional group such as quaternary ammonium or an amino group as a side chain, and natural polymers such as shellac. Among them, a copolymer with an introduced carboxyl group and made up of a homopolymer of acrylic acid, methacrylic acid, or styrene acrylic acid and a monomer having a hydrophilic group is especially preferable.

The weight-average molecular weight of the above copolymer-is preferably between 3,000-50,000 and more preferably between 7,000-15,000.

The mass ratio of an pigment to a dispersing agent is preferably between 1:0.06 and 1:3, and more preferably between 1:0.125 and 1:3.

The mass percentage of a colorant in an ink is preferably between 6 and 15%, and more preferably between 8 and 12%. When the mass percentage of a colorant is lower than 6%, the tinting strength and the viscosity of the ink become low. Low tinting strength results in low image density and low viscosity may cause feathering and bleeding. When the mass percentage of a colorant is more than 15%, the ink dries fast and may clog the nozzles on an ink jet recording apparatus. Also, the viscosity of the ink becomes very high and, as a result, the penetration capability of the ink becomes low. Drops of such an ink with high viscosity do not spread smoothly and lead to low image density.

Any humectant may be used depending on the purpose. For example, a polyol compound, a lactam compound, a urea compound, and a saccharide may be used individually or in combination.

Examples of polyol compounds include polyhydric alcohols, polyhydric alcohol alkyl ethers, polyhydric alcohol arylethers, nitrogen containing heterocyclic compounds, amides, amines, sulfur-containing compounds, propylene carbonate, and ethylene carbonate. The above substances may be used individually or in combination.

Examples of polyhydric alcohols include ethylene glycol, diethylene glycol, triethylene glycol, polyethylene glycol, polypropylene glycol, 1,3-propanediol, 1,3-butanediol, 1,4-butanediol, 3-methyl-1,3-butanediol, 1,3-propanediol, 1,5-pentanediol, 1,6-hexanediol, glycerol, 1,2,6-hexanetriol, 1,2,4-butanetriol, 1,2,3-butanetriol, and petriol.

Examples of polyhydric alcohol alkyl ethers include ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

Examples of polyhydric alcohol aryl ethers include ethylene glycol monophenyl ether and ethylene glycol monobenzyl ether.

Examples of nitrogen containing heterocyclic compounds include N-methyl-2-pyrrolidone, N-hydroxyethyl-2-pyrrolidone, 2-pyrrolidone, 1,3-dimethyl imidazolidinone, and ε-caprolactam.

Examples of amides include formamide, N-methylformamide, and N,N-dimethylformamide.

Examples of amines include monoethanolamine, diethanolamine, triethanolamine, monoethylamine, diethylamine, and triethylamine.

Examples of sulfur-containing compounds include dimethyl sulfoxide, sulfolane, and thiodiethanol.

Among them, the following substances have excellent solubility and beneficial effects in preventing degradation of spray performance caused by evaporation of moisture and are therefore preferable: glycerin, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol, 1,3-propanediol, 1,5-pentanediol, tetraethylene glycol, 1,6-hexanediol, 2-methyl-2,4-pentanediol, polyethylene glycol, 1,2,4-butanetriol, 1,2,6-hexanetriol, thiodiglycol, 2-pyrrolidone, N-methyl-2-pyrrolidone, and N-hydroxyethyl-2-pyrrolidone.

As a lactam compound, for example, at least any one of the following may be used: 2-pyrrolidone, N-methyl-2-pyrrolidone, N-hydroxyethyl-2-pyrrolidone, and ε-caprolactam.

As a urea compound, for example, at least any one of the following may be used: urea, thiourea, ethyleneurea, and 1,3-dimethyl-2-imidazolidinone. The mass percentage of a urea compound in an ink is preferably between 0.5 and 50%, and more preferably between 1 and 20%.

Examples of saccharides include monosaccharide, disaccharide, oligosaccharide (including trisaccharide and tetrasaccharide), polysaccharide, and their derivatives. Among the above saccharides, glucose, mannose, fructose, ribose, xylose, arabinose, galactose, maltose, cellobiose, lactose, sucrose, trehalose, and maltotriose are preferable; and multitose, sorbitose, gluconolactone, and maltose are especially preferable.

Polysaccharides are saccharides in a broad sense and may include substances found in nature such as α-cyclodextrin and cellulose.

Examples of saccharide derivatives include reducing sugar (for example, sugar alcohol: HOCH2(CHOH)nCH2OH [n is an integer between 2 and 5]), oxidized saccharide (for example, aldonic acid and uronic acid), amino acid, and thio-acid. Among the above saccharide derivatives, a sugar alcohol is especially preferable. Examples of sugar alcohols include maltitol and sorbitol.

The mass percentage of a humectant in an ink is preferably between 10 and 50%, and more preferably between 20 and 35%. When the amount of a humectant is very small, nozzles tend to easily dry and the spray performance is reduced. When the amount of a humectant is too large, the viscosity of the ink may become too high.

As a penetrant, for example, a water-soluble organic solvent such as a polyol compound or a glycol ether compound may be used. Especially, a polyol compound with 8 or more carbon atoms or a glycol ether compound is preferable.

When the number of carbon atoms of a polyol compound is less than 8, the penetration capability of the ink may become insufficient. An ink with low penetration capability may smear a recording medium in duplex printing. Also, since such an ink do not spread smoothly on a recording medium, some pixels may be left blank, and as a result, the quality of characters may be reduced and the density of an image may become low.

Examples of polyol compounds with 8 or more carbon atoms include 2-ethyl-1,3-hexanediol (solubility: 4.2% (25° C.)) and 2,2,4-trimethyl-1,3-pentanediol (solubility: 2.0% (25° C.)).

Any glycol ether compound may be used depending on the purpose. Examples of glycol ether compounds include polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; and polyhydric alcohol aryl ethers such as ethylene glycol monophenyl ether and ethylene glycol monobenzyl ether.

There is no specific limit to the amount of a penetrant in an ink. However, the amount of a penetrant is preferably between 0.1 and 20 mass percent, and more preferably between 0.5 and 10 mass percent.

Any surfactant may be used depending on the purpose. For example, an anion surfactant, a nonion surfactant, an amphoteric surfactant, or a fluorinated surfactant may be used. Examples of anion surfactants include polyoxyethylene alkyl ether acetate, dodecylbenzenesulfonate, laurylate, and salt of polyoxyethylene alkyl ether sulfate.

Examples of nonion surfactants include acetylene glycol surfactant, polyoxyethylene alkyl ether, polyoxyethylene alkyl phenyl ether, polyoxyethylene alkyl ester, and polyoxyethylene sorbitan fatty acid ester.

Examples of acetylene glycol surfactants include 2,4,7,9-tetramethyl-5-desine-4,7-diol, 3,6-dimethyl-4-octine-3,6-diol, and 3,5-dimethyl-1-hexin-3-ol. For example, the following acetylene glycol surfactants are available as commercialized products: Surfynol 104, 82, 465, 485, TG (Air Products and Chemicals, Inc.).

Examples of amphoteric surfactants include lauryl amino propionate, lauryl dimethyl betaine, stearyl dimethyl betaine, and lauryl dihydroxyethyl betaine. More specifically, examples of amphoteric surfactants include lauryl dimethyl amine oxide, myristyl dimethyl amine oxide, stearyl dimethyl amine oxide, dihydroxyethyl lauryl amine oxide, polyoxyethylene coconut oil alkyldimethyl amine oxide, dimethylalkyl (coconut) betaine, and dimethyl lauryl betaine.

Especially, surfactants represented by chemical formulas (I), (II), (III), (IV), (V), and (VI) shown below are preferable.

In chemical formula (I), R1 indicates an alkyl group with 6-14 carbon atoms. The alkyl group may be branched. h is an integer between 3 and 12. M indicates alkali metal ion, quaternary ammonium, quaternary phosphonium, or alkanolamine.

In chemical formula (II), R2 indicates an alkyl group with 5-16 carbon atoms. The alkyl group may be branched. M indicates alkali metal ion, quaternary ammonium, quaternary phosphonium, or alkanolamine.

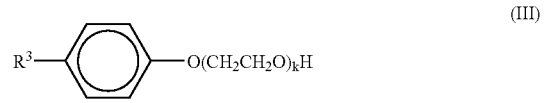

In chemical formula (III), R3 indicates a hydrocarbon radical, for example, an alkyl group with 6-14 carbon atoms. The alkyl group may be branched. k is an integer between 5 and 20.

In chemical formula (IV), R4 indicates a hydrocarbon radical, for example, an alkyl group with 6-14 carbon atoms. j is an integer between 5 and 20.

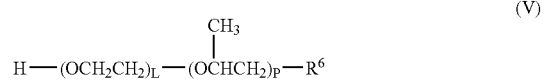

In chemical formula (V), R6 indicates a hydrocarbon radical, for example, an alkyl group with 6-14 carbon atoms. The alkyl group may be branched. L and p are integers between 1 and 20.

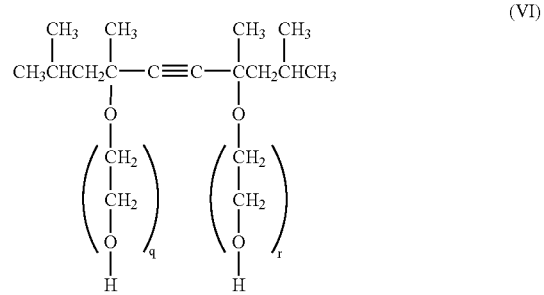

In chemical formula (VI), q and r are integers between 0 and 40.

The surfactants represented by chemical formulas (I) and (II) are shown in free acid forms below.

(I-1):

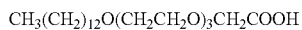

(I-2):

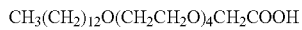

(I-3):

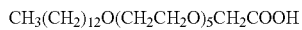

(I-4):

(I-5):

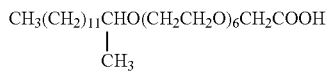

(I-6):

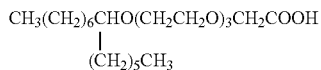

(II-1):

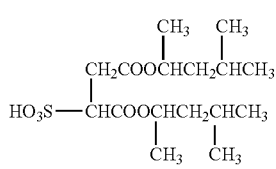

(II-2):

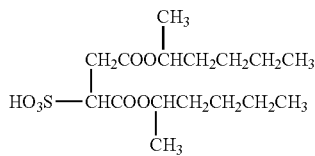

(II-3):

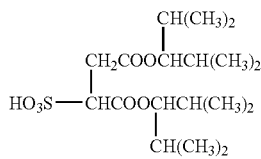

(II-4):

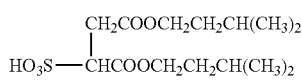

A fluorinated surfactant represented by chemical formula (A) below is preferably used.

$$CF_3CF_2(CF_2CF_2)m\text{-}CH_2CH2O(CH_2CH_2O)nH \quad (A)$$

In chemical formula (A), m indicates an integer between 0 and 10, and n indicates an integer between 1 and 40.

Examples of fluorinated surfactant include a perfluoroalkyl sulfonic acid compound, a perfluoroalkyl carvone compound, a perfluoroalkyl phosphoric ester compound, a perfluoroalkyl ethylene oxide adduct, and a polyoxyalkylene ether polymer compound having a perfluoroalkylether group as a side chain.

Among them, a polyoxyalkylene ether polymer compound having a perfluoroalkylether group as a side chain has a low foaming property and a low fluorine compound bioaccumulation potential and is therefore especially preferable in terms of safety.

Examples of perfluoroalkyl sulfonic acid compounds include perfluoroalkyl sulfonic acid and perfluoroalkyl sulfonate.

Examples of perfluoroalkyl carvone compounds include perfluoroalkyl carboxylic acid and perfluoroalkyl carboxylate.

Examples of perfluoroalkyl phosphoric ester compounds include perfluoroalkyl phosphoric ester and salt of perfluoroalkyl phosphoric ester.

Examples of polyoxyalkylene ether polymer compounds having a perfluoroalkylether group as a side chain include a polyoxyalkylene ether polymer having a perfluoroalkylether group as a side chain, a sulfate ester salt of a polyoxyalkylene ether polymer having a perfluoroalkylether group as a side chain, and a salt of a polyoxyalkylene ether polymer having a perfluoroalkylether group as a side chain.

Counter ions of salts in the above fluorinated surfactants include Li, Na, K, NH4, NH3CH2CH2OH, NH2(CH2CH2OH)2, and NH(CH2CH2OH)3.

Fluorinated surfactants created for the present invention or those available as commercial products may be used.

Commercially available fluorinated surfactants include Surflon S-111, S-112, S-113, S-121, S-131, S-132, S-141, S-145 (Asahi Glass Co., Ltd.); Fluorad FC-93, FC-95, FC-98, FC-129, FC-135, FC-170C, FC-430, FC-431 (Sumitomo 3M Limited); Megafac F-470, F1405, F-474 (Dainippon Ink and Chemicals, Incorporated); Zonyl TBS, FSP, FSA, FSN-100, FSN, FSO-100, FSO, FS-300, UR (DuPont); FT-110, FT-250, FT-251, FT-400S, FT-150, FT-400SW (NEOS Co. Ltd.); and PF-151N (Omnova Solutions, Inc.). Among them, in terms of reliability and color development, Zonyl FSN, FSO-100, and FSO (DuPont) are especially preferable.

Examples of other components in an ink include, but are not limited to, a resin emulsion, a pH adjuster, an antiseptic or a fungicide, a rust inhibitor, an antioxidant, an ultraviolet absorber, an oxygen absorber, and a light stabilizer.

A resin emulsion is made by dispersing resin microparticles in water as a continuous phase and may contain a dispersing agent such as a surfactant.

The mass percentage of the resin microparticles as a component of the disperse phase in a resin emulsion is preferably between 10 and 70%. The average particle diameter of the resin microparticles, especially for ink jet recording apparatuses, is preferably between 10 and 1000 nm, and more preferably between 20 and 300 nm.

Examples of resin microparticle materials include, but not limited to, acrylic resin, vinyl acetate resin, styrene resin, butadiene resin, styrene-butadiene resin, vinyl chloride resin, styrene-acrylic resin, and acrylic silicone resin. Especially, acrylic silicone resin is preferable.

Resin emulsions created for the present invention or those available as commercial products may be used.

Examples of commercially available resin emulsions include Microgel E-1002, E-5002 (styrene-acrylic resin emulsion, Nippon Paint Co., Ltd.); VONCOAT 4001 (acrylic resin emulsion, Dainippon Ink and Chemicals, Incorporated); VONCOAT 5454 (styrene-acrylic resin emulsion,. Dainippon Ink and Chemicals, Incorporated); SAE-1014 (styrene-acrylic resin emulsion, ZEON Corporation); Saibinol SK-200 (acrylic resin emulsion, Saiden Chemical Industry Co., Ltd.); Primal AC-22, AC-61 (acrylic resin emulsion, Rohm and Haas Company); Nanocryl SBCX-2821, 3689 (acrylic silicone resin, Toyo Ink Mfg. Co., Ltd.); and #3070 (methyl methacrylate polymer resin emulsion, Mikuni Color Ltd.).

The mass percentage of the resin microparticles in a resin emulsion is preferably between 0.1 and 50%, more preferably between 0.5 and 20%, and further preferably between 1 and 10%. When the mass percentage of the resin microparticles is less than 0.1%, the resin emulsion may not be able to prevent clogging or may not be able to improve spray stability. When the mass percentage of the resin microparticles is more than 50%, the preservation stability of the ink may be reduced.

Examples of antiseptics or fungicides include 1,2-benzisothiazolin-3-on, sodium dehydroacetate, sodium sorbate, 2-pyridinethiol-1-oxide sodium, sodium benzoate, and pentachlorophenol sodium.

Any pH adjuster that does not have negative effects on an ink and adjust the pH of an ink to 7 or higher may be used depending on the purpose.

Examples of pH adjusters include amines such as diethanolamine and triethanolamine; hydroxides of alkali metals such as lithium hydroxide, sodium hydroxide, and potassium hydroxide; and carbonates of alkali metals such as ammonium hydroxide, quaternary ammonium hydroxide, quaternary phosphonium hydroxide, lithium carbonate, sodium carbonate, and potassium carbonate.

Examples of rust inhibitors include acidic sulfite, sodium thiosulfate, ammonium thiodiglycolic acid, diisopropyl ammonium nitrite, pentaerythritol tetranitrate, and dicyclohexyl ammonium nitrite.

As antioxidants, phenolic antioxidants (including hindered phenol antioxidants), amine antioxidants, sulfur antioxidants, and phosphorus antioxidants may be used.

Examples of phenolic antioxidants (including hindered phenol antioxidants) include butylated hydroxyanisole, 2,6-di-tert-butyl-4-ethylphenol, stearyl-$\beta$-(3,5-di-tert-butyl-4-hydroxyphenyl)propionate, 2,2'-methylenebis(4-methyl-6-tert-butylphenol), 2,2'-methylenebis(4-ethyl-6-tert-butylphenol), 4,4'-butylidenbis(3-methyl-6-tert-butylphenol), 3,9-bis[1,1-dimethyl-2-[$\beta$-(3-tert-butyl-4-hydroxy-5-methylphenyl) propionyloxyt]ethyl]2,4,8,10-tetraixaspiro[5,5]undecane, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, and tetrakis[methylene-3(3',5'-di-tert-butyl-4'-hydroxyphenyl)propionate]methane.

Examples of amine antioxidants include phenyl-$\beta$-naphthylamine, $\alpha$-naphthylamine, N,N'-di-sec-butyl-p-phenylenediamine, N,N'-diphenyl-p-phenylenediamine, 2,6-di-tert-butyl-p-cresol, 2,6-di-tert-butylphenol, 2,4-dimethyl-6-tert-butyl-phenol, butylhydroxyanisol, 2,2'-methylenebis(4-methyl-6-tert-butylphenol), 4,4'-butylidenbis(3-methyl-6-tert-butylphenol), 4,4'-thiobis(3-methyl-6-tert-butylphenol), tetrakis[methylene-3(3,5-di-tert-butyl-4-dihydroxyphenyl) propionate]methane, and 1,1,3-tris(2-methyl-4-hydroxy-5-tert-butylphenyl)butane.

Examples of sulfur antioxidants include dilauryl3,3'-thiodipropionate, distearyl thiodipropionate, lauryl stearyl thiodipropionate, dimyristyl3,3'-thiodipropionate, distearyl$\beta,\beta'$-thiodipropionate, 2-mercaptobenzoimidazole, and dilauryl sulfide.

Examples of phosphorus antioxidants include triphenyl phosphite, octadecyl phosphite, triisodecyl phosphite, trilauryl trithiophosphite, and trinonyl phenyl phosphate.

Examples of ultraviolet absorbers include a benzophenone ultraviolet absorber, a benzotriazole ultraviolet absorber, a salicylate ultraviolet absorber, a cyanoacrylate ultraviolet absorber, and a nickel complex salt ultraviolet absorber.

Examples of benzophenone ultraviolet absorbers include 2-hydroxy-4-n-octoxybenzophenone, 2-hydroxy-4-n-dodecyloxy benzophenone, 2,4-dihydroxybenzophenone, 2-hydroxy-4-methoxybenzophenone, and 2,2',4,4'-tetrahydroxybenzophenone.

Examples of benzotriazole ultraviolet absorbers include 2-(2'-hydroxy-5'-tert-octylphenyl)benzotriazole, 2-(2'-hydroxy-5'-methylphenyl)benzotriazole, 2-(2'-hydroxy-4'-octoxyphenyl)benzotriazole, and 2-(2'-hydroxy-3'-tert-butyl-5'-methylphenyl)-5-chlorobenzotriazole.

Examples of salicylate ultraviolet absorbers include phenyl salicylate, p-tert-butylphenylsalicylate, and p-octylphenylsalicylate.

Examples of cyanoacrylate ultraviolet absorbers include ethyl-2-cyano-3,3'-diphenylacrylate, methyl-2-cyano-3-methyl-3-(p-methoxyphenyl)acrylate, and butyl-2-cyano-3-metyl-3-(p-methoxyphenyl)acrylate.

Examples of nickel complex salt ultraviolet absorbers include nickelbis(octylphenyl)sulfide, 2,2'-tiobis(4-tert-octylphalate)-n-butylaminenickel(II), 2,2'-tiobis(4-tert-octylphalate)-2-ethylhexylaminenickel(II), and 2,2'-tiobis(4-tert-octylphalate)triethanolaminenickel(II).

An ink according to an embodiment of the present invention contains at least water, a colorant, and a humectant, and may also include a penetrant, a surfactant, and other components. To prepare an ink, the above components are dispersed or dissolved in an aqueous medium. The solution may be stirred if needed. To disperse the components, for example, a sand mill, a homogenizer, a ball mill, a paint shaker, or an ultrasound dispersing machine may be used. To stir the solution, a normal stirring machine having stirring blades, magnetic stirrer, or a high-speed dispersing machine may be used.

At a temperature of 20° C., the viscosity of an ink is preferably between 1 and 30 cPs, and more preferably between 2 and 20 cPs. When the viscosity is higher than 20 cPs, spray stability may be reduced. The pH of an ink is preferably between 7 and 10.

Colors of inks include, but not limited to, yellow, magenta, cyan, and ink. A multi-color image can be formed with two or more color inks. A full-color image can be formed with the four color ink.

Detailed embodiments of the present invention are described below. However, the present invention is not limited to the specifically disclosed embodiments.

PREPARATION EXAMPLE 1

Preparation of Dispersion of Polymer Microparticles Containing Copper Phthalocyanine Pigment To prepare a dispersion of polymer microparticles containing a copper phthalocyanine pigment, the air in a 1 L flask with a mechanical stirrer, a thermometer, a nitrogen gas inlet tube, a reflux tube, and a dropping funnel was replaced sufficiently with nitrogen gas; the 1 L flask was charged with 11.2 g of styrene, 2.8 g of acrylic acid, 12.0 g of lauryl methacrylate, 4.0 g of polyethylene glycol methacrylate, 4.0 g of styrene macromer (Toagosei Co., Ltd., brand name: AS-6), and 0.4 g of mercaptoethanol; and the temperature was raised to 65° C. Then, a mixed solution of 100.8 g styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer (Toagosei Co., Ltd., brand name: AS-6), 3.6 g of mercaptoethanol, 2.4 g of azobisdimethylvaleronitrile, and 18.0 g of methyl ethyl ketone was dripped into the 1 L flask for 2.5 hours.

After the dripping was completed, a mixed solution of 0.8 g of azobisdimethylvaleronitrile and 18.0 g of methyl ethyl ketone was dripped into the 1 L flask for 0.5 hours. The resulting solution was matured for 1 hour at the temperature of 65° C., 0.8 g of azobisdimethylvaleronitrile was added to the solution, and then the solution was matured further for 1 hour. After the reaction stopped, 364 g of methyl ethyl ketone was put into the 1 L flask. As a result, 800 g of polymer solution with a concentration of 50 mass % was obtained. A portion of the obtained polymer solution was dried and its weight-average molecular weight (Mw) was measured by gel permeation chromatography (standard: polystyrene, solvent: tetrahydrofuran). The weight-average molecular weight was 15,000.

Next, 28 g of the obtained polymer solution, 26 g of copper phthalocyanine pigment, 13.6 g of 1 mol/L potassium hydroxide solution, 20 g of methyl ethyl ketone, and 30 g of ion-exchanged water were mixed and stirred sufficiently. The resulting substance was kneaded 20 times using the Tripole Roll Mill (Noritake Co., Limited, brand name: NR-84A). The obtained paste was put in 200 g of ion-exchanged water and stirred. Methyl ethyl ketone and water in the liquid was distilled away by using an evaporator. As a result, 160 g of polymer microparticle dispersion with a cyan color was obtained. The solid content of the polymer microparticle dispersion was 20.0 mass %.

The average particle diameter (D50%) of the polymer microparticles in the polymer microparticle dispersion was measured with a particle size distribution analyzer (Microtrac UPA, Nikkiso Co., Ltd.). The average particle diameter was 93 nm.

PREPARATION EXAMPLE 2

Preparation of Dispersion of Polymer Microparticles Containing Dimethyl Quinacridone Pigment A polymer microparticle dispersion with magenta color was prepared in substantially the same manner as the preparation example 1, except that C. I. Pigment Red 122 was used instead of a copper phthalocyanine pigment.

The average particle diameter (D50%) of the polymer microparticles in the polymer microparticle dispersion was measured with a particle size distribution analyzer (Microtrac UPA, Nikkiso Co., Ltd.). The average particle diameter was 127 nm.

PREPARATION EXAMPLE 3

Preparation of Dispersion of Polymer Microparticles Containing Monoazo Yellow Pigment A polymer microparticle dispersion with a yellow color was prepared in substantially the same manner as the preparation example 1, except that C. I. Pigment Yellow 74 was used instead of a copper phthalocyanine pigment.

The average particle diameter (D50%) of the polymer microparticles in the polymer microparticle dispersion was measured with a particle size distribution analyzer (Microtrac UPA, Nikkiso Co., Ltd.). The average particle diameter was 76 nm.

PREPARATIN EXAMPLE 4

Preparation of Dispersion of Carbon Black Processed with Sulfonating Agent

To prepare a carbon black dispersion, 150 g of a commercially available carbon black pigment (Printex #85, Degussa) was mixed in 400 ml of sulfolane; the solution was microdispersed with a beads mill; 15 g of amidosulfuric acid was added to the solution; and then the solution was stirred for 10 hours at 140-150° C. The obtained slurry was put in 1000 ml of ion-exchanged water, and the solution was centrifuged at 12,000 rpm. As a result, a surface-treated carbon black wet cake was obtained. The obtained carbon black wet cake was dispersed again in 2,000 ml of ion-exchanged water; the pH of the solution was adjusted with lithium hydroxide; the solution was desalted/condensed using a ultrafilter; and then the solution was filtered with a nylon filter with an average pore diameter of 1 µm. As a result, a black carbon dispersion with a pigment concentration of 10 mass % was obtained.

The average particle diameter (D50%) of the microparticles in the carbon black dispersion was measured with a particle size distribution analyzer (Microtrac UPA, Nikkiso Co., Ltd.). The average particle diameter was 80 nm.

PRODUCTION EXAMPLE 1

Production of Cyan Ink

To produce a cyan ink, 20.0 mass % of the dispersion of polymer microparticles containing a copper phthalocyanine pigment prepared in the preparation example 1, 23.0 mass % of 3-methyl-1,3-butanediol, 8.0 mass % of glycerin, 2.0 mass % of 2-ethyl-1,3-hexanediol, 2.5 mass % of FS-300 (DuPont) used as a fluorinated surfactant, 0.2 mass % of Proxel LV (Avecia KK) used as an antiseptic or a fungicide, 0.5 mass % of 2-amino-2-ethyl-1,3-propanediol, and a certain amount of ion-exchanged water were mixed (100 mass % in total); and the mixture was filtered using a membrane filter with an average pore diameter of 0.8 µm.

PRODUCTION EXAMPLE 2

Production of Magenta Ink

To produce a magenta ink, 20.0 mass % of the dispersion of polymer microparticles containing a dimethyl quinacridone pigment prepared in the preparation example 2, 22.5 mass % of 3-methyl-1,3-butanediol, 9.0 mass % of glycerin, 2.0 mass % of 2-ethyl-1,3-hexanediol, 2.5 mass % of FS-300 (DuPont) used as a fluorinated surfactant, 0.2 mass % of Proxel LV (Avecia KK) used as an antiseptic or a fungicide, 0.5 mass % of 1-amino-2,3-propanediol, and a certain amount of ion-exchanged water were mixed (100 mass % in total); and the mixture was filtered using a membrane filter with an average pore diameter of 0.8 µm.

PRODUCTION EXAMPLE 3

Production of Yellow Ink

To produce a yellow ink, 20.0 mass % of the dispersion of polymer microparticles containing a monoazo yellow pigment prepared in the preparation example 3, 24.5 mass % of 3-methyl-1,3-butanediol, 8 mass % of glycerin, 2.0 mass % of 2-ethyl-1,3-hexanediol, 2.5 mass % of FS-300 (DuPont) used as a fluorinated surfactant, 0.2 mass % of Proxel LV (Avecia KK) used as an antiseptic or a fungicide, 0.5 mass % of 2-amino-2-methyl-1,3-propanediol, and a certain amount of ion-exchanged water were mixed (100 mass % in total); and the mixture was filtered using a membrane filter with an average pore diameter of 0.8 μm.

PRODUCTION EXAMPLE 4

Production of Black Ink

To produce a black ink, 20.0 mass % of the carbon black dispersion prepared in the preparation example 4, 22.5 mass % of 3-methyl-1,3-butanediol, 7.5 mass % of glycerin, 2.0 mass % of 2-pyrrolidone, 2.0 mass % of 2-ethyl-1,3-hexanediol, 2.5 mass % of FS-300 (DuPont) used as a fluorinated surfactant, 0.2 mass % of Proxel LV (Avecia KK) used as an antiseptic or a fungicide, 0.2 mass % of choline, and a certain amount of ion-exchanged water were mixed (100 mass % in total); and the mixture was filtered using a membrane filter with an average pore diameter of 0.8 μm.

The surface tensions and viscosities of the inks produced in the production examples 1 through 4 were measured as described below. The results are shown in table 4 below.

<Measurement of Viscosity>

The viscosities of the inks were measured at 25° C. with the R-500 Viscometer of Toki Sangyo Co., Ltd. (cone 1° 34'× R24, 60 rpm, after 3 minutes).

<Measurement of Surface Tension>

The static surface tensions of inks were measured at 25° C. with a surface tensiometer (CBVP-Z of Kyowa Interface Science Co., Ltd.) using a platinum plate.

TABLE 4

|  | Viscosity (mPa·s) | Surface tension (mN/m) |
| --- | --- | --- |
| Production example 1 | 8.05 | 25.4 |
| Production example 2 | 8.09 | 25.4 |
| Production example 3 | 8.11 | 25.7 |
| Production example 4 | 8.24 | 25.4 |

Production of Base Material

A base material with a grammage of 79 g/m² was produced using a fourdrinier from 0.3 mass % slurry made of materials in the formula below. In the size press step of the papermaking process, an oxidized starch solution was applied on the base material. The solid content of the oxidized starch on the base material was 1.0 g/m².

| Leaf bleached kraft pulp (LBKP) | 80 mass % |
| --- | --- |
| Needle bleached kraft pulp (NBKP) | 20 mass % |
| Precipitated calcium carbonate (brand name: TP-121, Okutama Kogyo Co., Ltd.) | 10 mass % |
| Aluminum sulfate | 1.0 mass % |
| Amphoteric starch (brand name: Cato3210, Nippon NSC Ltd.) | 1.0 mass % |

-continued

| Neutral rosin size (brand name: NeuSize M-10, Harima Chemicals, Inc.) | 0.3 mass % |
| --- | --- |
| Retention aid (brand name: NR-11LS, HYMO Co., Ltd.) | 0.02 mass % |

PRODUCTION EXAMPLE 9

Production of Recording Medium 1

A coating liquid with a solid content concentration of 60 mass % was produced by mixing 70 mass % of clay used as a pigment in which clay 97 mass % of particles have a diameter of 2 μm or smaller; 30 mass % of heavy calcium carbonate with an average particle diameter of 1.1 μm; 8 mass % of styrene-butadiene copolymer emulsion, used as an adhesive, with a glass-transition temperature (Tg) of −5° C.; 1 mass % of phosphoric esterified starch; 0.5 mass % of calcium stearate used as an aid; and water.

To produce the recording medium 1, the obtained coating liquid was applied on both sides of the above base material so that 8 g/m² of solid content of the coating liquid adheres to each side using a blade coater; and the base material was dried by hot air and supercalendered.

PRODUCTION EXAMPLE 10

Production of Recording Medium 2

A coating liquid with a solid content concentration of 60 mass % was produced by mixing 70 mass % of clay used as a pigment in which clay 97 mass % of particles have a diameter of 2 μm or smaller; 30 mass % of heavy calcium carbonate with an average particle diameter of 1.1 μm; 7 mass % of styrene-butadiene copolymer emulsion, used as an adhesive, with a glass-transition temperature (Tg) of −5° C.; 0.7 mass % of phosphoric esterified starch; 0.5 mass % of calcium stearate used as an aid; and water.

To produce the recording medium 2, the obtained coating liquid was applied on both sides of the above base material so that 8 g/m² of solid content of the coating liquid adheres to each side using a blade coater; and the base material was dried by hot air and supercalendered.

First Embodiment

Ink Set, Recording Medium, and Image Recording

By a conventional method, an ink set 1 made up of the cyan ink produced in the production example 1, the magenta ink produced in the production example 2, the yellow ink produced in the production example 3, and the black ink produced in the production example 4 was prepared.

Images were printed on the recording medium 1 with the ink set 1 (largest ink drop size: 18 pl) at an image resolution of 600 dpi using a 300 dpi image forming apparatus having nozzles with a nozzle resolution of 384 according to an embodiment of the present invention. The total amount of ink per unit area for a secondary color was limited to 140% and solid-color images and characters were formed.

COMPARATIVE EXAMPLE 1

Ink Set, Recording Medium, and Image Recording

Images were formed in substantially the same manner as the first embodiment, except that a commercially available coated paper for offset printing (brand name: Aurora Coat, grammage=104.7 g/m², Nippon Paper Industries Co., Ltd.) was used as a recording medium.

COMPARATIVE EXAMPLE 2

Ink Set, Recording Medium, and Image Recording

Images were formed in substantially the same manner as the first embodiment, except that a commercially available matt coated paper for ink jet printing (brand name: Superfine, Seiko Epson Corporation) was used as a recording medium.

Second Embodiment

Ink Set, Recording Medium, and Image Recording

Images were formed in substantially the same manner as the first embodiment, except that the recording medium 2 was used as a recording medium.

Third Embodiment

Ink Set, Recording Medium, and Image Recording

Images were formed in substantially the same manner as the first embodiment, except that a commercially available coated paper for gravure printing (brand name: Space DX, grammage=56 g/m², Nippon Paper Industries Co., Ltd.) (hereafter called a recording medium 3) was used as a recording medium.

COMPARATIVE EXAMPLE 3

Ink Set, Recording Medium, and Image Recording

Images were formed in substantially the same manner as the first embodiment, except that an ink set 2 made up of the cyan ink produced in the production example 5, the magenta ink produced in the production example 6, the yellow ink produced in the production example 7, and the black ink produced in the production example 8 was used.

COMPARATIVE EXAMPLE 4

Ink Set, Recording Medium, and Image Recording

Images were formed in substantially the same manner as the first embodiment, except that the ink set 2 and a commercially available coated paper for offset printing (brand name: Aurora Coat, grammage=104.7 g/m², Nippon Paper Industries Co., Ltd.) were used instead of the ink set 1 and the recording medium 1.

COMPARATIVE EXAMPLE 5

Ink Set, Recording Medium, and Image Recording

Images were formed in substantially the same manner as the first embodiment, except that the ink set 2 and a commercially available matt coated paper for ink jet printing (brand name: Superfine, Seiko Epson Corporation) were used instead of the ink set 1 and the recording medium 1.

COMPARATIVE EXAMPLE 6

Ink Set, Recording Medium, and Image Recording

Images were formed in substantially the same manner as the first embodiment, except that the ink set 2 and the recording medium 2 were used instead of the ink set 1 and the recording medium 1.

For each of the recording medium 1, the recording medium 2, the recording medium 3, and the recording media used in the comparative examples 4 and 5, the amount of transferred pure water and the amount of transferred cyan ink produced in the production example 1 were measured as described below using a dynamic scanning absorptometer. The results are shown in table 5.

Also, for each of the recording medium 1, the recording medium 2, and the recording media used in the comparative examples 4 and 5, the amount of transferred cyan ink produced in the production example 5 was measured as described below using a dynamic scanning absorptometer. The results are shown in table 6.

<Measurement of Amounts of Transferred Pure Water and Cyan Ink with Dynamic Scanning Absorptometer>

For each of the above recording media, the amounts of transferred pure water and cyan ink were measured using a dynamic scanning absorptometer (K350 series, type D, Kyowa Co., Ltd.). The amounts of transferred pure water and cyan ink at a contact time of 100 ms and 400 ms were obtained by interpolation, using the transferred amounts measured at time points around each contact time.

TABLE 5

| | Pure water | | Cyan ink (production example 1) | |
|---|---|---|---|---|
| Recording media | Contact time: 100 ms | Contact time: 400 ms | Contact time: 100 ms | Contact time: 400 ms |
| Recording medium 1 | 10.1 ml/m² | 20.2 ml/m² | 7.2 ml/m² | 14.8 ml/m² |
| Recording medium 2 | 25.2 ml/m² | 28.5 ml/m² | 14.6 ml/m² | 19.4 ml/m² |
| Recording medium 3 | 10.4 ml/m² | 21.8 ml/m² | 6.4 ml/m² | 8.8 ml/m² |
| Comparative example 4 | 2.8 ml/m² | 3.4 ml/m² | 2.7 ml/m² | 3.1 ml/m² |
| Comparative example 5 | 41.0 ml/m² | 44.8 ml/m² | 38.1 ml/m² | 46.2 ml/m² |

TABLE 6

| | Cyan ink (production example 5) | |
|---|---|---|
| Recording media | Contact time: 100 ms | Contact time: 400 ms |
| Recording medium 1 | 2.7 ml/m² | 4.1 ml/m² |
| Recording medium 2 | 3.8 ml/m² | 5.6 ml/m² |
| Comparative example 4 | 0.6 ml/m² | 0.9 ml/m² |
| Comparative example 5 | 31.3 ml/m² | 36.8 ml/m² |

The quality of the images printed in the first through third embodiments and the comparative examples 1 through 6 were evaluated in terms of beading, bleeding, spur marks, and glossiness. The results are shown in table 7.

<Beading>

The degree of beading in the printed green solid-color image was evaluated by eye observation according to the evaluation criteria below.

[Evaluation Criteria]
AA: No beading is observed and image is evenly printed.
BB: Beading is slightly observed.
CC: Beading is clearly observed.
DD: Excessive beading is observed.

<Bleeding>

The degree of bleeding of the printed black characters in the yellow background was evaluated by eye observation according to the evaluation criteria below.

[Evaluation Criteria]
AA: No bleeding is observed and characters are clearly printed.
BB: Bleeding is slightly observed.
CC: Bleeding is clearly observed.
DD: Excessive bleeding is observed and outlines of characters are blurred.

<Spur Marks>

The degree of spur marks in the printed images was evaluated by eye observation according to the evaluation criteria below.

[Evaluation Criteria]
AA: No spur mark is observed.
BB: Spur marks are observed slightly.
CC: Spur marks are clearly observed.
DD: Excessive spur marks are observed.

<Glossiness>

The degree of glossiness of the printed images was evaluated by eye observation according to the evaluation criteria below.

[Evaluation Criteria]

TABLE 7

|  | Beading | Bleeding | Spur mark | Glossiness |
| --- | --- | --- | --- | --- |
| First embodiment | BB | BB | BB | BB |
| Second embodiment | AA | AA | AA | BB |
| Third embodiment | BB | BB | BB | AA |
| Comparative Example 1 | DD | CC | DD | BB |
| Comparative Example 2 | AA | AA | AA | CC |
| Comparative Example 3 | DD | DD | DD | BB |
| Comparative Example 4 | CC | CC | CC | BB |
| Comparative Example 5 | DD | DD | DD | BB |
| Comparative Example 6 | AA | AA | AA | CC |

AA: Images are highly glossy.
BB: Images are glossy.
CC: Images are not glossy.

As described above, in each of the first through third embodiments, an ink containing at least water, a colorant, and a humectant and having a surface tension between 20 and 35 mN/m at 25° C.; and a recording medium the amount of ink transferred onto which recording medium measured by a dynamic scanning absorptometer is between 4 and 15 ml m² at a contact time of 100 ms and between 7 and 20 ml/m² at a contact time of 400 ms were used as an ink-recording medium set. Compared with the ink-recording medium sets used in the comparative examples 1 through 6, the ink-recording medium sets used in the first through third embodiments showed excellent evaluation results in terms of beading, bleeding, spur marks, and glossiness.

Figure 29:
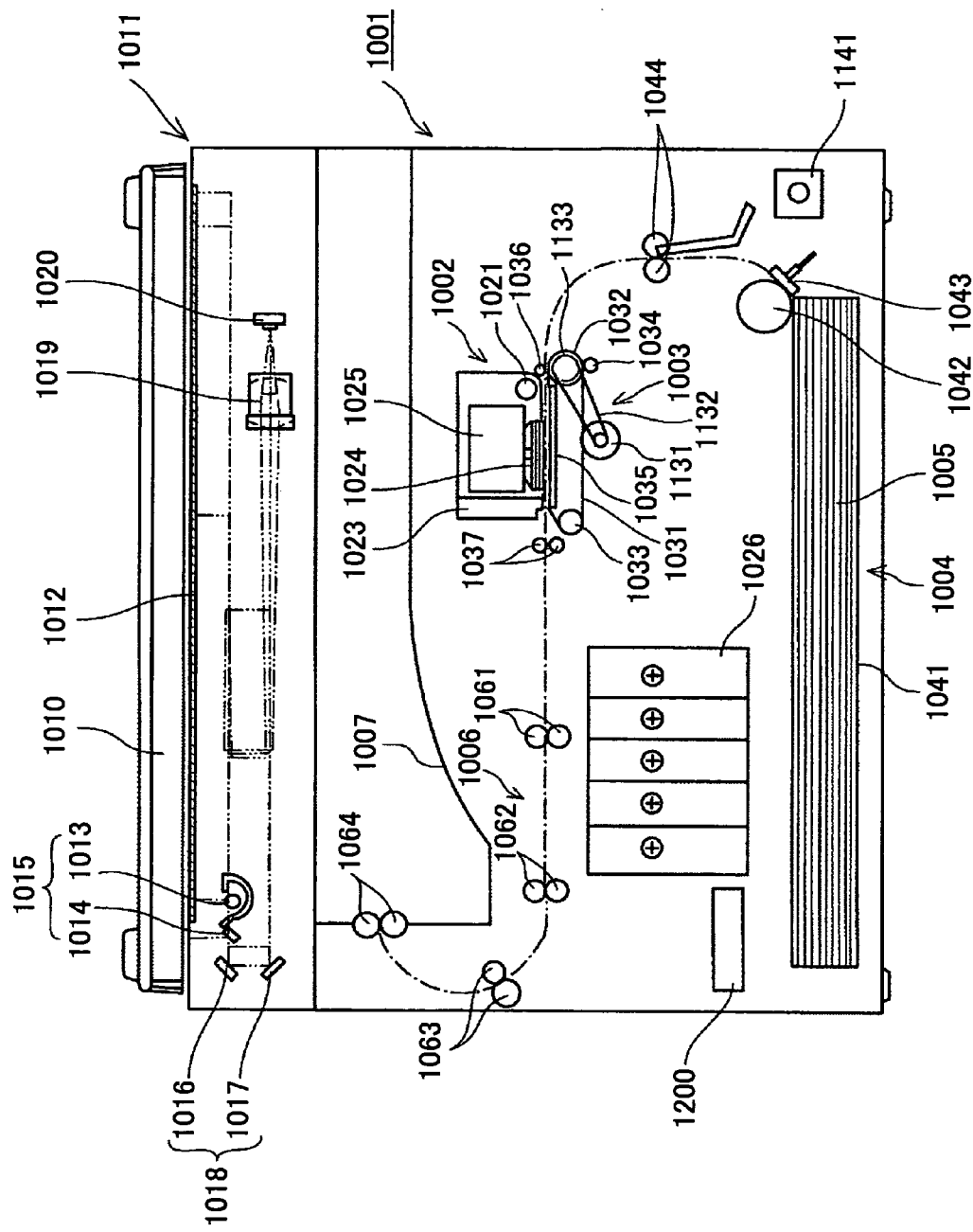
FIG. 29 is a drawing illustrating the configuration of an exemplary image forming apparatus according to an embodiment of the present invention.

An exemplary image forming apparatus (multifunction printer) having functions of an ink jet recording apparatus and a copier is described below with reference to FIG. 29. FIG. 29 is a drawing illustrating the configuration of the exemplary image forming apparatus.

The body 1001 of the exemplary image forming apparatus includes an image forming unit 1002 for forming an image and a sub-scanning conveying unit 1003 (these two components are collectively called a printer engine unit). In the exemplary image forming apparatus, recording media (paper sheets) 1005 are fed one by one from a paper feeding unit 1004 at the bottom of the body 1001, the sub-scanning conveying unit 1003 conveys the paper sheet 1005 in a position facing the image forming unit 1002, the image forming unit 1002 sprays liquid drops onto the paper sheet 1005 and thereby forms (records) an image, then the paper sheet 1005 is ejected via a paper conveying/ejecting unit 1006 onto a paper catch tray 1007 at the upper side of the body 1001.

The exemplary image forming apparatus also includes an image scanning unit 1011 for scanning an image. The image scanning unit 1011 is positioned above the paper catch tray 1007 of the body 1001 and is used to input image (print data) to be formed by the image forming unit 1002. The image scanning unit 1011 includes a scanning optical system 1015 including a light source 1013 and a mirror 1014; a scanning optical system 1018 including mirrors 1016 and 1017; a contact glass 1012; a lens 1019; and an image scanning element 1020. The scanning optical system 1015 and the scanning optical system 1018 move and scan a document on the contact glass 1012; and the image scanning element 1020 receives the scanned image of the document as an image signal. The image signal is digitized, processed, and then printed. The image scanning unit 1011 also includes a pressing plate 1010 above the contact glass 1012 to hold down a document.

The exemplary image forming apparatus also includes an interface for receiving print data including data of an image to be formed by the image forming unit 1002 via a cable or a network from a host, for example, an information processing apparatus such as a personal computer for processing an image, an image reading apparatus such as an image scanner, and an imaging apparatus such as a digital camera.

The image forming unit 1002 is a shuttle type and has a similar configuration to that of an ink jet recording apparatus (image forming apparatus) described above. The image forming unit 1002 includes a carriage 1023 that is movable in the main scanning direction (the direction that is orthogonal to the paper conveying direction); a guide rod 1021 that guides the carriage 1023; and recording heads 1024 including one or more liquid drop spraying heads each having arrays of nozzles for spraying liquid drops of different colors. In the image forming unit 1002, an image is formed by spraying liquid drops from the recording heads 1024 on the carriage 1023, which is being moved by a carriage scanning mechanism in the main scanning direction, while feeding the paper sheet 1005 in the paper conveying direction (sub scanning direction) by the sub scanning conveying unit 1003. The image forming unit 1002 may be configured as a line type that uses line-type heads.

The recording heads 1024 include arrays of nozzles for spraying black (K), cyan (C), magenta (M), and yellow (Y) inks. The recording heads 1024 are supplied with the color inks form sub-tanks 1025 on the carriage 1023. The sub tanks 1025 are supplied with the color inks through ink supply tubes (not shown) from detachable ink cartridges (main tanks) 1026 in the body 1001.

The sub scanning conveying unit 1003 includes a conveying roller 1032 used as a drive roller; a driven roller 1033; an endless conveyor belt 1031 stretched between the conveying roller 1032 and the driven roller 1033, which conveyor belt 1031 changes the direction of the paper sheet 1005 fed from the paper feeding unit 1004 approximately 90 degrees and then conveys the paper sheet 1005 in a position facing the image forming unit 1002; a charging roller 1034, to which an AC bias for charging the surface of the conveyor belt 1031 is applied; a guide 1035 for guiding the conveyor belt 1031 in an area facing the image forming unit 1002; a pressing roller 1036 for pressing the paper sheet 1005 to the conveyor belt 1031 in a position facing the conveying roller 1032; and conveying rollers 1037 for sending out the paper sheet 1005 on which an image has been formed by the image forming unit 1002 to the paper conveying/ejecting unit 1006.

The conveyor belt 1031 of the sub scanning conveying unit 1003 is turned in the sub scanning direction by the conveying roller 1032 that is rotated by a sub scanning motor 1131 via a timing belt 1132 and a timing roller 1133.

The paper feeding unit 1004 is removable from the body 1001 and includes a paper feed tray 1041 for holding the paper sheets 1005; a paper feed roller 1042 and a friction pad 1043 for separating the paper sheets 1005 and feeding them one by one from the paper feed tray 1041; and paper conveying rollers 1044 used as resist rollers for conveying the paper sheet 1005 to the sub scanning conveying unit 1003. The paper feed roller 1042 is rotated by a paper feed motor 1141 such as an HB stepping motor via a paper feed clutch (not shown). The paper conveying rollers 1044 are also rotated by the paper feed motor 1141.

The paper conveying/ejecting unit 1006 includes paper conveying/ejecting rollers 1061 and 1062 for conveying the paper sheet 1005 on which an image has been formed; and paper conveying/ejecting rollers 1063 and paper ejecting rollers 1064 for ejecting the paper sheet 1005 to the paper catch tray 1007.

Figure 30:
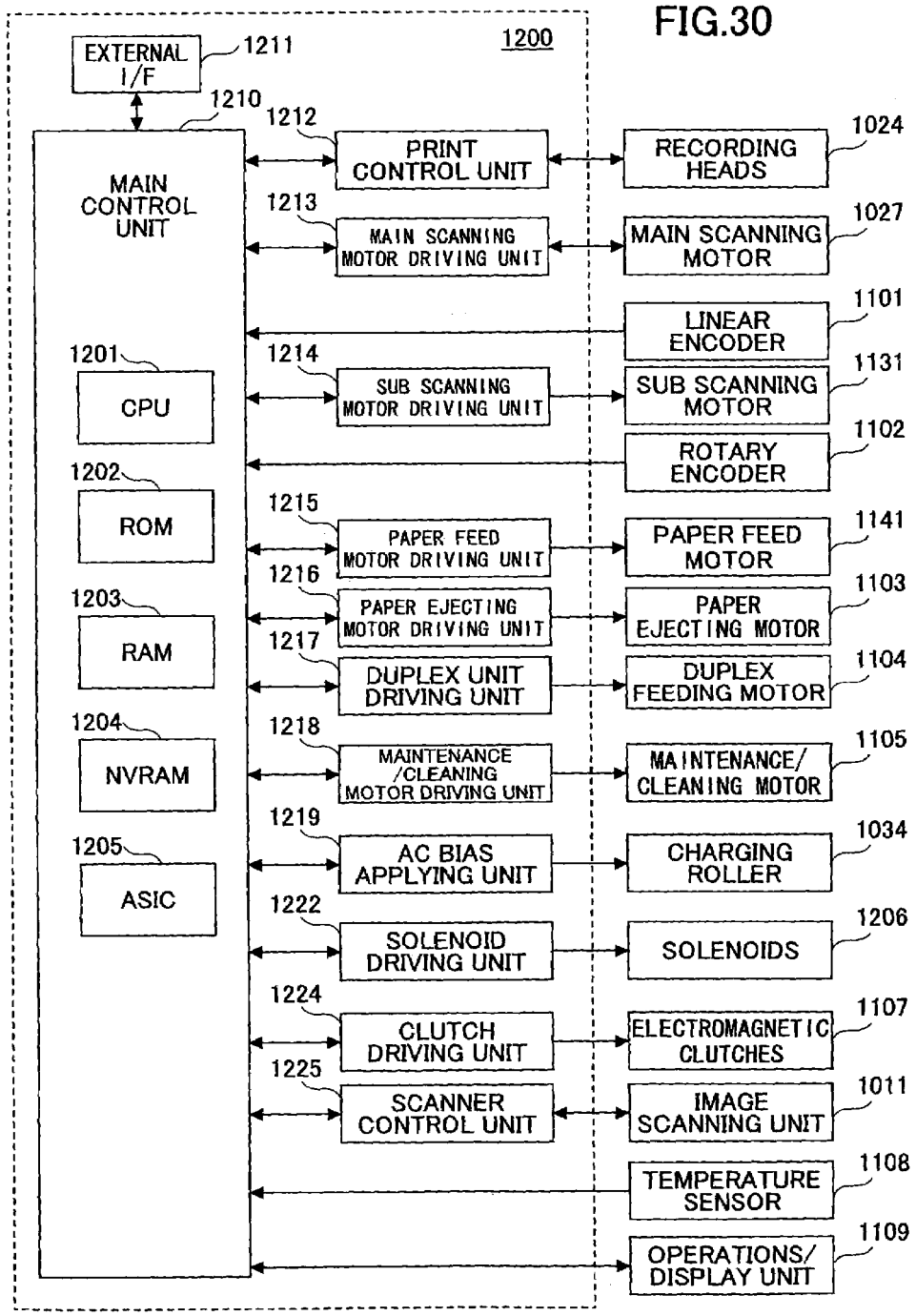
FIG. 30 is a block diagram illustrating an exemplary control unit of the exemplary image forming apparatus.

An exemplary control unit of the exemplary image forming apparatus is outlined below with reference to the block diagram shown in FIG. 30.

The control unit 1200 includes a main control unit 1210 for controlling the entire operations of the exemplary image forming apparatus. The main control unit 1210 includes a CPU 1201; a ROM 1202 for storing a program for causing the CPU 1201 to perform an image processing method according to an embodiment of the present invention, other programs, and fixed data; a RAM 1203 for temporarily storing image data; a non-volatile memory (NVRAM) 1204 that retains data even when the power is off; and an ASIC 1205 that performs image processing such as halftone processing on image data.

The control unit 1200 also includes an external I/F 1211 for sending/receiving data and signals between the main control unit 1210 and a host such as an information processing apparatus used as an image processing apparatus; a print control unit 1212 including a head driver for controlling the recording heads 1024; a main scanning motor driving unit (motor driver) 1213 for driving a main scanning motor 1027 that moves the carriage 1023; a sub scanning motor driving unit 1214 for driving the sub scanning motor 1131; a paper feed motor driving unit 1215 for driving the paper feed motor 1141; a paper ejecting motor driving unit 1216 for driving a paper ejecting motor 1103 that drives rollers in the paper conveying/ejecting unit 1006; a duplex unit driving unit 1217 for driving a duplex feeding motor 1104 that drives rollers in a duplex unit (not shown); a maintenance/cleaning motor driving unit 1218 for driving a maintenance/cleaning motor 1105 that drives a recording head maintenance/cleaning mechanism (not shown); and an AC bias applying unit 1219 for applying an AC bias to the charging roller 1034.

The control unit 1200 further includes a solenoid driving unit (driver) 1222 for driving solenoids (SOL) 1206; a clutch driving unit 1224 for driving electromagnetic clutches 1107 used for paper feeding; and a scanner control unit 1225 for controlling the image scanning unit 1011.

The main control unit 1210 receives a detection signal from a temperature sensor 1108 that detects the temperature on the conveyor belt 1031. Although the main control unit 1210 also receives detection signals from other sensors, those sensors are omitted in FIG. 30. Also, the main control unit 1210 receives key inputs from and sends display information to an operations/display unit 1109 on the body 1001. The operations/display unit 1109 includes keys such as numeric keys and a print start key and displays.

Further, the main control unit 1210 receives an output signal (pulse) from a linear encoder 1101 for detecting the travel distance and the movement speed of the carriage 1023, and an output signal (pulse) from a rotary encoder 1102 for detecting the travel distance and the movement speed of the conveyor belt 1031. Based on the correlation of the output signals, the main control unit 1210 causes the main scanning motor driving unit 1213 to drive the main scanning motor 1027 and thereby to move the carriage 1023; and causes the sub scanning motor driving unit 1214 to drive the sub scanning motor 1131 and thereby to move the conveyor belt 1031 for conveying the paper sheet 1005.

An exemplary image forming process in the exemplary image forming apparatus is described below. The AC bias applying unit 1219 applies an alternating voltage, which is a high voltage of a rectangular wave having positive and negative peaks, to the charging roller 1034. The charging roller 1034 brought into contact with an insulating layer (surface layer) of the conveyor belt 1031 charges the insulating layer and forms strip-shaped positively-charged and negatively-charged areas alternately in the paper conveying direction. As a result, non-uniform electric fields are formed on the conveyor belt 1031.

The paper sheet 1005 is fed from the paper feeding unit 1004 into the space between the conveying roller 1032 and the pressing roller 1036, and then placed on the conveyor belt 1031 where non-uniform electric fields are formed. The paper sheet 1005 is instantly polarized along the directions of the electric fields, thereby attracted to the conveyor belt 1031, and conveyed as the conveyor belt 1031 rotates.

While the paper sheet 1005 is intermittently conveyed by the conveyor belt 1031, the recording heads 1024 spray drops of recording liquids according to print data and thereby forms an image on the paper sheet 1005. Then, the paper sheet 1005 is separated by a separating claw and ejected into the paper catch tray 1007 by the paper conveying/ejecting unit 1006.

When printing (or copying) an image by the exemplary image forming apparatus on a commercial printing paper such as gloss paper on which liquid drops do not spread but clump together, occurrences of problems such as beading and tone jump can be reduced and the quality of a printed (copied) image can be improved by processing image data with an image processing method according to an embodiment of the present invention. Also, when printing (or copying) an image by the exemplary image forming apparatus on a commercial printing paper with high penetration pigmented inks, occurrences of problems such as beading and tone jump can be reduced and the quality of a printed (copied) image can be improved by processing image data with an image processing method according to an embodiment of the present invention.

An image processing method, a recorded matter, a storage medium, an image processing apparatus, an image forming method, an image forming system, and an ink according to embodiments of the present invention make it possible to print a high quality image on a recording medium on which liquid drops do not spread smoothly but clump together, without causing problems such as beading and tone jump, by controlling amounts of recording liquids caused to adhere to the recording medium through a total amount control step and a black generation/under color removal step.

The present invention is not limited to the specifically disclosed embodiments, and variations and modifications may be made without departing from the scope of the present invention.

What is claimed is:

1. An image forming method performed by an image forming apparatus to form an image on a commercial printing paper with pigmented inks, where an ink amount control process is performed on image data of the image before forming the image, the ink amount control process comprising:

a total amount control step of setting by the image forming apparatus a total amount limit used to control a total amount of the pigmented inks per unit area on the commercial printing paper, wherein the total amount limit is determined so that a full color gamut of the image forming apparatus can be reproduced;

a color space conversion step of converting by the image forming apparatus an input color signal of the image data into an output color signal having cyan (C), magenta (M), and yellow (Y) values, wherein the total amount of the pigmented inks per unit area on the commercial printing paper is controlled for each hue according to the total amount limit determined in the total amount control step and according to an ink overflow threshold and maximum saturation of said each hue; and a black generation/under color removal step of converting by the image forming apparatus the CMY values into cyan (C), magenta (M), yellow (Y), and black (K) values by adding a black (K) value and decreasing the CMY values so that portions of cyan (C), magenta (M), and yellow (Y) pigmented inks used to form the image are replaced with a black (K) pigmented ink, wherein a maximum under color removal amount, which is a maximum amount of each of the CMY pigmented inks to be replaced with the K pigmented ink, is obtained by the following formulas:

(total amount limit)−(maximum amount of black generation)=(total amount of CMY pigmented inks usable)

(total amount of CMY pigmented inks usable)/3=(amount of each of CMY pigmented inks usable)

(amount limit for each color)−(amount of each of CMY pigmented inks usable)=maximum under color removal amount, wherein the commercial printing paper is composed of a base material and a coating layer on at least one side of the base material;

when the commercial printing paper is brought into contact with one of the pigmented inks for 100 ms in an environment of 23° C. and 50% RH, between 2 and 40 ml/m² of the one of the pigmented inks is transferred onto the commercial printing paper; and when the commercial printing paper is brought into contact with the one of the pigmented inks for 400 ms in the environment of 23° C. and 50% RH, between 3 and 50 ml/m² of the one of the pigmented inks is transferred onto the commercial printing paper.

2. The image forming method as claimed in claim 1, wherein each of the pigmented inks contains at least water, a colorant, and a humectant.

3. The image forming method as claimed in claim 2, wherein a surface tension of said each of the pigmented inks at a temperature of 25° C. is between 15 and 40 mN/m.

4. The image forming method as claimed in claim 2, wherein said each of the pigmented inks contains a fluorinated surfactant.

5. The image forming method as claimed in claim 1, wherein a black generation starting gradation level, at or above which the K value is added to the CMY values in the black generation/under color removal step, is set to a gradation level that is within a first 25% of input gradation levels.

6. The image forming method as claimed in claim 1, wherein the color space conversion step is configured to convert an input color signal having three or more color values into an output color signal having four color values including a black value; and the black generation/under color removal step is performed as a part of the color space conversion step.

7. The image forming method as claimed in claim 1, wherein the image forming apparatus includes a liquid spraying head to spray the pigmented inks and a water-repellent layer is formed on a liquid drop spraying side of the liquid spraying head.

8. The image forming method as claimed in claim 7, wherein the water-repellent layer of the liquid drop spraying head is made of a fluorine material or a silicone material.

9. The image forming method as claimed in claim 7, wherein an opening through the water-repellent layer of the liquid drop spraying head is formed so that a cross section area of the opening increases gradually in a direction in which the pigmented inks are sprayed.

10. The image forming method as claimed in claim 7, wherein a critical surface tension of the water-repellent layer of the liquid drop spraying head is between 5 and 40 mN/m.

11. An image forming method performed by an image forming apparatus to form an image on a commercial printing paper with pigmented inks, where an ink amount control process is performed on image data of the image before forming the image, the ink amount control process comprising:

a total amount control step of setting by the image forming apparatus a total amount limit used to control a total amount of the pigmented inks per unit area on the commercial printing paper, wherein the total amount limit is determined so that a full color gamut of the image forming apparatus can be reproduced;

a color space conversion step of converting by the image forming apparatus an input color signal of the image data into an output color signal having cyan (C), magenta (M), and yellow (Y) values, wherein the total amount of the pigmented inks per unit area on the commercial printing paper is controlled for each hue according to the total amount limit determined in the total amount control step and according to an ink overflow threshold and maximum saturation of said each hue; and a black generation/under color removal step of converting by the image forming apparatus the CMY values into cyan (C), magenta (M), yellow (Y), and black (K) values by adding a black (K) value and decreasing the CMY values so that portions of cyan (C), magenta (M), and yellow (Y) pigmented inks used to form the image are replaced with a black (K) pigmented ink, wherein a maximum under color removal amount, which is a maximum amount of each of the CMY pigmented inks to be replaced with the K pigmented ink, is obtained by the following formulas:

(total amount limit)−(maximum amount of black generation)=(total amount of CMY pigmented inks usable)

(total amount of CMY pigmented inks usable)/3= (amount of each of CMY pigmented inks usable)

(amount limit for each color)−(amount of each of CMY pigmented inks usable)=maximum under color removal amount, wherein said each of the pigmented inks contains a fluorinated surfactant, wherein the fluorinated surfactant is expressed by the following chemical formula (A), in which formula m indicates an integer between 0 and 10 and n indicates an integer between 1 and 40:

$$CF_3CF_2(CF_2CF_2)m\text{-}CH_2CH_2O(CH_2CH_2O)nH \qquad (A).$$

12. An image forming apparatus including an image forming unit configured to perform an image forming method of forming an image on a commercial printing paper with pigmented inks, in which image forming method an ink amount control process is performed on image data of the image before forming the image, the ink amount control process comprising:

a total amount control step of setting a total amount limit used to control a total amount of the pigmented inks per unit area on the commercial printing paper, wherein the total amount limit is determined so that a full color gamut of the image forming apparatus can be reproduced;

a color space conversion step of converting an input color signal of the image data into an output color signal having cyan (C), magenta (M), and yellow (Y) values, wherein the total amount of the pigmented inks per unit area on the commercial printing paper is controlled for each hue according to the total amount limit determined in the total amount control step and according to an ink overflow threshold and maximum saturation of said each hue; and a black generation/under color removal step of converting the CMY values into cyan (C), magenta (M), yellow (Y), and black (K) values by adding a black (K) value and decreasing the CMY values so that portions of cyan (C), magenta (M), and yellow (Y) pigmented inks used to form the image are replaced with a black (K) pigmented ink, wherein a maximum under color removal amount, which is a maximum amount of each of the CMY pigmented inks to be replaced with the K pigmented ink, is obtained by the following formulas:

(total amount limit)−(maximum amount of black generation)=(total amount of CMY pigmented inks usable)

(total amount of CMY pigmented inks usable)/3= (amount of each of CMY pigmented inks usable)

(amount limit for each color)−(amount of each of CMY pigmented inks usable)=maximum under color removal amount, wherein the commercial printing paper is composed of a base material and a coating layer on at least one side of the base material;

when the commercial printing paper is brought into contact with one of the pigmented inks for 100 ms in an environment of 23° C. and 50% RH, between 2 and 40 ml/m² of the one of the pigmented inks is transferred onto the commercial printing paper; and when the commercial printing paper is brought into contact with the one of the pigmented inks for 400 ms in the environment of 23° C. and 50% RH, between 3 and 50 ml/m² of the one of the pigmented inks is transferred onto the commercial printing paper.

13. A pigmented ink for the image forming apparatus as claimed in claim 12, wherein a surface tension of the pigmented ink is between 15 and 40 mN/m at a temperature of 25° C.

14. A pigmented ink for the image forming apparatus as claimed in claim 12, wherein the pigmented ink contains a fluorinated surfactant.

* * * * *